US009313437B2

(12) United States Patent
Matsubayashi

(10) Patent No.: US 9,313,437 B2
(45) Date of Patent: Apr. 12, 2016

(54) TRANSMISSION APPARATUS, RECEPTION APPARATUS, COMMUNICATION SYSTEM, TRANSMISSION METHOD, RECEPTION METHOD, AND PROGRAMS THEREOF

(71) Applicant: Sony Corporation, Tokyo (JP)

(72) Inventor: Kei Matsubayashi, Kanagawa (JP)

(73) Assignee: Sony Corporation (JP)

( * ) Notice: Subject to any disclaimer, the term of this patent is extended or adjusted under 35 U.S.C. 154(b) by 80 days.

(21) Appl. No.: 14/331,858

(22) Filed: Jul. 15, 2014

(65) Prior Publication Data

US 2014/0354889 A1 Dec. 4, 2014

Related U.S. Application Data

(63) Continuation of application No. 14/153,615, filed on Jan. 13, 2014, now Pat. No. 8,860,884, which is a continuation of application No. 12/734,487, filed as application No. PCT/JP2008/070774 on Nov. 14, 2008, now Pat. No. 8,675,134.

(30) Foreign Application Priority Data

Nov. 28, 2007 (JP) ............................... P2007-308087

(51) Int. Cl.
*H04N 5/775* (2006.01)
*H04N 5/38* (2006.01)
(Continued)

(52) U.S. Cl.
CPC ................. *H04N 5/44* (2013.01); *G09G 5/006* (2013.01); *H04N 5/38* (2013.01); *H04N 5/63* (2013.01);
(Continued)

(58) Field of Classification Search
CPC ........... G09G 5/006; H04N 5/38; H04N 5/44; H04N 5/63; H04N 5/775; H04N 21/4122; H04N 21/4147; H04N 21/43632
See application file for complete search history.

(56) References Cited

U.S. PATENT DOCUMENTS

2006/0291569 A1* 12/2006 Kabuto et al. ............ 375/240.25
2007/0147609 A1* 6/2007 Noguchi et al. ............... 380/201
(Continued)

FOREIGN PATENT DOCUMENTS

EP 2209313 A1 7/2010
JP 2002-281406 A 9/2002
(Continued)

OTHER PUBLICATIONS

Extended European Search Report for EP Application No. 14188538.4, dated Feb. 6, 2015.
(Continued)

*Primary Examiner* — Jefferey Harold
*Assistant Examiner* — Sean Haiem
(74) *Attorney, Agent, or Firm* — Lerner, David, Littenberg, Krumholz & Mentlik, LLP

(57) ABSTRACT

[Object] To provide a transmission apparatus, a reception apparatus, a communication system, a transmission method, a reception method, and programs therefor that are capable of efficiently transmitting at least a plurality of pieces of video data included in data of a plurality of contents at the same time. [Solving Means] A switch unit (32*a*) of a transmission apparatus selects one of a plurality of pieces of video data supplied from a storage apparatus (42) in accordance with video data designated by a transmission data control unit (32*i*) and supplies it to an IF unit (32*b*). The IF unit (32*b*) transmits video data decoded by a decode unit (113) from a terminal (335). The compressed video data supplied from the switch unit (32*a*) is transmitted via a terminal (336). The terminal (335) is included in a first channel unit. In a case where the IF unit (32*b*) is an HDMI, for example, the terminal (335) is a terminal for a TMDS channel. The terminal (336) is a terminal that is included in a second channel unit and connected to a reserved line, an HPD line, and the like.

3 Claims, 44 Drawing Sheets

(51) Int. Cl.
*H04N 5/44* (2011.01)
*G09G 5/00* (2006.01)
*H04N 5/63* (2006.01)
*H04N 21/41* (2011.01)
*H04N 21/4363* (2011.01)
*H04N 21/4147* (2011.01)

(52) U.S. Cl.
CPC .......... *H04N 5/775* (2013.01); *H04N 21/4122* (2013.01); *H04N 21/4147* (2013.01); *H04N 21/43632* (2013.01); *G09G 2340/02* (2013.01); *G09G 2352/00* (2013.01); *G09G 2370/047* (2013.01); *G09G 2370/06* (2013.01); *G09G 2370/10* (2013.01); *G09G 2370/12* (2013.01); *G09G 2370/20* (2013.01)

(56) References Cited

U.S. PATENT DOCUMENTS

| | | | |
|---|---|---|---|
| 2010/0033627 A1* | 2/2010 | Hayashi et al. | 348/500 |
| 2010/0066919 A1* | 3/2010 | Nakajima et al. | 348/734 |
| 2010/0118188 A1* | 5/2010 | Nakajima et al. | 348/467 |
| 2010/0128176 A1* | 5/2010 | Nakajima et al. | 348/512 |

FOREIGN PATENT DOCUMENTS

| | | |
|---|---|---|
| JP | 2004-274718 A | 9/2004 |
| JP | 2005-018312 A | 1/2005 |
| JP | 2005-051547 A | 2/2005 |
| JP | 2007-006298 A | 1/2007 |
| JP | 2007-174448 A | 7/2007 |
| JP | 2007-306052 A | 11/2007 |
| JP | 2007294876 A | 11/2007 |

OTHER PUBLICATIONS

Supplementary European Search Report EP 08855355, dated Dec. 7, 2010.

Office Action from Japanese Application No. 2013-175986, dated Apr. 22, 2014.

* cited by examiner

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power |

HDMI pin assignment (in case of Type-A)

FIG.4

| PIN | Signal Assignment |
|---|---|
| 1 | TMDS Data2 Shield |
| 3 | TMDS Data2− |
| 5 | TMDS Data1+ |
| 7 | TMDS Data0 Shield |
| 9 | TMDS Data0− |
| 11 | TMDS Clock+ |
| 13 | DDC/CEC Ground |
| 15 | SCL |
| 17 | Reserved |
| 19 | Hot Plug Detect |

| PIN | Signal Assignment |
|---|---|
| 2 | TMDS Data2+ |
| 4 | TMDS Data1 Shield |
| 6 | TMDS Data1− |
| 8 | TMDS Data0+ |
| 10 | TMDS Clock Shield |
| 12 | TMDS Clock− |
| 14 | CEC |
| 16 | SDA |
| 18 | +5V Power |

HDMI pin assignment (in case of Type-C)

FIG.5

E-EDID data structure

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | | B | | |
| 5 | C | | | | | D | | |
| 6 | Supports-AI | DC_48bit | DC_36bit | DC_30bit | DC_Y444 | Reserved (0) | Reserved (0) | DVI-Dual |
| 7 | Max_TMDS_Clock | | | | | | | |
| 8 | Latency | | Full Duplex | Half Duplex | Reserved (0) | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

E-EDID Vendor Specific Data Block Structure

FIG.9

| Byte/Bit# | 7 | 6 | 5 | 4 | 3 | 2 | 1 | 0 |
|---|---|---|---|---|---|---|---|---|
| HB0 | Packet type = 0×AA ||||||||
| HB1 | Version = 0×BB ||||||||
| HB2 | 0 | 0 | 0 | Data length = 13(0×0D) |||||

FIG.31

| Packet/Byte# | 7 | 6 | 5 | 4 | 3 | 2 | 1 | 0 |
|---|---|---|---|---|---|---|---|---|
| PB0 | Check sum ||||||||
| PB1 | | Y1 | Y0 | A0 | B1 | B0 | S1 | S0 |
| PB2 | C1 | C0 | M1 | M0 | R3 | R2 | R1 | R0 |
| PB3 | Undefined |||||| SC1 | SC0 |
| PB4 | | VIC6 | VIC5 | VIC4 | VIC3 | VIC2 | VIC1 | VIC0 |
| PB5 | Undefined |||| PR3 | PR2 | PR1 | PR0 |
| PB6 | Number of lines at upper end (Bottom 8bits) ||||||||
| PB7 | Number of lines at upper end (Top 8bits) ||||||||
| PB8 | Number of lines at lower end (Bottom 8bits) ||||||||
| PB9 | Number of lines at lower end (Top 8bits) ||||||||
| PB10 | Number of lines at left end (Bottom 8bits) ||||||||
| PB11 | Number of lines at left end (Top 8bits) ||||||||
| PB12 | Number of lines at right end (Bottom 8bits) ||||||||
| PB13 | Number of lines at right end (Top 8bits) ||||||||
| PB14−PB27 | Undefined ||||||||

FIG.32

TRANSMISSION APPARATUS, RECEPTION APPARATUS, COMMUNICATION SYSTEM, TRANSMISSION METHOD, RECEPTION METHOD, AND PROGRAMS THEREOF

CROSS-REFERENCE TO RELATED APPLICATIONS

The present application is a continuation of U.S. patent application Ser. No. 14/153,615, filed Jan. 13, 2014, which is a continuation of U.S. patent application Ser. No. 12/734,487, filed May 5, 2010, which is a national phase entry under 35 U.S.C. §371 of International Application No. PCT/JP2008/070774 filed Nov. 14, 2008, published on Jun. 4, 2009 as WO 2009/069482 A1, which claims priority from Japanese Patent Application No. JP 2007-308087 filed in the Japanese Patent Office on Nov. 28, 2007, the disclosures of which are incorporated herein by reference.

TECHNICAL FIELD

The present invention relates to a transmission apparatus that transmits at least uncompressed (baseband) digital video data, a reception apparatus that receives the transmitted video data, a communication system including those apparatuses, a transmission method and a reception method as methods therefor, and programs therefor.

BACKGROUND ART

From the past, in digital television broadcasts, for example, there is a multi-view technique of displaying a plurality of video content screens on one screen displayed on a display connected to a receiver that receives videos (see, for example, Patent Document 1).

In this technique, a transmission-side transmission apparatus that transmits videos transmits size-reduced video signals for service that correspond to a plurality of channels. The receiver causes the display to display a multi-screen (13) in which the video signals for service are arranged longitudinally and laterally. A user uses a remote controller or the like to select one of the plurality of videos by focus display while looking at the multi-screen (13). Accordingly, the user can view a program of the selected video.

On the other hand, in recent years, an HDMI (High Definition Multimedia Interface) (registered trademark (hereinafter, referred to as R)) is becoming popular as a communication interface for transmitting uncompressed (baseband) video data and audio data associated with the video at high speed. For example, an HDMI® is capable of transmitting high-image-quality video data from a DVD (Digital Versatile Disc) recorder, a set-top box, and other AV (Audio Visual) sources to a television receiver, a projector, and other displays.

The HDMI® includes a TMDS (Transition Minimized Differential Signaling) channel that unidirectionally transmits video data and audio data from an HDMI source to an HDMI sink at high speed. In the HDMI, a CEC line (Consumer Electronics Control Line) and the like for bidirectional communication between the HDMI® source and the HDMI® sink is defined in the HDMI specifications.

Patent Document 1: Japanese Patent Application Laid-open No. 2002-281406 (paragraph [0032], FIGS. 5(A) to (C))

DISCLOSURE OF THE INVENTION

Problem to be Solved by the Invention

Incidentally, assuming that, for example, there is a system that includes a reproduction apparatus capable of supplying a plurality of pieces of video data included in a plurality of contents (video contents etc.) and a display connected to the reproduction apparatus via, for example, an HDMI®, for realizing the multi-screen described above in this system, the reproduction apparatus and the display need to be connected by a plurality of HDMI® cables. This is because, when video data is transmitted digitally by an HDMI® standard or the like, only one video can be transmitted by one cable. In this case, a burden is placed on a user using the system.

In view of the circumstances as described above, it is an object of the present invention to provide a transmission apparatus, a reception apparatus, a communication system, a transmission method, a reception method, and programs therefor that are capable of efficiently transmitting at least a plurality of pieces of video data included in data of a plurality of contents at the same time.

Means for Solving the Problem

For attaining the object above, according to the present invention, there is provided a transmission apparatus including: an interface including a first channel unit capable of transmitting, out of a plurality of pieces of video data included in data of a plurality of contents, first video data constituted of a baseband, and a second channel unit capable of transmitting, out of the plurality of pieces of video data, second video data encoded by a predetermined codec; and a control means for controlling a transmission of each of the first video data and the second video data by the interface.

Specifically, in the present invention, the first and second video data are transmitted by two different channel units (first and second channel units). Accordingly, the plurality of pieces of video data can be efficiently transmitted at the same time.

In view of the object of the present invention, the phrase "at the same time" only needs to mean "at the same time" to an extent that the first and second video data (including partial pictures of those pieces of data) can be displayed on one screen in a case where the first and second video data are displayed by a reception apparatus that receives them.

The transmission control by the control means only needs to be executed by multitask or multi-thread processing. Alternatively, one of the transmissions of the first and second video data may be main processing while the other is interrupt processing. The transmission control by the control means includes control of, for example, the number of pieces of video data to be transmitted (number of contents), a transmission timing, a volume of data to be transmitted, and other items related to a transmission.

The second channel unit is structured to be capable of performing unidirectional communication or bidirectional communication. When the second channel unit performs bidirectional communication, either a half-duplex communication system or a full-duplex communication system may be used as a communication system. In this case, a communication protocol is typically the Ethernet (registered trademark), but other protocols may be used instead.

The first channel unit and/or the second channel unit may include a plurality of terminals to be connected to a plurality of lines.

The interface is an HDMI (High Definition Multimedia Interface).

For example, the control means transmits the first video data using a TMDS (Transition Minimized Differential Signaling) channel of the HDMI as the first channel unit. An efficient transmission becomes possible by thus transmitting the first video data as baseband data that has a large volume using the TMDS channel.

In this case, the control means transmits the second video data using at least one of a reserved line, an HPD (Hot-Plug Detect) line, an SCL (Serial Clock) line, and an SDA (Serial Data) line of the HDMI as the second channel unit.

When all of the reserved line, the HPD line, the SCL line, and the SDA line are used, a full-duplex communication system that uses a twist pair only needs to be adopted, for example.

When two lines out of the four lines are used, a twist pair only needs to be constituted by those two lines. In this case, the half-duplex communication system is adopted as the communication system.

Alternatively, it is also possible to use, when two lines out of the four lines are used, one of them for a transmission and the other for a reception, for example. In this case, the full-duplex communication system is adopted.

The communication protocol of the second channel unit is typically the Ethernet (registered trademark), but other protocols may be used instead.

Alternatively, it is also possible to transmit the second video data using three lines out of the four lines. In this case, two lines for a transmission (or a reception) are used as a twist pair and one line for a reception (or a transmission) is used as a single wire.

The control means causes first audio data of a baseband included in the content of the first video data to be transmitted from the first channel unit and causes second audio data that is included in the content of the second video data and encoded by a predetermined codec to be transmitted from the second channel unit. With this structure, a plurality of pieces of audio data included in the plurality of contents are transmitted at the same time. As a result, the reception apparatus that has received the plurality of pieces of audio data, for example, can output the plurality of audios to a plurality of speakers at the same time. Alternatively, the reception apparatus can superimpose parts of or all of the plurality of pieces of received audio data and output them to a single speaker.

The control means causes the second video data that is provided plurally to be transmitted from the second channel unit. With this structure, the transmission apparatus can transmit at least one piece of first video data and the plurality of pieces of second video data at the same time.

The control means causes a control signal related to the transmission of the second video data to be transmitted from the second channel unit. In this case, the control means can cause the control signal related to the transmission of the first video data to be transmitted from a third channel unit different from the first channel unit. Since the first video data is baseband data, a volume of data to be communicated between the transmission apparatus and the reception apparatus via the first channel unit is large. Therefore, by transmitting the control signal from the second channel unit, such a volume restriction is not imposed.

The present invention is particularly useful when a user operates the transmission apparatus via the reception apparatus in a case where the communication held between the transmission apparatus and the reception apparatus via the second channel unit is bidirectional communication. In this case, since the control signal is transmitted from the reception apparatus to the transmission apparatus via the second channel unit, user-friendliness is improved.

Alternatively, the control means may cause a control signal related to the transmission of the first video data to be transmitted from the second channel unit.

According to the present invention, there is provided a reception apparatus including: an interface including a first channel unit capable of receiving, out of a plurality of pieces of video data included in data of a plurality of contents, first video data constituted of a baseband, and a second channel unit capable of receiving, out of the plurality of pieces of video data, second video data encoded by a predetermined codec; and a control means for controlling a reception of each of the first video data and the second video data by the interface.

The control means causes, when the transmission apparatus causes first audio data included in the content of the first video data to be transmitted from a third channel unit and second audio data included in the content of the second video data to be transmitted from a fourth channel unit, the transmitted first audio data to be received by the first channel unit and the transmitted second audio data to be received by the second channel unit. With this structure, a plurality of pieces of audio data included in the plurality of contents are transmitted at the same time. As a result, the reception apparatus can output the plurality of audios to a plurality of speakers at the same time. Alternatively, the reception apparatus can superimpose parts of or all of the plurality of pieces of received audio data and output them to a single speaker.

The reception apparatus further includes: a decoder to decode the received second video data; and a combination means for generating combined screen data by combining the received first video data and the decoded second video data on one screen. With this structure, a plurality of videos can be displayed on one screen.

According to the present invention, there is provided a communication system including: a transmission apparatus including a first interface including a first channel unit capable of transmitting, out of a plurality of pieces of video data included in data of a plurality of contents, first video data constituted of a baseband, and a second channel unit capable of transmitting, out of the plurality of pieces of video data, second video data encoded by a predetermined codec, and a first control means for controlling a transmission of each of the first video data and the second video data by the first interface; and a reception apparatus including a second interface including a third channel unit capable of receiving the first video data and a fourth channel unit capable of receiving the second video data, and a second control means for controlling a reception of each of the first video data and the second video data by the first interface.

According to the present invention, there is provided a transmission method including: transmitting, by a first channel unit, first video data constituted of a baseband out of a plurality of pieces of video data included in data of a plurality of contents; transmitting, by a second channel unit, second video data encoded by a predetermined codec out of the plurality of pieces of video data; and controlling a transmission of each of the first video data and the second video data.

According to the present invention, there is provided a reception method including: receiving, by a first channel unit, first video data constituted of a baseband out of a plurality of pieces of video data included in data of a plurality of contents; receiving, by a second channel unit, second video data encoded by a predetermined codec out of the plurality of pieces of video data; and controlling a reception of each of the first video data and the second video data.

The present invention is also applicable to programs for realizing the transmission method and the reception method.

Effect of the Invention

As described above, according to the present invention, at least a plurality of pieces of video data included in a plurality of contents can be efficiently transmitted at the same time.

BRIEF DESCRIPTION OF DRAWINGS

FIG. 4 A diagram showing a Type-A connector pin assignment of an HDMI®.

FIG. 5 A diagram showing a Type-C connector pin assignment of the HDMI®.

FIG. 9 A diagram showing a Vender Specific data structure.

FIG. 31 An explanatory diagram showing a structural example of a packet according to the first embodiment of the present invention.

FIG. 32 An explanatory diagram showing a structural example of a packet according to the first embodiment of the present invention.

BEST MODES FOR CARRYING OUT THE INVENTION

Hereinafter, embodiments of the present invention will be described with reference to the drawings.

Figure 1:
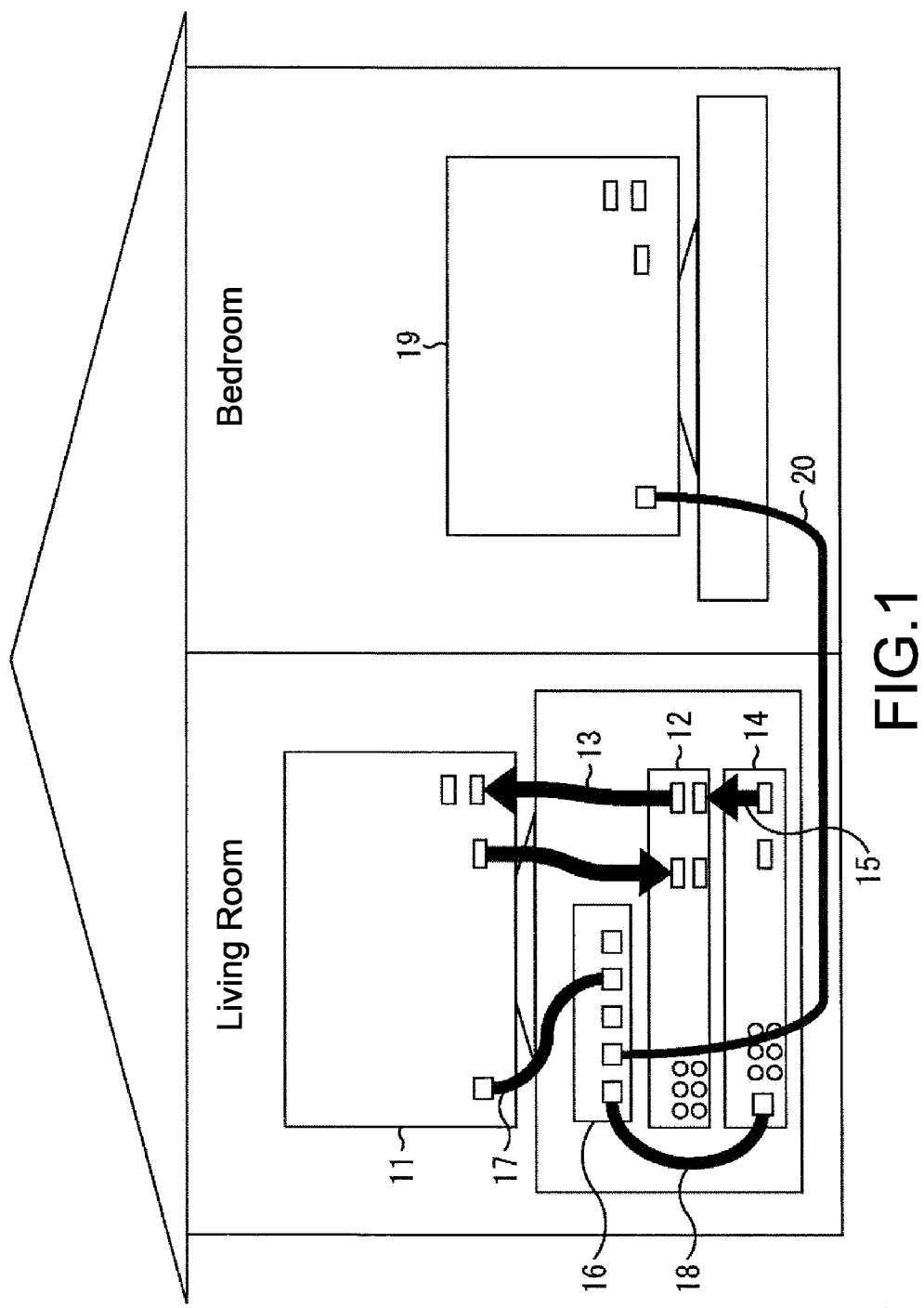
FIG. 1 A diagram showing a structure of a general picture transmission system.

FIG. 1 is a diagram showing a structure of a general picture transmission system as a reference example of this embodiment. Hereinafter, "picture" refers to both a still image and a moving image while mainly referring to each frame of a moving image. "Video" refers to a moving image. However, in describing the embodiments of the present invention, those two are not clearly differentiated and have substantially the same meaning.

In FIG. 1, a digital television receiver 11, an AV amplifier 12, and a reproducing apparatus 14 are installed in a living room on a left-hand side of a user residence in the figure. The digital television receiver 11 and AV amplifier 12 and the AV amplifier 12 and reproducing apparatus 14 are connected by an HDMI cable 13 and an HDMI cable 15, respectively.

Moreover, a hub 16 is installed in the living room, and the digital television receiver 11 and the reproducing apparatus 14 are connected to the hub 16 by a LAN (Local Area Network) cable 17 and a LAN cable 18, respectively. Furthermore, in the figure, a digital television receiver 19 is installed in a bedroom on a right-hand side from the living room, and the digital television receiver 19 is connected to the hub 16 via a LAN cable 20.

In a case where a content recorded in the reproducing apparatus 14 is reproduced and a picture is displayed on the digital television receiver 11, for example, the reproducing apparatus 14 decodes pixel data and audio data for reproducing the content and supplies the resultant uncompressed pixel data and audio data to the digital television receiver 11 via the HDMI cable 15, the AV amplifier 12, and the HDMI cable 13. Then, the digital television receiver 11 displays a picture or outputs an audio based on the pixel data and the audio data supplied from the reproducing apparatus 14.

Moreover, in a case where a content recorded in the reproducing apparatus 14 is reproduced and a picture is displayed on the digital television receiver 11 and the digital television receiver 19 at the same time, the reproducing apparatus 14 supplies compressed pixel data and audio data for reproducing the content to the digital television receiver 11 via the LAN cable 18, the hub 16, and the LAN cable 17, and also supplies them to the digital television receiver 19 via the LAN cable 18, the hub 16, and the LAN cable 20.

Then, the digital television receiver 11 and the digital television receiver 19 decode the pixel data and the audio data supplied from the reproducing apparatus 14 and displays a picture or outputs an audio based on the resultant uncompressed pixel data and audio data.

Furthermore, in a case where the digital television receiver 11 has received pixel data and audio data for reproducing a television-broadcasted program, when the received audio data is, for example, 5.1 channel surround audio data and the digital television receiver 11 therefore cannot decode the received audio data, the digital television receiver 11 converts the audio data into an optical signal and transmits it to the AV amplifier 12.

The AV amplifier 12 receives the optical signal transmitted from the digital television receiver 11 and performs a photoelectric conversion thereon, and decodes the resultant audio data. Then, the AV amplifier 12 amplifies the decoded uncompressed audio data as necessary and reproduces the audio from a surround speaker connected to the AV amplifier 12. Accordingly, by decoding the received pixel data, displaying a picture based on the decoded pixel data, and outputting an audio by the AV amplifier 12 based on the audio data supplied to the AV amplifier 12, the digital television receiver 11 reproduces a 5.1 channel surround program.

Figure 2:
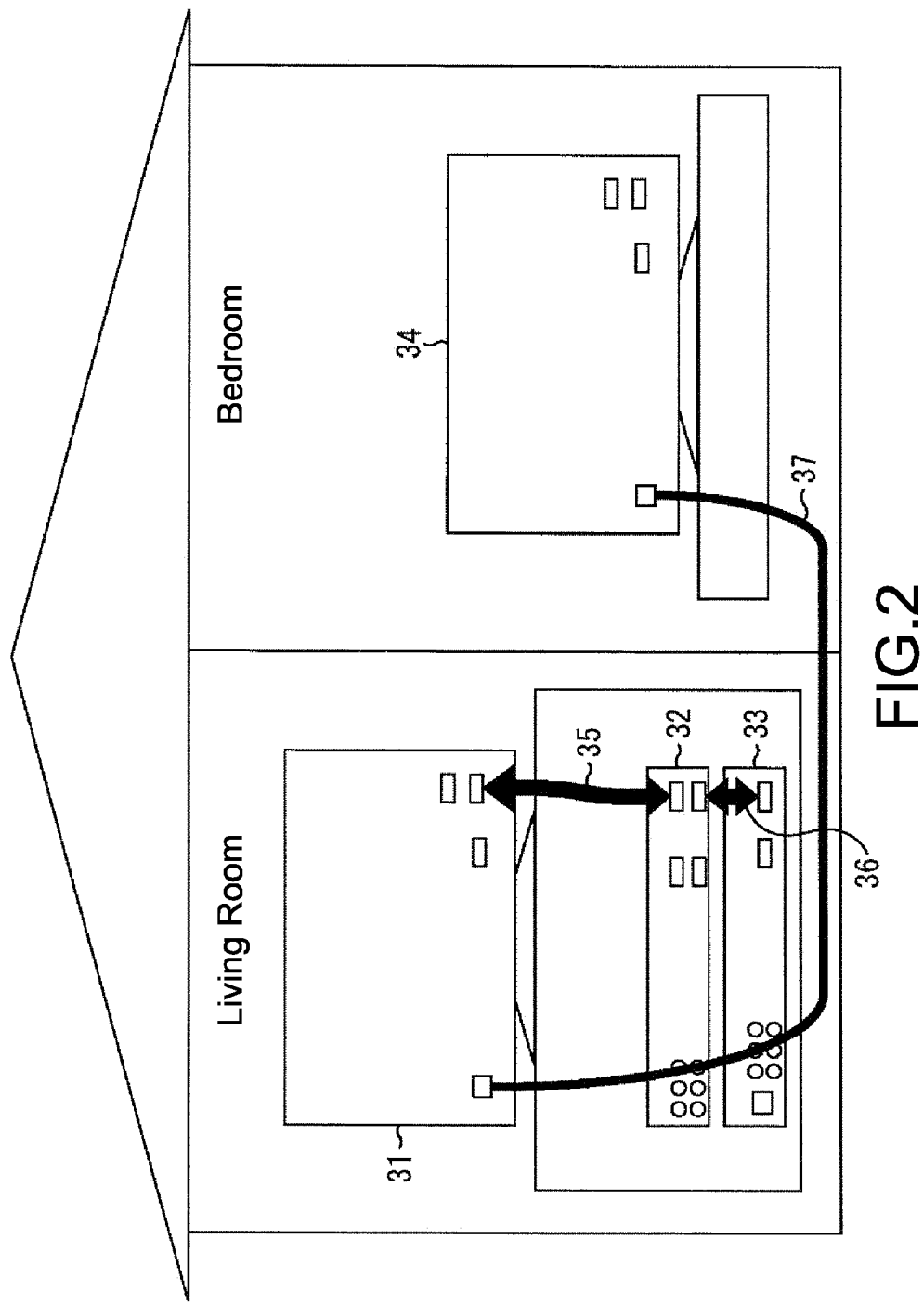
FIG. 2 A diagram showing a structure of a picture transmission system according to an embodiment to which the present invention is applied.

FIG. 2 is a diagram showing a structure of a picture transmission system according to an embodiment to which the present invention is applied.

The picture transmission system is constituted of a digital television receiver 31, an amplifier 32, a reproducing apparatus 33, and a digital television receiver 34. The digital television receiver 31 and amplifier 32 and the amplifier 32 and reproducing apparatus 33 are respectively connected by an HDMI® cable 35 and an HDMI® cable 36 as communication cables conforming to an HDMI®. In addition, the digital television receiver 31 and the digital television receiver 34 are connected by a LAN cable 37 for a LAN, such as the Ethernet (registered trademark).

In the example of FIG. 2, the digital television receiver 31, the amplifier 32, and the reproducing apparatus 33 are installed in a living room on a left-hand side of a user residence in the figure, and the digital television receiver 34 is installed in a bedroom on a right-hand side from the living room.

The reproducing apparatus 33 is constituted of, for example, a DVD player or a hard disk recorder, and decodes pixel data and audio data for reproducing a content and supplies the resultant uncompressed pixel data and audio data to the amplifier 32 via the HDMI® cable 36.

The amplifier 32 is constituted of, for example, an AV amplifier, and upon being supplied with the pixel data and the audio data from the reproducing apparatus 33, amplifies the supplied audio data as necessary. Moreover, the amplifier supplies the audio data amplified as necessary and the pixel data that have been supplied from the reproducing apparatus 33 to the digital television receiver 31 via the HDMI® cable 35. The digital television receiver 31 displays a picture or outputs an audio based on the pixel data and the audio data supplied from the amplifier 32 and reproduces a content.

Furthermore, the digital television receiver 31 and the amplifier 32 are capable of performing bidirectional communication such as IP communication at high speed using the HDMI® cable 35, and the amplifier 32 and the reproducing apparatus 33 are also capable of performing bidirectional communication such as IP communication at high speed using the HDMI® cable 36.

Specifically, by performing IP communication with the amplifier 32, the reproducing apparatus 33 can transmit compressed pixel data and audio data to the amplifier 32 via the HDMI® cable 36 as data conforming to an IP, and the amplifier 32 can receive the compressed pixel data and audio data transmitted from the reproducing apparatus 33.

Further, by performing IP communication with the digital television receiver 31, the amplifier 32 can transmit compressed pixel data and audio data to the digital television receiver 31 via the HDMI® cable 35 as data conforming to the IP, and the digital television receiver 31 can receive the compressed pixel data and audio data transmitted from the amplifier 32.

Therefore, the digital television receiver 31 can transmit the received pixel data and audio data to the digital television receiver 34 via the LAN cable 37. Moreover, the digital television receiver 31 decodes the received pixel data and audio data and, based on the resultant uncompressed pixel data and audio data, displays a picture or outputs an audio and reproduces a content.

The digital television receiver 34 receives and decodes the pixel data and the audio data transmitted from the digital television receiver 31 via the LAN cable 37 and, based on the uncompressed pixel data and audio data obtained by the decode, displays a picture or outputs an audio and thus reproduces a content. Accordingly, in the digital television receiver 31 and the digital television receiver 34, the same content or different contents can be reproduced at the same time.

Furthermore, in a case where the digital television receiver 31 has received pixel data and audio data for reproducing a program as a television-broadcasted content, when the received audio data is, for example, 5.1 channel surround audio data and the digital television receiver 31 therefore cannot decode the received audio data, the digital television receiver 31 transmits, by performing IP communication with the amplifier 32, the received audio data to the amplifier 32 via the HDMI® cable 35.

The amplifier 32 receives and decodes the audio data transmitted from the digital television receiver 31 and amplifies the decoded audio data as necessary. Then, the 5.1 channel surround audio is reproduced from a speaker (not shown) connected to the amplifier 32.

The digital television receiver 31 decodes the received pixel data as well as transmit the audio data to the amplifier 32 via the HDMI® cable 35, and reproduces a program by displaying a picture based on the pixel data obtained by the decode.

As described above, since electronic apparatuses such as the digital television receiver 31, the amplifier 32, and the reproducing apparatus 33 connected by the HDMI® cable 35 and the HDMI® cable 36 can perform high-speed IP communication using HDMI® cables in the picture transmission system shown in FIG. 2, a LAN cable corresponding to the LAN cable 17 of FIG. 1 is unnecessary.

Moreover, by connecting the digital television receiver 31 and the digital television receiver 34 by the LAN cable 37, data received by the digital television receiver 31 from the reproducing apparatus 33 via the HDMI® cable 36, the amplifier 32, and the HDMI® cable 35 can be additionally transmitted to the digital television receiver 34 via the LAN cable 37. Therefore, a LAN cable and an electronic apparatus corresponding to the LAN cable 18 and the hub 16 of FIG. 1 are unnecessary.

As shown in FIG. 1, in the conventional picture transmission system, different types of cables have been necessary depending on data to be transmitted and received and a communication system, and wirings of cables connecting the electronic apparatuses have been complex. On the other hand, in the picture transmission system shown in FIG. 2, since bidirectional communication such as IP communication can be performed between the electronic apparatuses connected by the HDMI® cables at high speed, it is possible to simplify connections between the electronic apparatuses. In other words, wirings of cables connecting the electronic apparatuses that have been complex in the past can be made simpler.

Figure 3:
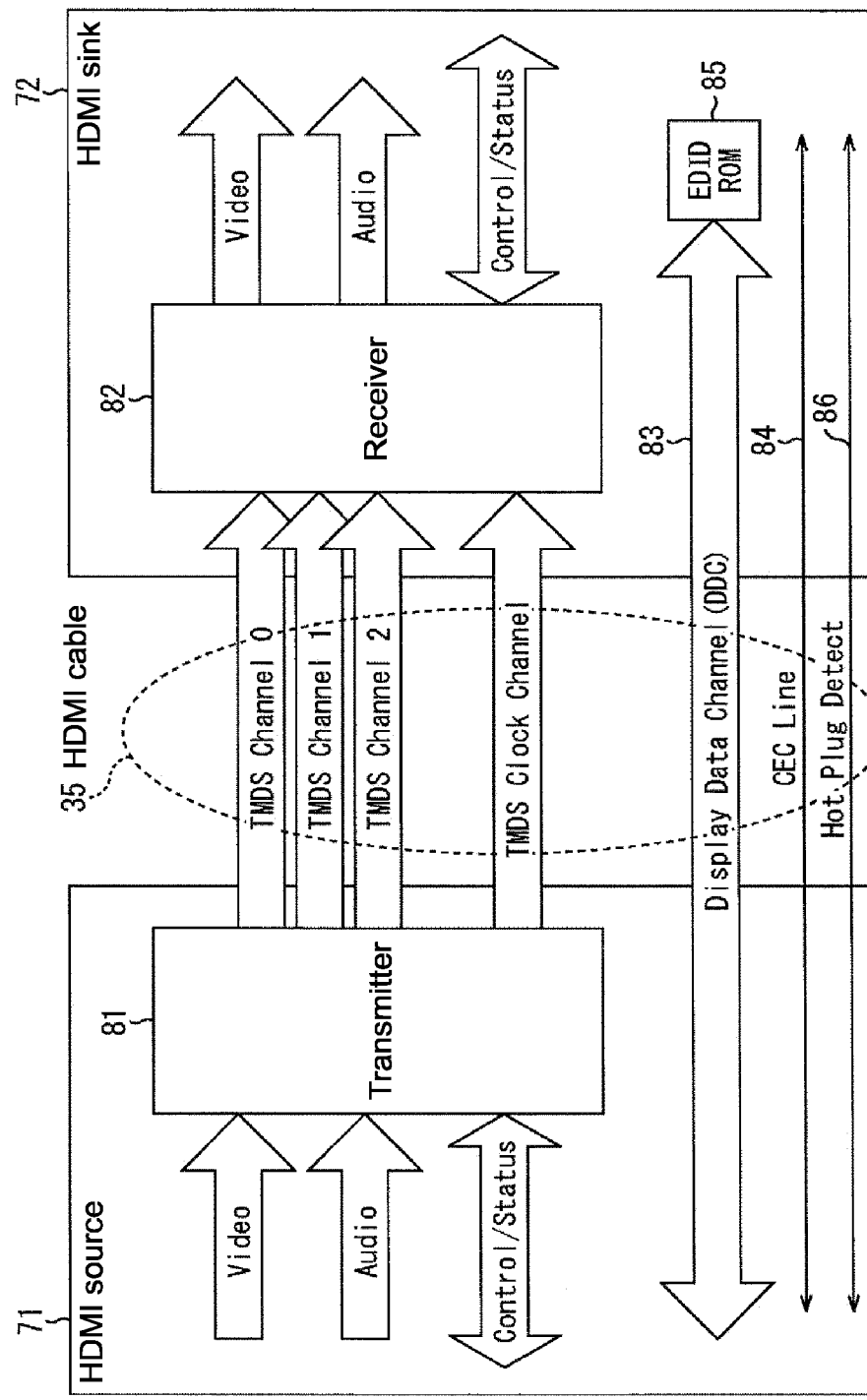
FIG. 3 A diagram showing a structural example of an HDMI® source and an HDMI® sink.

Next, FIG. 3 shows a structural example of an HDMI® source and an HDMI® sink incorporated in respective electronic apparatuses mutually connected by an HDMI® cable, for example, an HDMI® source provided in the amplifier 32 of FIG. 2 and an HDMI® sink provided in the digital television receiver 31.

An HDMI® source 71 and an HDMI® sink 72 are connected by a single HDMI® cable 35, and the HDMI® source 71 and the HDMI® sink 72 are capable of performing high-speed bidirectional IP communication using the HDMI® cable 35 while maintaining compatibility with the existing HDMI®.

The HDMI® source 71 unidirectionally transmits, to the HDMI® sink 72, using a plurality of channels, a differential signal corresponding to pixel data of an uncompressed picture of 1 screen in an active video area as a section obtained by removing a horizontal flyback section (horizontal blanking area) and a vertical flyback section (vertical blanking area) from a section ranging from one vertical synchronization signal to the next vertical synchronization signal, and unidirectionally transmits, to the HDMI® sink 72, using the plurality of channels, differential signals corresponding to at least audio data associated with the picture, control data, other auxiliary data, and the like in the horizontal flyback section or the vertical flyback section.

Specifically, the HDMI® source 71 includes a transmitter 81. The transmitter 81 converts the pixel data of the uncompressed picture into corresponding differential signals and serially transmits them unidirectionally to the HDMI® sink 72 connected thereto via the HDMI® cable 35 using three TMDS channels #0, #1, and #2 as the plurality of channels.

The TMDS channels #0, #1, and #2 provided in the transmitter 81 function as a first channel unit. In addition, the TMDS channels #0, #1, and #2 provided in a receiver 82 function as a third channel unit.

Further, the transmitter 81 converts the audio data associated with the uncompressed picture, necessary control data, other auxiliary data, and the like into corresponding differential signals and serially transmits them unidirectionally to the HDMI® sink 72 connected thereto via the HDMI® cable 35 using the three TMDS channels #0, #1, and #2.

Furthermore, the transmitter 81 transmits pixel clocks synchronized with the pixel data transmitted by the three TMDS channels #0, #1, and #2 to the HDMI® sink 72 connected thereto via the HDMI® cable 35 using a TMDS clock channel. Here, in a single TMDS channel #i (i=0, 1, 2), 10 bits of pixel data is transmitted during 1 clock of the pixel clocks.

The HDMI® sink 72 receives the differential signal corresponding to the pixel data transmitted unidirectionally from the HDMI® source 71 using the plurality of channels in the active area section, and receives the differential signals corresponding to the audio data and the control data transmitted unidirectionally from the HDMI® source 71 using the plurality of channels in the horizontal flyback section or the vertical flyback section.

Specifically, the HDMI® sink 72 includes the receiver 82. The receiver 82 receives, using the TMDS channels #0, #1, and #2, the differential signal corresponding to the pixel data and the differential signals corresponding to the audio data and the control data, that are transmitted unidirectionally from the HDMI® source 71 connected thereto via the HDMI® cable 35, in sync with the pixel clocks similarly transmitted from the HDMI® source 71 using the TMDS clock channel.

As a transmission channel of an HDMI® system constituted of the HDMI® source 71 and the HDMI® sink 72, there are also transmission channels called DDC (Display Data Channel) 83 and CEC line 84 in addition to the three TMDS channels #0 to #2 as transmission channels for serially transmitting, in one direction, the pixel data and audio data in sync with the pixel clocks from the HDMI® source 71 to the HDMI® sink 72 and the TMDS clock channel as a transmission channel for transmitting the pixel clocks.

The DDC 83 is constituted of two signal lines (not shown) included in the HDMI® cable 35 and used for the HDMI® source 71 to read out E-EDID (Enhanced Extended Display Identification Data) from the HDMI® sink 72 connected thereto via the HDMI® cable 35.

Specifically, in addition to the receiver 82, the HDMI® sink 72 includes an EDIDROM (EDID ROM (Read Only Memory)) 85 that stores the E-EDID as information on its own settings and performance. The HDMI® source 71 reads out, from the HDMI® sink 72 connected thereto via the HDMI® cable 35, E-EDID stored in the EDIDROM 85 of the HDMI® sink 72 via the DDC 83, and recognizes, based on the E-EDID, the settings and performance of the HDMI® sink 72, that is, a picture format (profile) that (the electronic apparatus including) the HDMI® sink 72 supports like RGB (Red, Green, Blue), YCbCr4:4:4, and YCbCr4:2:2.

It should be noted that although not shown, similar to the HDMI® sink 72, the HDMI® source 71 can store E-EDID and transmit the E-EDID to the HDMI® sink 72 as necessary.

The CEC line 84 is constituted of a single signal line (not shown) included in the HDMI® cable 35 and used for performing bidirectional communication of control data between the HDMI® source 71 and the HDMI® sink 72.

Further, the HDMI® source 71 and the HDMI® sink 72 can perform bidirectional IP communication by transmitting, for example, a frame conforming to IEEE (Institute of Electrical and Electronics Engineers) 802.3 to the HDMI® sink 72 and the HDMI® source 71 via the DDC 83 or the CEC line 84.

Furthermore, the HDMI® cable 35 includes a signal line 86 connected to a pin called Hot Plug Detect, and the HDMI® source 71 and the HDMI® sink 72 can use the signal line 86 to detect a connection of a new electronic apparatus, that is, the HDMI® sink 72 or the HDMI® source 71.

Next, FIGS. 4 and 5 each show a pin assignment of a connector (not shown) provided in the HDMI® source 71 or the HDMI® sink 72 connected to the HDMI® cable 35.

It should be noted that in FIGS. 4 and 5, a pin number for specifying a connector pin is described on a left-hand column (PIN column), and a name of a signal allocated to a pin specified by the pin number described on the left-hand column is described on a right-hand column on the same row (Signal Assignment column).

FIG. 4 shows a pin assignment of a connector called Type-A of the HDMI®.

Two signal lines as differential signal lines through which differential signals TMDS Data #I+ and TMDS Data #i− of a TMDS channel #i are transmitted are respectively connected to a pin to which TMDS Data #i+ is allocated (pins with pin numbers 1, 4, and 7) and a pin to which TMDS Data #i− is allocated (pins with pin numbers 3, 6, and 9).

Further, the CEC line 84 through which a CEC signal as control data is transmitted is connected to a pin with a pin number 13, and a pin with a pin number 14 is a reserved pin. If bidirectional IP communication can be performed using this reserved pin, compatibility with the existing HDMI® can be maintained. In this regard, to enable differential signals to be transmitted using the CEC line 84 and a signal line connected to the pin with the pin number 14, the signal line connected to the pin with the pin number 14 and the CEC line 84 are connected as a differential twist pair and shielded, and grounded to a ground line of the CEC line 84 and the DDC 83 that is connected to a pin with a pin number 17.

In addition, a signal line through which an SDA (Serial Data) signal such as E-EDID is transmitted is connected to a pin with a pin number 16. A signal line through which an SCL (Serial Clock) signal as a clock signal used in a synchronization at a time of transmitting and receiving the SDA signal is transmitted is connected to a pin with a pin number 15. The DDC 83 of FIG. 3 is constituted of the signal line through which the SDA signal is transmitted and the signal line through which the SCL signal is transmitted.

Further, like the CEC line 84 and the signal line connected to the pin with the pin number 14, the signal line through which the SDA signal is transmitted and the signal line through which the SCL signal is transmitted are connected as a differential twist pair and shielded so as to enable the differential signals to be transmitted, and grounded to the ground line connected to the pin with the pin number 17.

In addition, the signal line 86 through which a signal for detecting a connection of a new electronic apparatus is transmitted is connected to a pin with a pin number 19.

FIG. 5 shows a pin assignment of a connector called Type-C or Type-mini of the HDMI®.

Two signal lines as differential signal lines through which differential signals TMDS Data #i+ and TMDS Data #i− of a TMDS channel #i are transmitted are respectively connected to a pin to which TMDS Data #i+ is allocated (pins with pin numbers 2, 5, and 8) and a pin to which TMDS Data #i− is allocated (pins with pin numbers 3, 6, and 9).

Further, the CEC line 84 through which a CEC signal is transmitted is connected to the pin with the pin number 14, and the pin with the pin number 17 is a reserved pin. As in the case of Type-A, the signal line connected to the pin with the pin number 17 and the CEC line 84 are connected as a differential twist pair and shielded, and grounded to a ground line of the CEC line 84 and the DDC 83 that is connected to the pin with the pin number 13.

In addition, the signal line through which an SDA signal is transmitted is connected to the pin with the pin number 16, and the signal line through which an SCL signal is transmitted is connected to the pin with the pin number 15. As in the case of Type-A, the signal line through which an SDA signal is transmitted and the signal line through which an SCL signal is transmitted are connected as a differential twist pair and shielded so as to enable the differential signals to be transmitted, and grounded to the ground line connected to the pin with the pin number 13. Also, the signal line 86 through which a signal for detecting a connection of a new electronic apparatus is transmitted is connected to the pin with the pin number 19.

Figure 6:
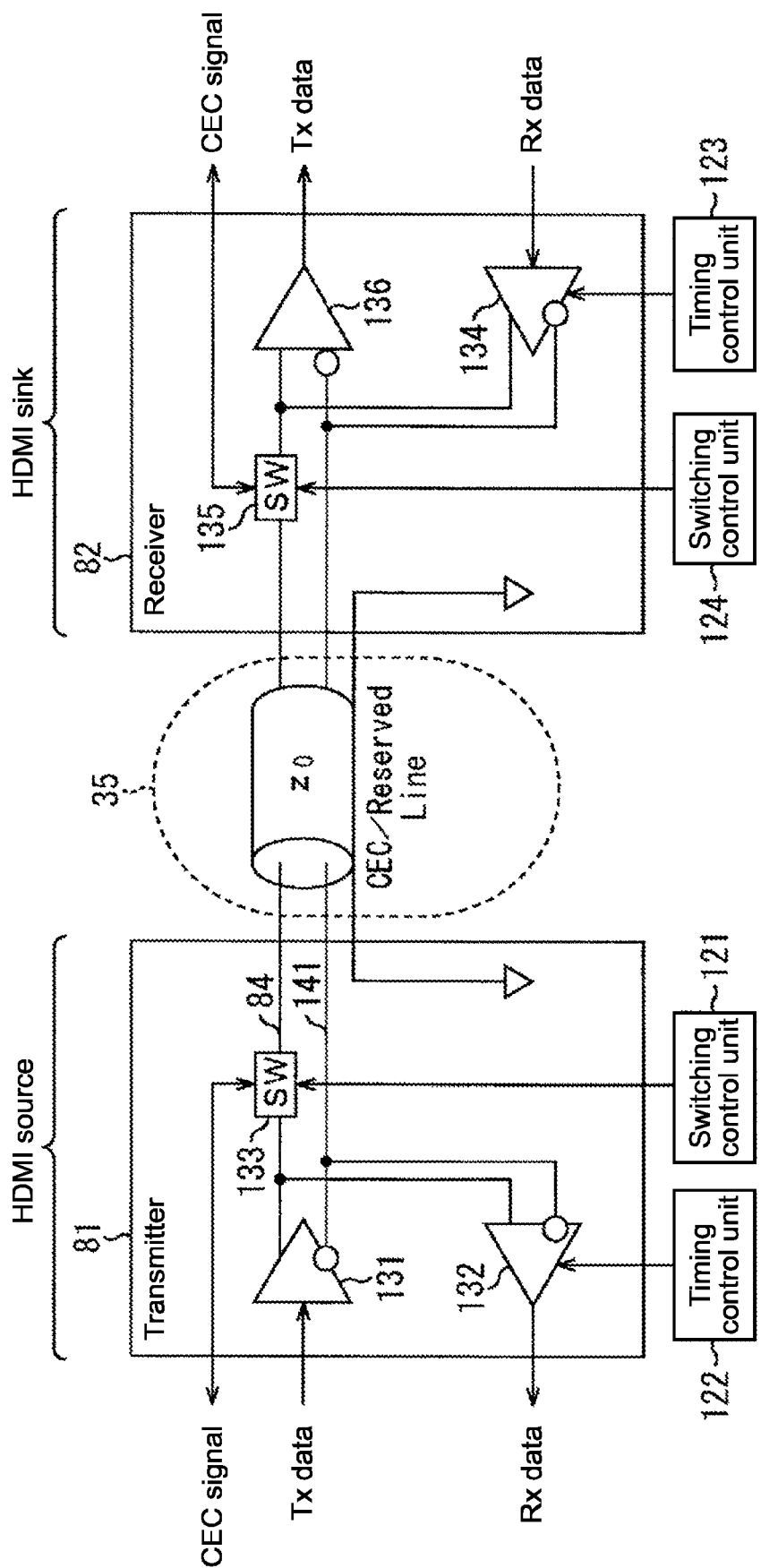
FIG. 6 A diagram showing a more-specific structural example of the HDMI® source and the HDMI® sink.

Next, FIG. 6 is a diagram showing a structure of the HDMI® source 71 and the HDMI® sink 72 that perform IP communication by a half-duplex communication system using the CEC line 84 and the signal line connected to the reserved pin of the connector of the HDMI®. It should be noted that FIG. 6 shows a structural example of parts related to the half-duplex communication in the HDMI® source 71 and the HDMI® sink 72. Moreover, in FIG. 6, parts corresponding to those of FIG. 3 are denoted by the same reference numerals, and descriptions thereof will be omitted as appropriate.

The HDMI® source 71 is constituted of the transmitter 81, a switching control unit 121, and a timing control unit 122. Further, the transmitter 81 is provided with a conversion unit 131, a decode unit 132, and a switch 133.

Supplied to the conversion unit 131 is Tx data as data transmitted from the HDMI® source 71 to the HDMI® sink 72 through bidirectional IP communication held between the HDMI® source 71 and the HDMI® sink 72. The Tx data is, for example, compressed pixel data and audio data.

The conversion unit 131 is constituted of, for example, a differential amplifier, and converts the supplied Tx data into a differential signal constituted of two partial signals. Moreover, the conversion unit 131 transmits to the receiver 82 the differential signal obtained by the conversion via the CEC line 84 and a signal line 141 connected to a reserved pin of a connector (not shown) provided in the transmitter 81. In other words, the conversion unit 131 supplies one of the partial signals constituting the differential signal obtained by the conversion to the switch 133 via the CEC line 84, more specifically, a signal line that is provided in the transmitter 81 and connected to the CEC line 84 of the HDMI® cable 35, and supplies the other one of the partial signals constituting the differential signal to the receiver 82 via the signal line 141, more specifically, a signal line that is provided in the transmitter 81 and connected to the signal line 141 of the HDMI® cable 35, and the signal line 141.

The decode unit 132 is constituted of, for example, a differential amplifier, and input terminals thereof are connected to the CEC line 84 and the signal line 141. Under control of the timing control unit 122, the decode unit 132 receives the differential signal transmitted from the receiver 82 via the CEC line 84 and the signal line 141, that is, the differential signal constituted of the partial signal on the CEC line 84 and the partial signal on the signal line 141, decodes it into Rx data as the original data, and outputs it. Here, the Rx data is data transmitted from the HDMI® sink 72 to the HDMI® source 71 through bidirectional IP communication held between the HDMI® source 71 and the HDMI® sink 72, such as a command that requests a transmission of pixel data and audio data.

A CEC signal from the HDMI® source 71 or the partial signal constituting the differential signal corresponding to the Tx data from the conversion unit 131 is supplied to the switch 133 at a timing of transmitting data, and a CEC signal from the receiver 82 or the partial signal constituting the differential signal corresponding to the Rx data from the receiver 82 is supplied at a timing of receiving data. Under control of the switching control unit 121, the switch 133 selects and outputs the CEC signal from the HDMI® source 71 or the CEC signal from the receiver 82, or the partial signal constituting the differential signal corresponding to the Tx data or the partial signal constituting the differential signal corresponding to the Rx data.

In other words, at the timing at which the HDMI® source 71 transmits data to the HDMI® sink 72, the switch 133 selects either the CEC signal supplied from the HDMI® source 71 or the partial signal supplied from the conversion unit 131 and transmits the selected CEC signal or partial signal to the receiver 82 via the CEC line 84.

Moreover, at the timing at which the HDMI® source 71 receives the data transmitted from the HDMI® sink 72, the switch 133 receives the CEC signal transmitted from the receiver 82 via the CEC line 84 or the partial signal of the differential signal corresponding to the Rx data, and supplies the received CEC signal or partial signal to the HDMI® source 71 or the decode unit 132.

The switching control unit 121 controls the switch 133 and switches the switch 133 so that either one of the signals supplied to the switch 133 is selected. The timing control unit 122 controls a timing at which the decode unit 132 receives the differential signal.

The HDMI® sink 72 is constituted of the receiver 82, a timing control unit 123, and a switching control unit 124. In addition, the receiver 82 is provided with a conversion unit 134, a switch 135, and a decode unit 136.

The conversion unit 134 is constituted of, for example, a differential amplifier, and is supplied with Rx data. Under control of the timing control unit 123, the conversion unit 134 converts the supplied Rx data into a differential signal constituted of two partial signals, and transmits to the transmitter 81 the differential signal obtained by the conversion via the CEC line 84 and the signal line 141. In other words, the conversion unit 134 supplies one of the partial signals constituting the differential signal obtained by the conversion to the switch 135 via the CEC line 84, more specifically, a signal line that is provided in the receiver 82 and connected to the CEC line 84 of the HDMI® cable 35, and supplies the other one of the partial signals constituting the differential signal to the transmitter 81 via the signal line 141, more specifically, a signal line that is provided in the receiver 82 and connected to the signal line 141 of the HDMI® cable 35, and the signal line 141.

The CEC signal from the transmitter 81 or the partial signal constituting the differential signal corresponding to the Tx data from the transmitter 81 is supplied to the switch 135 at a timing of receiving data, and the partial signal constituting the differential signal corresponding to the Rx data from the conversion unit 134 or the CEC signal from the HDMI® sink 72 is supplied at a timing of transmitting data. Under control of the switching control unit 124, the switch 135 selects and outputs the CEC signal from the transmitter 81 or the CEC signal from the HDMI® sink 72, or the partial signal constituting the differential signal corresponding to the Tx data or the partial signal constituting the differential signal corresponding to the Rx data.

In other words, at the timing at which the HDMI® sink 72 transmits data to the HDMI® source 71, the switch 135 selects either the CEC signal supplied from the HDMI® sink 72 or the partial signal supplied from the conversion unit 134 and transmits the selected CEC signal or partial signal to the transmitter 81 via the CEC line 84.

Moreover, at the timing at which the HDMI® sink 72 receives the data transmitted from the HDMI® source 71, the switch 135 receives the CEC signal transmitted from the transmitter 81 via the CEC line 84 or the partial signal of the differential signal corresponding to the Tx data, and supplies the received CEC signal or partial signal to the HDMI® sink 72 or the decode unit 136.

The decode unit 136 is constituted of, for example, a differential amplifier, and input terminals thereof are connected to the CEC line 84 and the signal line 141. The decode unit 136 receives the differential signal transmitted from the transmitter 81 via the CEC line 84 and the signal line 141, that is, the differential signal constituted of the partial signal on the CEC line 84 and the partial signal on the signal line 141, decodes it into Tx data as the original data, and outputs it.

The switching control unit 124 controls the switch 135 and switches the switch 135 so that either one of the signals supplied to the switch 135 is selected. The timing control unit 123 controls a timing at which the conversion unit 134 transmits the differential signal.

Figure 7:
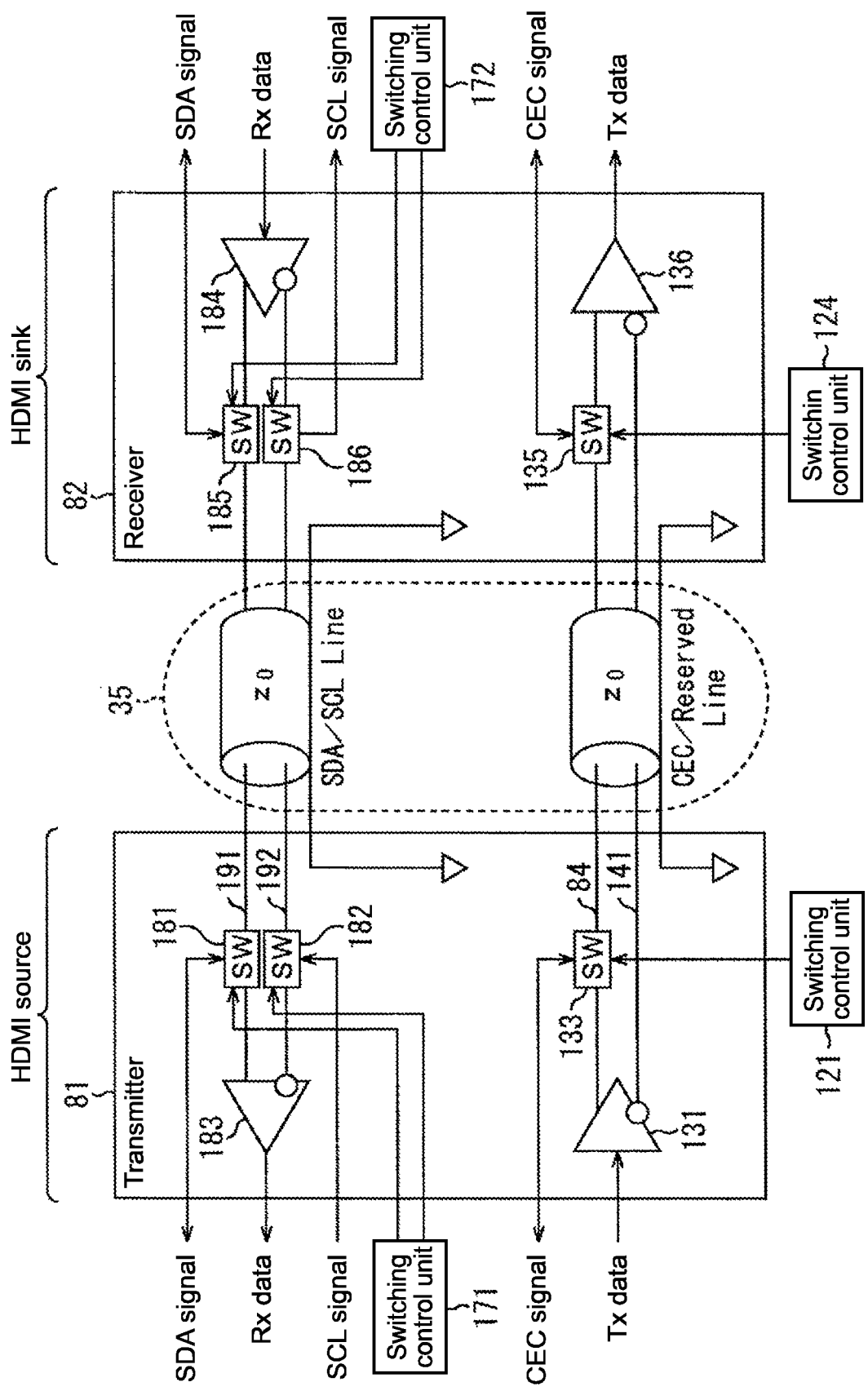
FIG. 7 A diagram showing another more-specific structural example of the HDMI® source and the HDMI® sink.

Further, in a case where the HDMI® source 71 and the HDMI® sink 72 perform IP communication by a full-duplex communication system using the CEC line 84, the signal line 141 connected to the reserved pin, the signal line through which the SDA signal is transmitted, and the signal line through which the SCL signal is transmitted, the HDMI® source 71 and the HDMI® sink 72 are structured as shown in FIG. 7, for example. It should be noted that in FIG. 7, parts corresponding to those of FIG. 6 are denoted by the same reference numerals, and descriptions thereof will be omitted as appropriate.

The HDMI® source 71 is constituted of the transmitter 81, the switching control unit 121, and a switching control unit 124. Also, the transmitter 81 is provided with the conversion unit 131, the switch 133, a switch 181, a switch 182, and a decode unit 183.

An SDA signal from the HDMI® source 71 is supplied to the switch 181 at a timing of transmitting data, and an SDA signal from the receiver 82 or the partial signal constituting the differential signal corresponding to the Rx data from the receiver 82 is supplied at a timing of receiving data. Under control of the switching control unit 971, the switch 181 selects and outputs the SDA signal from the HDMI® source 71, the SDA signal from the receiver 82, or the partial signal constituting the differential signal corresponding to the Rx data.

In other words, at the timing at which the HDMI® source 71 receives data transmitted from the HDMI® sink 72, the switch 181 receives either the SDA signal transmitted from the receiver 82 via an SDA line 191 as the signal line through which an SDA signal is transmitted or the partial signal of the differential signal corresponding to the Rx data, and supplies the received SDA signal or partial signal to the HDMI® source 71 or the decode unit 183.

Moreover, at the timing at which the HDMI® source 71 transmits the data to the HDMI® sink 72, the switch 181 transmits the SDA signal supplied from the HDMI® source 71 to the receiver 82 via the SDA line 191, or does not transmit anything to the receiver 82.

The SCL signal from the HDMI® source 71 is supplied to the switch 182 at a timing of transmitting data, and the partial signal constituting the differential signal corresponding to the Rx data from the receiver 82 is supplied at a timing of receiving data. Under control of the switching control unit 971, the switch 182 selects and outputs either the SCL signal or the partial signal constituting the differential signal corresponding to the Rx data.

In other words, at the timing at which the HDMI® source 71 receives the data transmitted from the HDMI® sink 72, the switch 182 receives the partial signal of the differential signal corresponding to the Rx data, that has been transmitted from the receiver 82 via an SCL line 192 as the signal line through which an SCL signal is transmitted, and supplies the received partial signal to the decode unit 183, or does not receive anything.

Moreover, at the timing at which the HDMI® source 71 transmits the data to the HDMI® sink 72, the switch 182 transmits the SCL signal supplied from the HDMI® source 71 to the receiver 82 via the SCL line 192 or does not transmit anything.

The decode unit 183 is constituted of, for example, a differential amplifier, and input terminals thereof are connected to the SDA line 191 and the SCL line 192. The decode unit 183 receives the differential signal transmitted from the receiver 82 via the SDA line 191 and the SCL line 192, that is, the differential signal constituted of the partial signal on the SDA line 191 and the partial signal on the SCL line 192, decodes it into Rx data as the original data, and outputs it.

The switching control unit 971 controls the switch 181 and the switch 182 and switches the switch 181 and the switch 182 so that either one of the supplied signals is selected for each of the switch 181 and the switch 182.

The HDMI® sink 72 is constituted of the receiver 82, the switching control unit 124, and a switching control unit 972.

In addition, the receiver 82 is provided with the switch 135, the decode unit 136, a conversion unit 184, a switch 185, and a switch 186.

The conversion unit 184 is constituted of, for example, a differential amplifier, and is supplied with Rx data. The conversion unit 184 converts the supplied Rx data into a differential signal constituted of two partial signals, and transmits to the transmitter 81 the differential signal obtained by the conversion via the SDA line 191 and the SCL line 192. In other words, the conversion unit 184 transmits one of the partial signals constituting the differential signal obtained by the conversion to the transmitter 81 via the switch 185, and transmits the other one of the partial signals constituting the differential signal to the transmitter 81 via the switch 186.

The partial signal constituting the differential signal corresponding to the Rx data from the conversion unit 184 or the SDA signal from the HDMI® sink 72 is supplied to the switch 185 at a timing of transmitting data, and the SDA signal from the transmitter 81 is supplied at a timing of receiving data. Under control of the switching control unit 972, the switch 185 selects and outputs the SDA signal from the HDMI® sink 72, the SDA signal from the transmitter 81, or the partial signal constituting the differential signal corresponding to the Rx data.

In other words, at the timing at which the HDMI® sink 72 receives data transmitted from the HDMI® source 71, the switch 185 receives the SDA signal transmitted from the transmitter 81 via the SDA line 191 and supplies the received SDA signal to the HDMI® sink 72, or does not receive anything.

Moreover, at the timing at which the HDMI® sink 72 transmits the data to the HDMI® source 71, the switch 185 transmits the SDA signal supplied from the HDMI® sink 72 or the partial signal supplied from the conversion unit 184 to the transmitter 81 via the SDA line 191.

The partial signal constituting the differential signal corresponding to the Rx data from the conversion unit 184 is supplied to the switch 186 at a timing of transmitting data, and the SCL signal from the transmitter 81 is supplied at a timing of receiving data. Under control of the switching control unit 972, the switch 186 selects and outputs either the partial signal constituting the differential signal corresponding to the Rx data or the SCL signal.

In other words, at the timing at which the HDMI® sink 72 receives data transmitted from the HDMI® source 71, the switch 186 receives the SCL signal transmitted from the transmitter 81 via the SCL line 192 and supplies the received SCL signal to the HDMI® sink 72, or does not receive anything.

Moreover, at the timing at which the HDMI® sink 72 transmits the data to the HDMI® source 71, the switch 186 transmits the partial signal supplied from the conversion unit 184 to the transmitter 81 via the SCL line 192, or does not transmit anything.

The switching control unit 972 controls the switch 185 and the switch 186 and switches the switch 185 and the switch 186 so that either one of the supplied signals is selected for each of the switch 185 and the switch 186.

Incidentally, which of the half-duplex communication and the full-duplex communication is possible for the IP communication performed between the HDMI® source 71 and the HDMI® sink 72 depends on the structures of the HDMI® source 71 and the HDMI® sink 72. In this regard, the HDMI® source 71 references E-EDID received from the HDMI® sink 72 to judge which of the half-duplex communication and the full-duplex communication is to be performed, or whether to perform bidirectional communication by an exchange of CEC signals.

Figure 8:
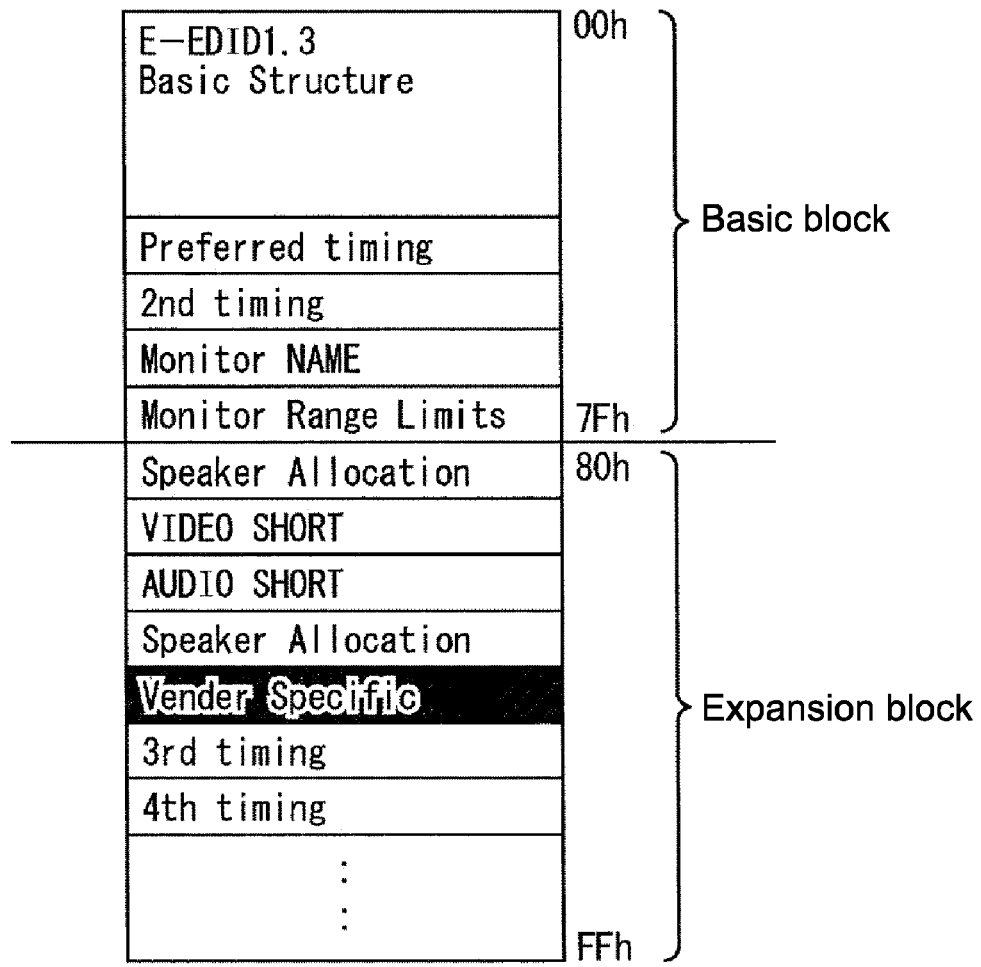
FIG. 8 A diagram showing an E-EDID data structure.

The E-EDID received by the HDMI® source 71 is constituted of a basic block and an expansion block as shown in FIG. 8, for example.

At a head of the basic block of the E-EDID, data expressed as "E-EDID1.3 Basic Structure" defined by an E-EDID 1.3 standard is arranged, followed by timing information expressed as "Preferred timing" for maintaining compatibility with conventional EDID and timing information expressed as "2nd timing" different from "Preferred timing" for maintaining compatibility with the conventional EDID.

Moreover, in the basic block, subsequent to "2nd timing", information expressed as "Monitor NAME" that indicates a name of a display apparatus and information expressed as "Monitor Range Limits" that indicates the number of pixels that can be displayed when aspect ratios are 4:3 and 16:9 are arranged sequentially.

On the other hand, subsequent to information expressed as "Speaker Allocation" regarding speakers on both sides, that is arranged at a head of the expansion block, there are sequentially arranged data expressed as "VIDEO SHORT" that describes information indicating a displayable picture size, a frame rate, and one of interlace and progressive and information on an aspect ratio and the like, data expressed as "AUDIO SHORT" that describes information on a reproducible audio codec system, sampling frequency, cutoff band, codec bit count, and the like, and information expressed as "Speaker Allocation" regarding the speakers on both sides.

In addition, in the expansion block, subsequent to "Speaker Allocation", data expressed as "Vender Specific" uniquely defined for each manufacturer, timing information expressed as "3rd timing" for maintaining compatibility with the conventional EDID, and timing information expressed as "4th timing" for maintaining compatibility with the conventional EDID are arranged.

Furthermore, the data expressed as "Vender Specific" has a data structure shown in FIG. 9. Specifically, the data expressed as "Vender Specific" is provided with 0-th to N-th blocks each of a 1-byte block.

In the 0-th block arranged at a head of the data expressed as "Vender Specific", a header expressed as "Vendor-Specific tag code (=3)" that indicates a data area of the data "Vender Specific" and information expressed as "Length (=N)" that indicates a length of the data "Vender Specific" are arranged.

Moreover, in the first to third blocks, information expressed as "24 bit IEEE Registration Identifier (0x000C03) LSB first" that indicates a number "0x000C03" registered for the HDMI® is arranged. In addition, in the fourth block and the fifth block, 24-bit information expressed as "A", "B", "C", and "D" that indicate physical addresses of sink apparatuses are arranged.

In the sixth block, a flag expressed as "Supports-AI" that indicates a function supported by the sink apparatus, information respectively expressed as "DC-48 bit", "DC-36 bit", and "DC-30 bit" that designate bit counts per pixel, a flag expressed as "DC-Y444" that indicates whether the sink apparatus supports a transmission of a YCbCr4:4:4 picture, and a flag expressed as "DVI-Dual" that indicates whether the sink apparatus supports dual DVI (Digital Visual Interface) are arranged.

Further, in the seventh block, information expressed as "Max-TMDS-Clock" that indicates a maximum frequency of a TMDS pixel clock is arranged. Furthermore, in the eighth block, a flag expressed as "Latency" that indicates presence/absence of delay information of a video and audio, a full-duplex flag expressed as "Full Duplex" that indicates whether full-duplex communication is possible, and a flag expressed as "Half Duplex" that indicates whether half-duplex communication is possible are arranged.

Here, the set full-duplex flag (e.g., set to "1") indicates that the HDMI® sink 72 has a function of performing full-duplex communication, that is, has the structure shown in FIG. 7, and the reset full-duplex flag (e.g., set to "0") indicates that the HDMI® sink 72 does not have the function of performing full-duplex communication.

Similarly, the set half-duplex flag (e.g., set to "1") indicates that the HDMI® sink 72 has a function of performing half-duplex communication, that is, has the structure shown in FIG. 6, and the reset half-duplex flag (e.g., set to "0") indicates that the HDMI® sink 72 does not have the function of performing half-duplex communication.

Further, in the ninth block of the data expressed as "Vender Specific", delay time data of a progressive video, that is expressed as "Video Latency", is arranged. In the tenth block, delay time data of an audio associated with the progressive video, that is expressed as "Audio Latency", is arranged. Furthermore, in the eleventh block, delay time data of an interlace video, that is expressed as "Interlaced Video Latency", is arranged. In the twelfth block, delay time data of an audio associated with the interlace video, that is expressed as "Interlaced Audio Latency", is arranged.

Based on the full-duplex flag and the half-duplex flag contained in the E-EDID received from the HDMI® sink 72, the HDMI® source 71 judges which of the half-duplex communication and the full-duplex communication is to be performed or whether to perform bidirectional communication by an exchange of CEC signals, and performs bidirectional communication with the HDMI® sink 72 based on a result of the judgment.

For example, when the HDMI® source 71 has the structure shown in FIG. 6, although the HDMI® source 71 can perform half-duplex communication with the HDMI® sink 72 shown in FIG. 6, it cannot perform half-duplex communication with the HDMI® sink 72 shown in FIG. 7.

In this regard, upon power-on of the electronic apparatus in which the HDMI® source 71 is provided, the HDMI® source 71 starts communication processing and performs bidirectional communication corresponding to the function of the HDMI® sink 72 connected to the HDMI® source 71.

Figure 10:
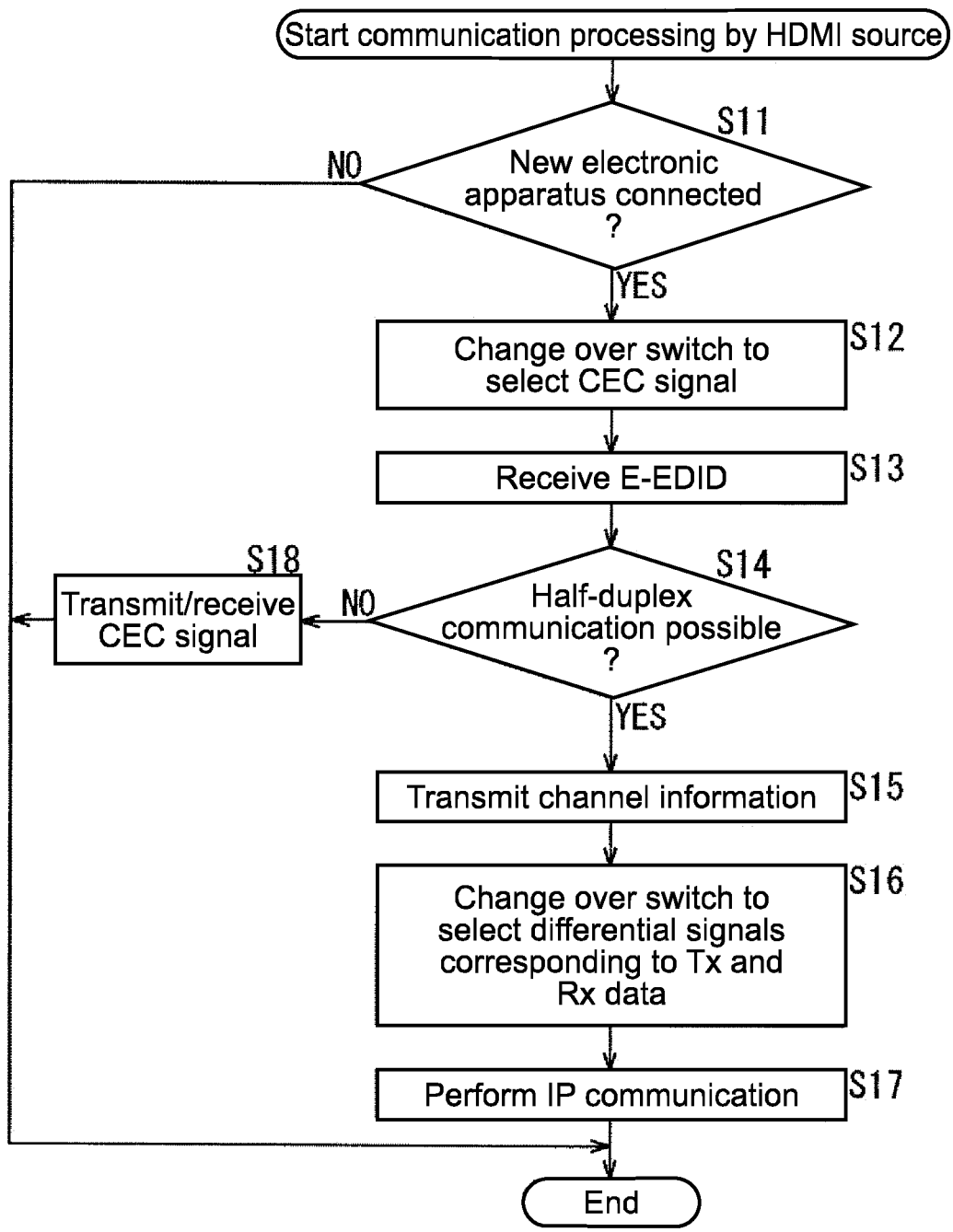
FIG. 10 A flowchart for explaining communication processing by the HDMI® source.

Hereinafter, referring to the flowchart of FIG. 10, communication processing carried out by the HDMI® source 71 shown in FIG. 6 will be described.

In Step S11, the HDMI® source 71 judges whether a new electronic apparatus has been connected to the HDMI® source 71. For example, the HDMI® source 71 judges whether a new electronic apparatus in which the HDMI® sink 72 is provided has been connected based on a magnitude of a voltage applied to a pin called Hot Plug Detect to which the signal line 86 is connected.

When judged in Step S11 that a new electronic apparatus is not connected, communication is not performed, and the communication processing therefore ends.

On the other hand, when judged in Step S11 that a new electronic apparatus has been connected, in Step S12, the switching control unit 121 controls the switch 133 and switches the switch 133 so that a CEC signal from the HDMI® source 71 is selected at a time of transmitting data and a CEC signal from the receiver 82 is selected at a time of receiving data.

In Step S13, the HDMI® source 71 receives E-EDID transmitted from the HDMI® sink 72 via the DDC 83. In other words, the HDMI® sink 72 reads out the E-EDID from the EDIDROM 85 upon detecting a connection of the HDMI® source 71 and transmits the read-out E-EDID to the HDMI® source 71 via the DDC 83. Thus, the HDMI® source 71 receives the E-EDID transmitted from the HDMI® sink 72.

In Step S14, the HDMI® source 71 judges whether half-duplex communication with the HDMI® sink 72 is possible. In other words, the HDMI® source 71 references the E-EDID received from the HDMI® sink 72 to judge whether the half-duplex flag "Half Duplex" of FIG. 9 is set, and when the half-duplex flag is set, for example, judges that bidirectional IP communication using a half-duplex communication system, that is, half-duplex communication is possible.

When judged in Step S14 that the half-duplex communication is possible, in Step S15, the HDMI® source 71 transmits, as channel information indicating a channel used for the bidirectional communication, a signal notifying that IP communication by a half-duplex communication system that uses the CEC line 84 and the signal line 141 is to be performed to the receiver 82 via the switch 133 and the CEC line 84.

In other words, when the half-duplex flag is set, the HDMI® source 71 can grasp that the HDMI® sink 72 has the structure shown in FIG. 6 and half-duplex communication that uses the CEC line 84 and the signal line 141 is possible. Therefore, the channel information is transmitted to the HDMI® sink 72 to notify that half-duplex communication is to be performed.

In Step S16, the switching control unit 121 controls the switch 133 and switches the switch 133 so that a differential signal corresponding to Tx data from the conversion unit 131 is selected at a time of transmitting data and a differential signal corresponding to Rx data from the receiver 82 is selected at a time of receiving data.

In Step S17, the respective units of the HDMI® source 71 perform bidirectional IP communication with the HDMI® sink 72 using a half-duplex communication system, and the communication processing is thus ended. Specifically, at the time of transmitting data, the conversion unit 131 converts the Tx data supplied from the HDMI® source 71 into a differential signal, supplies one of partial signals constituting the differential signal obtained by the conversion to the switch 133, and transmits the other one of the partial signals to the receiver 82 via the signal line 141. The switch 133 transmits the partial signal supplied from the conversion unit 131 to the receiver 82 via the CEC line 84. As a result, the differential signal corresponding to the Tx data is transmitted from the HDMI® source 71 to the HDMI® sink 72.

Further, at the time of receiving data, the decode unit 132 receives the differential signal corresponding to the Rx data transmitted from the receiver 82. Specifically, the switch 133 receives the partial signal of the differential signal corresponding to the Rx data, that has been transmitted from the receiver 82 via the CEC line 84, and supplies the received partial signal to the decode unit 132. The decode unit 132 decodes the differential signal constituted of the partial signal supplied from the switch 133 and the partial signal supplied from the receiver 82 via the signal line 141 into Rx data as the original data under control of the timing control unit 122, and outputs it to the HDMI® source 71.

Accordingly, the HDMI® source 71 transmits and receives various types of data such as control data, pixel data, and audio data to/from the HDMI® sink 72.

Further, when judged in Step S14 that half-duplex communication is not possible, in Step S18, the respective units of the HDMI® source 71 transmit and receive CEC signals to perform bidirectional communication with the HDMI® sink 72, and the communication processing is thus ended.

Specifically, by transmitting a CEC signal to the receiver 82 via the switch 133 and the CEC line 84 at the time of transmitting data and receiving a CEC signal transmitted from the receiver 82 via the switch 133 and the CEC line 84 at the time of receiving data, the HDMI® source 71 transmits and receives control data to/from the HDMI® sink 72.

Thus, the HDMI® source 71 references the half-duplex flag and performs half-duplex communication with the HDMI® sink 72 that can perform the half-duplex communication using the CEC line 84 and the signal line 141.

By thus switching the switch 133 to select the data to be transmitted and the data to be received and performing half-duplex communication, that is, IP communication that uses a half-duplex communication system with the HDMI® sink 72 using the CEC line 84 and the signal line 141, high-speed bidirectional communication can be performed while maintaining compatibility with the conventional HDMI®.

Moreover, similar to the HDMI® source 71, the HDMI® sink 72 starts communication processing upon power-on of the electronic apparatus in which the HDMI® sink 72 is provided, and performs bidirectional communication with the HDMI® source 71.

Figure 11:
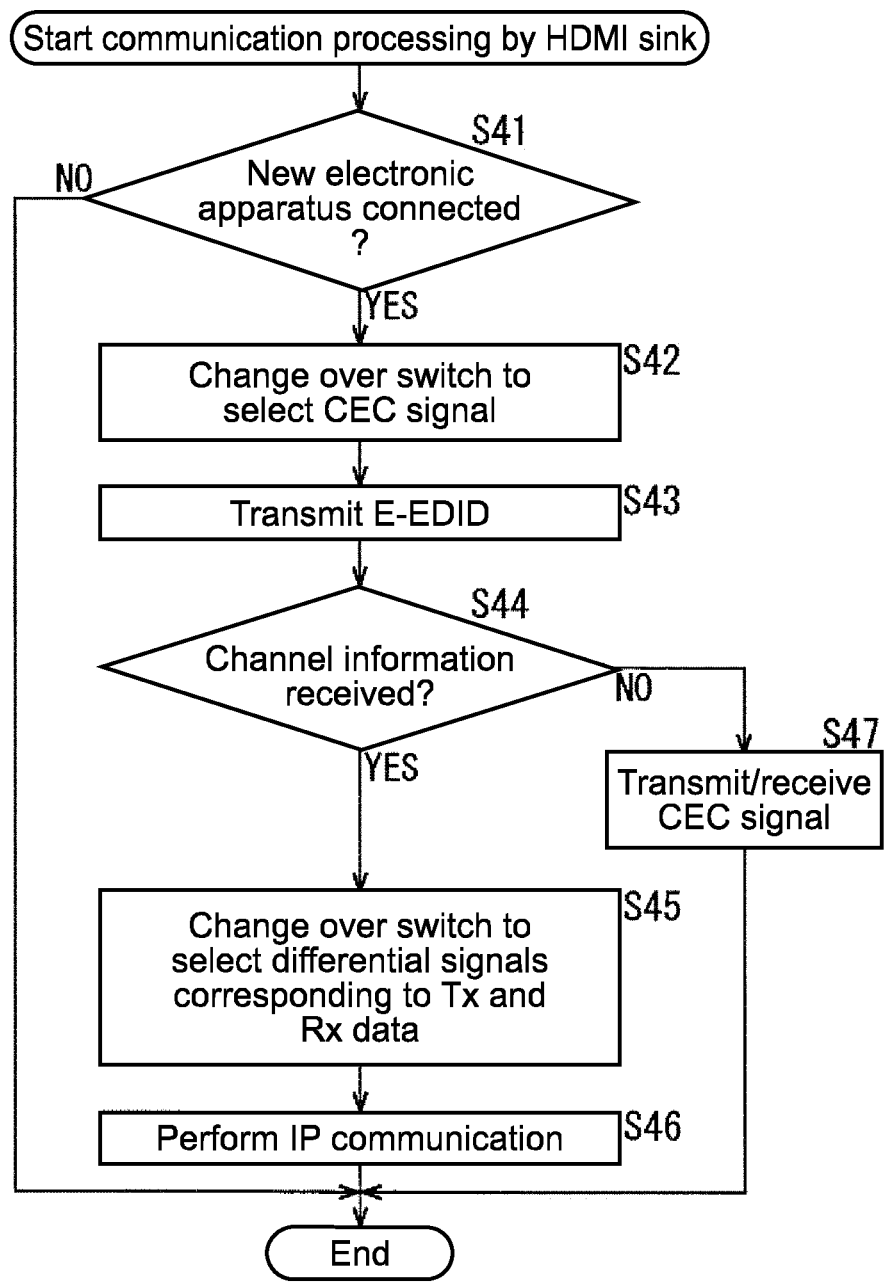
FIG. 11 A flowchart for explaining communication processing by the HDMI® sink.

Hereinafter, referring to the flowchart of FIG. 11, communication processing carried out by the HDMI® sink 72 shown in FIG. 6 will be described.

In Step S41, the HDMI® sink 72 judges whether a new electronic apparatus has been connected to the HDMI® sink 72. For example, the HDMI® sink 72 judges whether a new electronic apparatus in which the HDMI® source 71 is provided has been connected based on a magnitude of a voltage applied to a pin called Hot Plug Detect to which the signal line 86 is connected.

When judged in Step S41 that a new electronic apparatus is not connected, communication is not performed, and the communication processing therefore ends.

On the other hand, when judged in Step S41 that a new electronic apparatus has been connected, in Step S42, the switching control unit 124 controls the switch 135 and switches the switch 135 so that a CEC signal from the HDMI® sink 72 is selected at a time of transmitting data and a CEC signal from the transmitter 81 is selected at a time of receiving data.

In Step S43, the HDMI® sink 72 reads out E-EDID from the EDIDROM 85 and transmits the read-out E-EDID to the HDMI® source 71 via the DDC 83.

In Step S44, the HDMI® sink 72 judges whether channel information transmitted from the HDMI® source 71 has been received.

Specifically, channel information indicating a channel for bidirectional communication is transmitted from the HDMI® source 71 according to the functions of the HDMI® source 71 and the HDMI® sink 72. When the HDMI® source 71 has the structure shown in FIG. 6, for example, since the HDMI® source 71 and the HDMI® sink 72 can perform half-duplex communication using the CEC line 84 and the signal line 141, channel information notifying that IP communication that uses the CEC line 84 and the signal line 141 is to be performed is transmitted from the HDMI® source 71 to the HDMI® sink 72. The HDMI® sink 72 receives the channel information transmitted from the HDMI® source 71 via the switch 135 and the CEC line 84 and judges that the channel information has been received.

On the other hand, when the HDMI® source 71 does not have the function of performing half-duplex communication, channel information is not transmitted from the HDMI® source 71 to the HDMI® sink 72. Thus, the HDMI® sink 72 judges that channel information is not received.

When judged in Step S44 that channel information has been received, the process advances to Step S45 in which the switching control unit 124 controls the switch 135 and switches the switch 135 so that a differential signal corresponding to Rx data from the conversion unit 134 is selected at a time of transmitting data and a differential signal corresponding to Tx data from the transmitter 81 is selected at a time of receiving data.

In Step S46, the respective units of the HDMI® sink 72 perform bidirectional IP communication with the HDMI® source 71 using a half-duplex communication system, and the communication processing is thus ended. Specifically, at the time of transmitting data, the conversion unit 134 converts the Rx data supplied from the HDMI® sink 72 into a differential signal under control of the timing control unit 123, supplies one of partial signals constituting the differential signal obtained by the conversion to the switch 135, and transmits the other one of the partial signals to the transmitter 81 via the signal line 141. The switch 135 transmits the partial signal supplied from the conversion unit 134 to the transmitter 81 via the CEC line 84. As a result, the differential signal corresponding to the Rx data is transmitted from the HDMI® sink 72 to the HDMI® source 71.

Further, at the time of receiving data, the decode unit 136 receives the differential signal corresponding to the Tx data transmitted from the transmitter 81. Specifically, the switch 135 receives the partial signal of the differential signal corresponding to the Tx data, that has been transmitted from the transmitter 81 via the CEC line 84, and supplies the received partial signal to the decode unit 136. The decode unit 136 decodes the differential signal constituted of the partial signal supplied from the switch 135 and the partial signal supplied from the transmitter 81 via the signal line 141 into Tx data as the original data, and outputs it to the HDMI® sink 72.

Accordingly, the HDMI® sink 72 transmits and receives various types of data such as control data, pixel data, and audio data to/from the HDMI® source 71.

Further, when judged in Step S44 that the channel information is not received, in Step S47, the respective units of the HDMI® sink 72 transmit and receive CEC signals to perform bidirectional communication with the HDMI® source 71, and the communication processing is thus ended.

Specifically, by transmitting a CEC signal to the transmitter 81 via the switch 135 and the CEC line 84 at the time of transmitting data and receiving a CEC signal transmitted from the transmitter 81 via the switch 135 and the CEC line 84 at the time of receiving data, the HDMI® sink 72 transmits and receives control data to/from the HDMI® source 71.

Thus, upon receiving the channel information, the HDMI® sink 72 uses the CEC line 84 and the signal line 141 to perform half-duplex communication with the HDMI® sink 72.

By thus switching the switch 135 to select the data to be transmitted and the data to be received and performing half-duplex communication with the HDMI® source 71 using the CEC line 84 and the signal line 141, the HDMI® sink 72 can perform high-speed bidirectional communication while maintaining compatibility with the conventional HDMI®.

Moreover, when the HDMI® source 71 has the structure shown in FIG. 7, the HDMI® source 71 judges in the communication processing whether the HDMI® sink 72 has a function of performing full-duplex communication based on the full-duplex flag contained in the E-EDID, and performs bidirectional communication corresponding to a result of the judgment.

Figure 12:
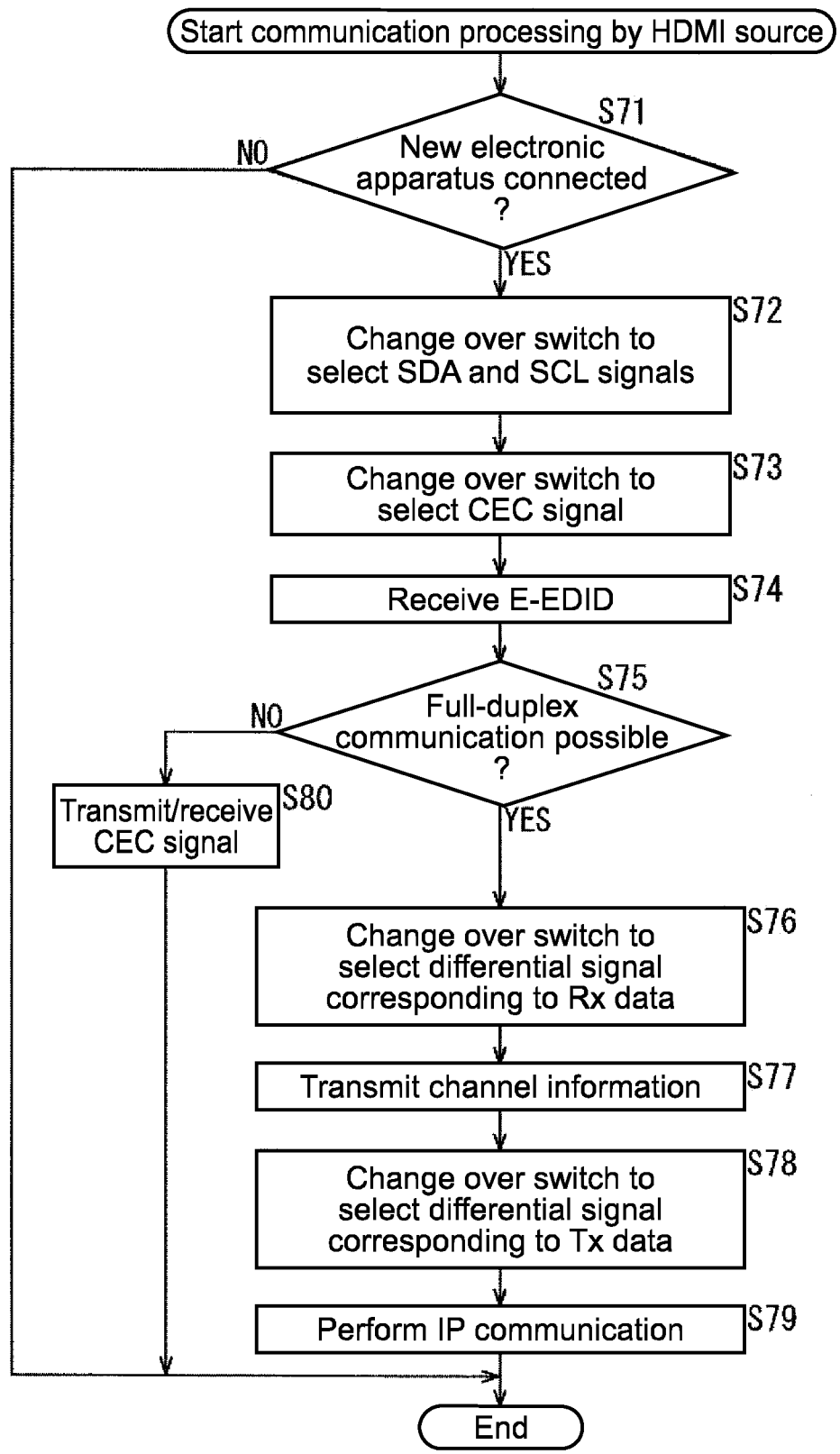
FIG. 12 A flowchart for explaining communication processing by the HDMI® source.

Hereinafter, referring to the flowchart of FIG. 12, communication processing carried out by the HDMI® source 71 shown in FIG. 7 will be described.

In Step S71, the HDMI® source 71 judges whether a new electronic apparatus has been connected to the HDMI® source 71. When judged in Step S71 that a new electronic apparatus is not connected, communication is not performed, and the communication processing therefore ends.

On the other hand, when judged in Step S71 that a new electronic apparatus has been connected, in Step S72, the switching control unit 971 controls the switch 181 and the switch 182 and switches the switch 181 and the switch 182 to make the switch 181 select the SDA signal from the HDMI® source 71 and make the switch 182 select the SCL signal from the HDMI® source 71 at the time of transmitting data, and make the switch 181 select the SDA signal from the receiver 82 at the time of receiving data.

In Step S73, the switching control unit 121 controls the switch 133 and switches the switch 133 so that the CEC signal from the HDMI® source 71 is selected at the time of transmitting data and the CEC signal from the receiver 82 is selected at the time of receiving data.

In Step S74, the HDMI® source 71 receives E-EDID transmitted from the HDMI® sink 72 via the SDA line 191 of the DDC 83. Specifically, the HDMI® sink 72 reads out E-EDID from the EDIDROM 85 upon detecting a connection of the HDMI® source 71, and transmits the read-out E-EDID to the HDMI® source 71 via the SDA line 191 of the DDC 83. Thus, the HDMI® source 71 receives the E-EDID transmitted from the HDMI® sink 72.

In Step S75, the HDMI® source 71 judges whether full-duplex communication with the HDMI® sink 72 is possible. Specifically, the HDMI® source 71 refers to the E-EDID received from the HDMI® sink 72 to judge whether the full-duplex flag "Full Duplex" shown in FIG. 9 is set, and when the full-duplex flag is set, judges that bidirectional IP communication using a full-duplex communication system, that is, full-duplex communication is possible.

When judged in Step S75 that full-duplex communication is possible, in Step S76, the switching control unit 971 controls the switch 181 and the switch 182 and switches the switch 181 and the switch 182 so that the differential signal corresponding to the Rx data from the receiver 82 is selected at the time of receiving data.

In other words, the switching control unit 971 switches the switch 181 and the switch 182 so that, out of partial signals constituting the differential signal corresponding to the Rx data transmitted from the receiver 82, the partial signal transmitted via the SDA line 191 is selected by the switch 181 and the partial signal transmitted via the SCL line 192 is selected by the switch 182 at the time of receiving data.

Because the SDA line 191 and the SCL line 192 constituting the DDC 83 are not used after the E-EDID is transmitted from the HDMI® sink 72 to the HDMI® source 71, that is, the SDA signal and the SCL signal are not transmitted and received via the SDA line 191 and the SCL line 192, the switch 181 and the switch 182 are switched so as to use the SDA line 191 and the SCL line 192 as transmission channels of Rx data in the full-duplex communication.

In Step S77, the HDMI® source 71 transmits, as channel information indicating a channel for the bidirectional communication, a signal notifying that IP communication by a full-duplex communication system that uses the CEC line 84 and signal line 141 and the SDA line 191 and SCL line 192 is to be performed to the receiver 82 via the switch 133 and the CEC line 84.

In other words, when the full-duplex flag is set, the HDMI® source 71 can grasp that the HDMI® sink 72 has the structure shown in FIG. 7 and full-duplex communication that uses the CEC line 84 and signal line 141 and the SDA line 191 and SCL line 192 is possible. Therefore, the channel information is transmitted to the HDMI® sink 72 to notify that full-duplex communication is to be performed.

In Step S78, the switching control unit 121 controls the switch 133 and switches the switch 133 so that a differential signal corresponding to Tx data from the conversion unit 131 is selected at a time of transmitting data. In other words, the switching control unit 121 switches the switch 133 so that a partial signal of the differential signal corresponding to the Tx data, that has been supplied from the conversion unit 131 to the switch 133, is selected.

In Step S79, the respective units of the HDMI® source 71 perform bidirectional IP communication with the HDMI® sink 72 using a full-duplex communication system, and the communication processing is thus ended. Specifically, at the time of transmitting data, the conversion unit 131 converts the Tx data supplied from the HDMI® source 71 into a differential signal, supplies one of partial signals constituting the differential signal obtained by the conversion to the switch 133, and transmits the other one of the partial signals to the receiver 82 via the signal line 141. The switch 133 transmits the partial signal supplied from the conversion unit 131 to the receiver 82 via the CEC line 84. As a result, the differential signal corresponding to the Tx data is transmitted from the HDMI® source 71 to the HDMI® sink 72.

Further, at the time of receiving data, the decode unit 183 receives the differential signal corresponding to the Rx data, that has been transmitted from the receiver 82. Specifically, the switch 181 receives the partial signal of the differential signal corresponding to the Rx data, that has been transmitted from the receiver 82 via the SDA line 191, and supplies the received partial signal to the decode unit 183. Moreover, the switch 182 receives the other one of the partial signals of the differential signal corresponding to the Rx data, that has been transmitted from the receiver 82 via the SCL line 192, and supplies the received partial signal to the decode unit 183. The decode unit 183 decodes the differential signal constituted of the partial signals supplied from the switch 181 and the switch 182 into Rx data as the original data, and outputs it to the HDMI® source 71.

Accordingly, the HDMI® source 71 transmits and receives various types of data such as control data, pixel data, and audio data to/from the HDMI® sink 72.

Further, when judged in Step S75 that full-duplex communication is not possible, in Step S80, the respective units of the HDMI® source 71 transmit and receive CEC signals to perform bidirectional communication with the HDMI® sink 72, and the communication processing is thus ended.

Specifically, by transmitting a CEC signal to the receiver 82 via the switch 133 and the CEC line 84 at the time of transmitting data and receiving a CEC signal transmitted from the receiver 82 via the switch 133 and the CEC line 84 at the time of receiving data, the HDMI® source 71 transmits and receives control data to/from the HDMI® sink 72.

Thus, the HDMI® source 71 references the full-duplex flag and performs full-duplex communication with the HDMI® sink 72 that can perform the full-duplex communication using the CEC line 84 and signal line 141 and the SDA line 191 and SCL line 192.

By thus switching the switch 133, the switch 181, and the switch 182 to select the data to be transmitted and the data to be received and performing full-duplex communication with the HDMI® sink 72 using the CEC line 84 and signal line 141 and the SDA line 191 and SCL line 192, high-speed bidirectional communication can be performed while maintaining compatibility with the conventional HDMI®.

Moreover, also when the HDMI® sink 72 has the structure shown in FIG. 7, the HDMI® sink 72 carries out communication processing as in the case of the HDMI® sink 72 shown in FIG. 6, and performs bidirectional communication with the HDMI® source 71.

Figure 13:
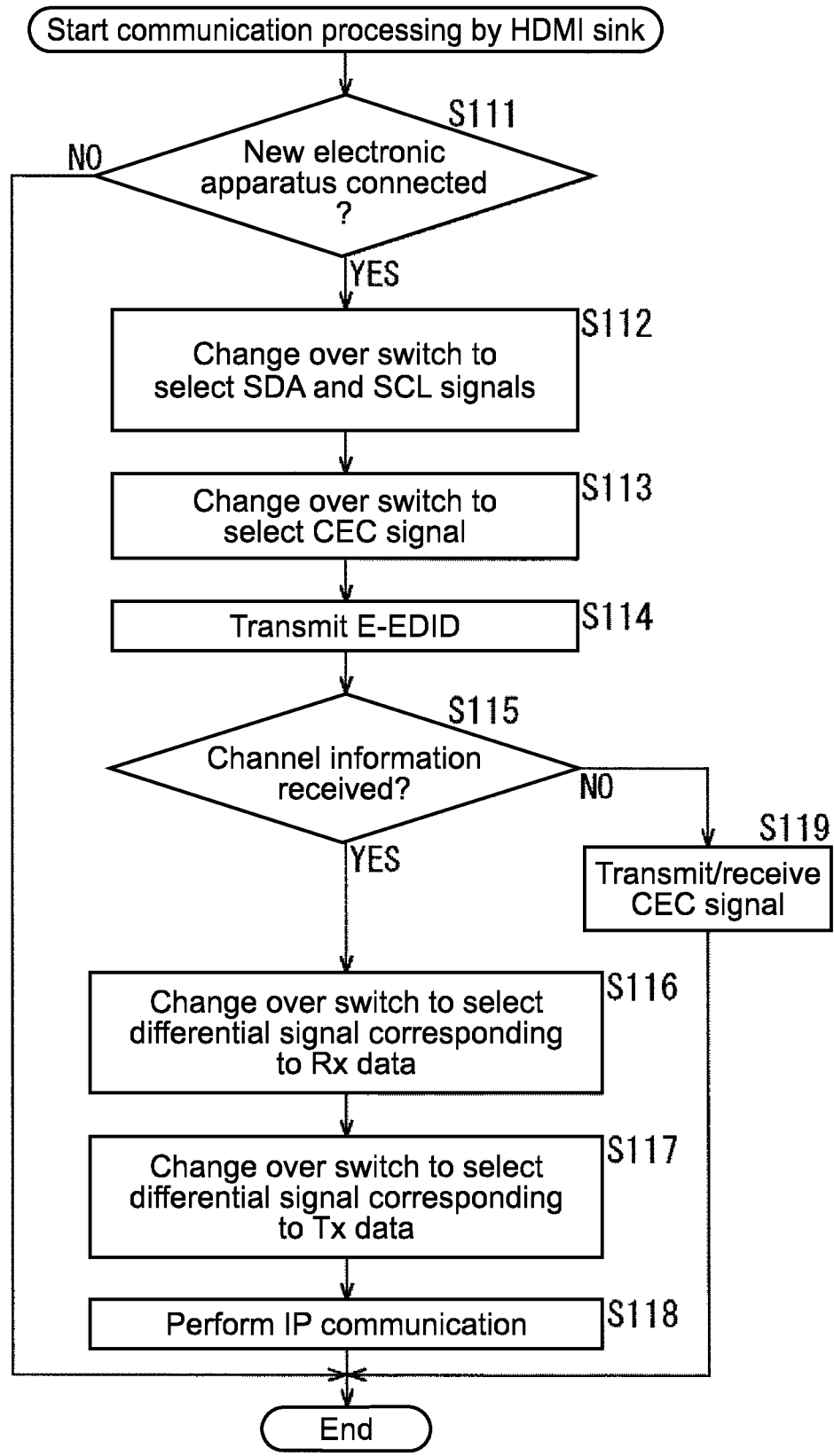
FIG. 13 A flowchart for explaining communication processing by the HDMI® sink.

Hereinafter, referring to the flowchart of FIG. 13, communication processing carried out by the HDMI® sink 72 shown in FIG. 7 will be described.

In Step S111, the HDMI® sink 72 judges whether a new electronic apparatus has been connected to the HDMI® sink 72. When judged in Step S111 that a new electronic apparatus is not connected, communication is not performed, and the communication processing therefore ends.

On the other hand, when judged in Step S111 that a new electronic apparatus has been connected, in Step S112, the switching control unit 972 controls the switch 185 and the switch 186 and switches the switch 185 and the switch 186 so that an SDA signal from the HDMI® sink 72 is selected by the switch 185 at a time of transmitting data and an SDA signal from the transmitter 81 is selected by the switch 185 and an SCL signal from the transmitter 81 is selected by the switch 186 at a time of receiving data.

In Step S113, the switching control unit 124 controls the switch 135 and switches the switch 135 so that a CEC signal from the HDMI® sink 72 is selected at the time of transmitting data and a CEC signal from the transmitter 81 is selected at the time of receiving data.

In Step S114, the HDMI® sink 72 reads out E-EDID from the EDIDROM 85 and transmits the read-out E-EDID to the HDMI® source 71 via the switch 185 and the SDA line 191 of the DDC 83.

In Step S115, the HDMI® sink 72 judges whether channel information transmitted from the HDMI® source 71 has been received.

Specifically, channel information indicating a channel used for bidirectional communication is transmitted from the HDMI® source 71 according to the functions of the HDMI® source 71 and the HDMI® sink 72. When the HDMI® source 71 has the structure shown in FIG. 7, for example, since the HDMI® source 71 and the HDMI® sink 72 can perform full-duplex communication, channel information notifying that IP communication by a full-duplex communication system that uses the CEC line 84 and signal line 141 and the SDA line 191 and SCL line 192 is to be performed is transmitted from the HDMI® source 71 to the HDMI® sink 72. Thus, The HDMI® sink 72 receives the channel information transmitted from the HDMI® source 71 via the switch 135 and the CEC line 84 and judges that the channel information has been received.

On the other hand, when the HDMI® source 71 does not have the function of performing full-duplex communication, channel information is not transmitted from the HDMI® source 71 to the HDMI® sink 72. Thus, the HDMI® sink 72 judges that channel information is not received.

When judged in Step S115 that the channel information has been received, the process advances to Step S116 in which the switching control unit 972 controls the switch 185 and the switch 186 and switches the switch 185 and the switch 186 so that a differential signal corresponding to Rx data from the conversion unit 184 is selected at the time of transmitting data.

In Step S117, the switching control unit 124 controls the switch 135 and switches the switch 135 so that a differential signal corresponding to Tx data from the transmitter 81 is selected at the time of receiving data.

In Step S118, the respective units of the HDMI® sink 72 perform bidirectional IP communication with the HDMI® source 71 using a full-duplex communication system, and the communication processing is thus ended. Specifically, at the time of transmitting data, the conversion unit 184 converts the Rx data supplied from the HDMI® sink 72 into a differential signal, supplies one of partial signals constituting the differential signal obtained by the conversion to the switch 185, and supplies the other one of the partial signals to the switch 186. The switch 185 and the switch 186 transmit the partial signals supplied from the conversion unit 184 to the transmitter 81 via the SDA line 191 and the SCL line 192. As a result, the differential signal corresponding to the Rx data is transmitted from the HDMI® sink 72 to the HDMI® source 71.

Further, at the time of receiving data, the decode unit 136 receives the differential signal corresponding to the Tx data transmitted from the transmitter 81. Specifically, the switch 135 receives a partial signal of the differential signal corresponding to the Tx data, that has been transmitted from the transmitter 81 via the CEC line 84, and supplies the received partial signal to the decode unit 136. The decode unit 136 decodes the differential signal constituted of the partial signal supplied from the switch 135 and the partial signal supplied from the transmitter 81 via the signal line 141 into Tx data as the original data, and outputs it to the HDMI® sink 72.

Accordingly, the HDMI® sink 72 transmits and receives various types of data such as control data, pixel data, and audio data to/from the HDMI® source 71.

Further, when judged in Step S115 that the channel information is not received, in Step S119, the respective units of the HDMI® sink 72 transmit and receive CEC signals to perform bidirectional communication with the HDMI® source 71, and the communication processing is thus ended.

As described above, upon receiving the channel information, the HDMI® sink 72 performs full-duplex communication with the HDMI® sink 72 using the CEC line 84 and signal line 141 and the SDA line 191 and SCL line 192.

By thus switching the switch 135, the switch 185, and the switch 186 to select the data to be transmitted and the data to be received and performing full-duplex communication with the HDMI® source 71 using the CEC line 84 and signal line 141 and the SDA line 191 and SCL line 192, the HDMI® sink 72 can perform high-speed bidirectional communication while maintaining compatibility with the conventional HDMI®.

It should be noted that in the example of FIG. 7, the HDMI® source 71 has a structure in which the conversion unit 131 is connected to the CEC line 84 and the signal line 141 and the decode unit 183 is connected to the SDA line 191 and the SCL line 192. However, a structure in which the decode unit 183 is connected to the CEC line 84 and the signal line 141 and the conversion unit 131 is connected to the SDA line 191 and the SCL line 192 is also possible.

In such a case, the switch 181 and the switch 182 are connected to the decode unit 183 as well as the CEC line 84 and the signal line 141, and the switch 133 is connected to the conversion unit 131 as well as the SDA line 191.

Further, the HDMI® sink 72 shown in FIG. 7 may also have a structure in which the conversion unit 184 is connected to the CEC line 84 and the signal line 141 and the decode unit 136 is connected to the SDA line 191 and the SCL line 192. In such a case, the switch 185 and the switch 186 are connected to the conversion unit 184 as well as the CEC line 84 and the signal line 141 and the switch 135 is connected to the decode unit 136 as well as the SDA line 191.

Furthermore, it is also possible for the CEC line 84 and the signal line 141 to be the replaced with the SDA line 191 and the SCL line 192 in FIG. 6. In other words, the conversion unit 131 and the decode unit 132 of the HDMI® source 71 and the conversion unit 134 and the decode unit 136 of the HDMI® sink 72 may be connected to the SDA line 191 and the SCL line 192 so that the HDMI® source 71 and the HDMI® sink 72 perform IP communication using a half-duplex communication system. In addition, in this case, a reserved pin of a connector to which the signal line 141 is connected may be used to detect a connection of an electronic apparatus.

Moreover, the HDMI® source 71 and the HDMI® sink 72 may each have both of the function of performing half-duplex communication and the function of performing full-duplex communication. In such a case, the HDMI® source 71 and the HDMI® sink 72 can perform IP communication using a half-duplex communication system or a full-duplex communication system according to a function of an electronic apparatus connected thereto.

Figure 14:
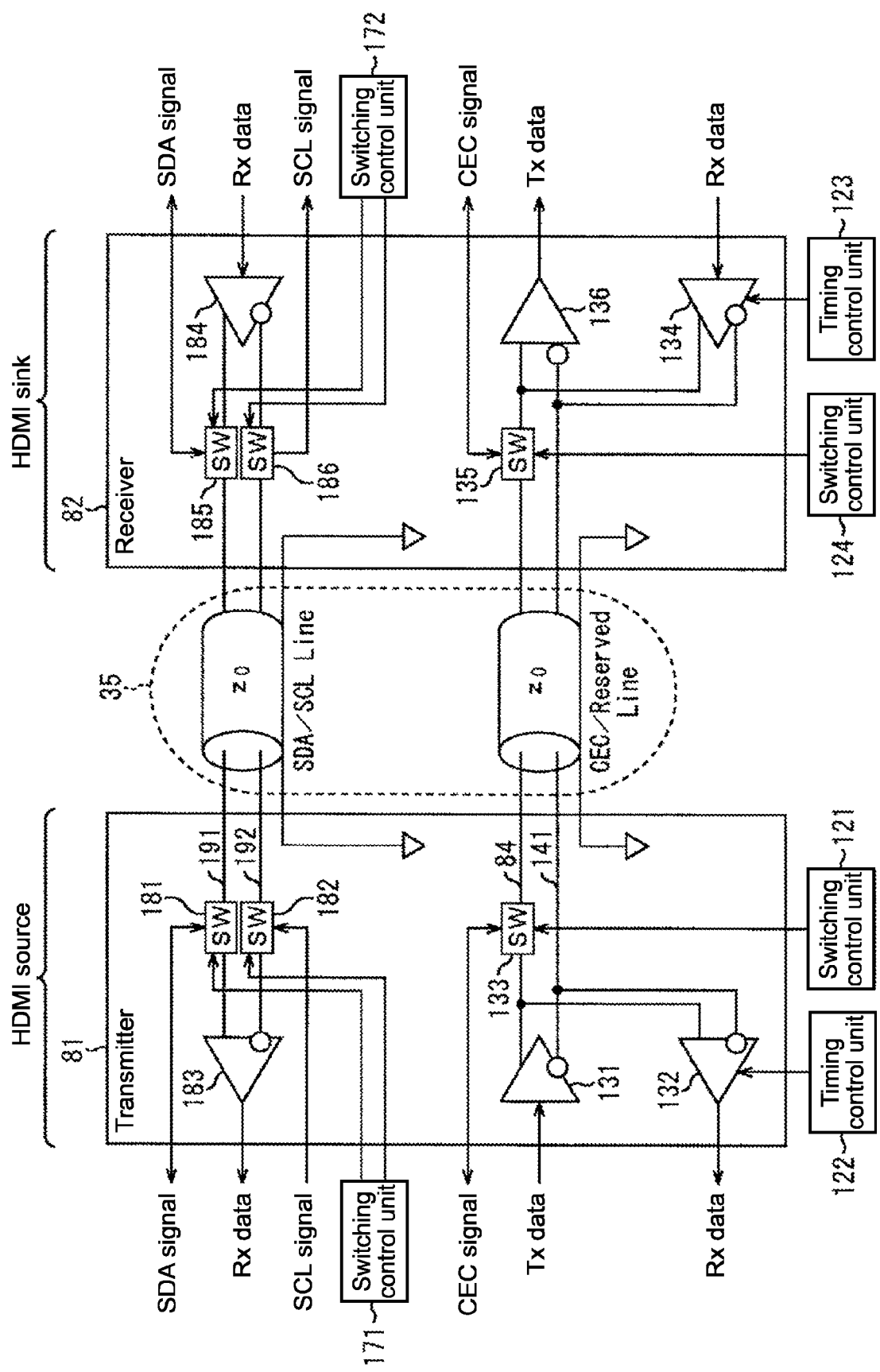
FIG. 14 A diagram showing another more-specific structural example of the HDMI® source and the HDMI® sink.

In a case where each of the HDMI® source 71 and the HDMI® sink 72 has both of the function of performing half-duplex communication and the function of performing full-duplex communication, the HDMI® source 71 and the HDMI® sink 72 are structured as shown in FIG. 14, for example. It should be noted that in FIG. 14, parts corresponding to those of FIGS. 6 and 7 are denoted by the same reference numerals, and descriptions thereof will be omitted as appropriate.

The HDMI® source 71 shown in FIG. 14 is constituted of the transmitter 81, the switching control unit 121, the timing control unit 122, and the switching control unit 971. The transmitter 81 is provided with the conversion unit 131, the decode unit 132, the switch 133, the switch 181, the switch 182, and the decode unit 183. In other words, the HDMI® source 71 of FIG. 14 has a structure in which the timing control unit 122 and the decode unit 132 of FIG. 6 are added to the HDMI® source 71 shown in FIG. 7.

Moreover, the HDMI® sink 72 shown in FIG. 14 is constituted of the receiver 82, the timing control unit 123, the switching control unit 124, and the switching control unit 972. The receiver 82 is provided with the conversion unit 134, the switch 135, the decode unit 136, the conversion unit 184, the switch 185, and the switch 186. In other words, the HDMI® sink 72 of FIG. 14 has a structure in which the timing control unit 123 and the conversion unit 134 of FIG. 6 are added to the HDMI® sink 72 shown in FIG. 7.

Next, communication processing carried out by the HDMI® source 71 and the HDMI® sink 72 shown in FIG. 14 will be described.

Figure 15:
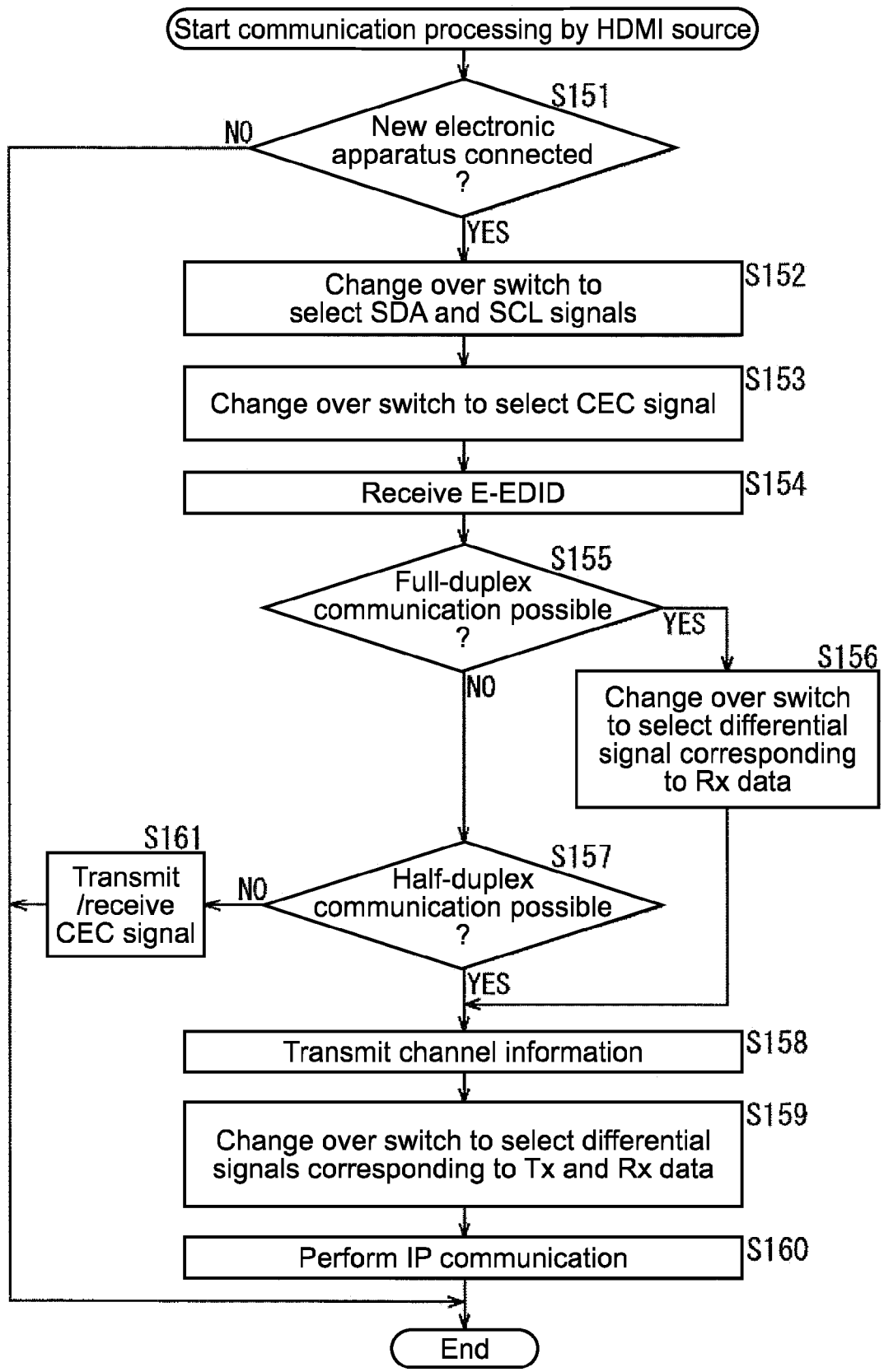
FIG. 15 A flowchart for explaining communication processing by the HDMI® source.

First, referring to the flowchart of FIG. 15, communication processing carried out by the HDMI® source 71 shown in FIG. 14 will be described. It should be noted that since processes of Steps S151 to S154 are the same as the processes of Steps S71 to S74 of FIG. 12, descriptions thereof will be omitted.

In Step S155, the HDMI® source 71 judges whether full-duplex communication with the HDMI® sink 72 is possible. In other words, the HDMI® source 71 references E-EDID received from the HDMI® sink 72 to judge whether the full-duplex flag "Full Duplex" of FIG. 9 is set.

When judged in Step S155 that full-duplex communication is possible, that is, the HDMI® sink 72 shown in FIG. 14 or 7 is connected to the HDMI® source 71, in Step S156, the switching control unit 971 controls the switch 181 and the switch 182 and switches the switch 181 and the switch 182 so that a differential signal corresponding to Rx data from the receiver 82 is selected at a time of receiving data.

On the other hand, when judged in Step S155 that full-duplex communication is not possible, in Step S157, the HDMI® source 71 judges whether half-duplex communication is possible. Specifically, the HDMI® source 71 references the received E-EDID to judge whether the half-duplex flag "Half Duplex" of FIG. 9 is set. In other words, the HDMI® source judges whether the HDMI® sink 72 shown in FIG. 6 is connected to the HDMI® source 71.

When judged in Step S157 that half-duplex communication is possible or when the switch 181 and the switch 182 are switched in Step S156, in Step S158, the HDMI® source 71 transmits channel information to the receiver 82 via the switch 133 and the CEC line 84.

Here, since the HDMI® sink 72 has the function of performing full-duplex communication when it is judged in Step S155 that full-duplex communication is possible, the HDMI® source 71 transmits to the receiver 82 via the switch 133 and the CEC line 84, as the channel information, a signal notifying that IP communication using the CEC line 84 and signal line 141 and the SDA line 191 and SCL line 192 is to be performed.

Further, since the HDMI® sink 72 has the function of performing half-duplex communication although not having the function of performing full-duplex communication when it is judged in Step S157 that half-duplex communication is possible, the HDMI® source 71 transmits to the receiver 82 via the switch 133 and the CEC line 84, as the channel information, a signal notifying that IP communication using the CEC line 84 and the signal line 141 is to be performed.

In Step S159, the switching control unit 121 controls the switch 133 and switches the switch 133 so that a differential signal corresponding to Tx data from the conversion unit 131 is selected at a time of transmitting data and a differential signal corresponding to Rx data transmitted from the receiver 82 is selected at a time of receiving data. It should be noted that when the HDMI® source 71 and the HDMI® sink 72 perform full-duplex communication, at the time data is received in the HDMI® source 71, a differential signal corresponding to Rx data is not transmitted from the receiver 82 via the CEC line 84 and the signal line 141. Therefore, the decode unit 132 is not supplied with a differential signal corresponding to Rx data.

In Step S160, the respective units of the HDMI® source 71 perform bidirectional IP communication with the HDMI® sink 72, and the communication processing is thus ended.

Specifically, when the HDMI® source 71 performs full-duplex communication with the HDMI® sink 72 and when performing half-duplex communication therewith, at a time of transmitting data, the conversion unit 131 converts Tx data supplied from the HDMI® source 71 into a differential signal, transmits one of partial signals constituting the differential signal obtained by the conversion to the receiver 82 via the switch 133 and the CEC line 84, and transmits the other one of the partial signals to the receiver 82 via the signal line 141.

Moreover, when the HDMI® source 71 performs full-duplex communication with the HDMI® sink 72, at the time of receiving data, the decode unit 183 receives the differential signal corresponding to the Rx data, that has been transmitted from the receiver 82, decodes the received differential signal into Rx data as the original data, and outputs it to the HDMI® source 71.

On the other hand, when the HDMI® source 71 performs half-duplex communication with the HDMI® sink 72, at the time of receiving data, the decode unit 132 receives the differential signal corresponding to the Rx data, that has been transmitted from the receiver 82, under control of the timing control unit 122, decodes the received differential signal into Rx data as the original data, and outputs it to the HDMI® source 71.

Accordingly, the HDMI® source 71 transmits and receives various types of data such as control data, pixel data, and audio data to/from the HDMI® sink 72.

Further, when judged in Step S157 that half-duplex communication is not possible, in Step S161, the respective units of the HDMI® source 71 transmit and receive CEC signals via the CEC line 84 to perform bidirectional communication with the HDMI® sink 72, and the communication processing is thus ended.

As described above, the HDMI® source 71 references the full-duplex flag and the half-duplex flag and performs full-duplex communication or half-duplex communication according to the function of the HDMI® sink 72 as a communication counterpart.

By thus switching the switch 133, the switch 181, and the switch 182 to select the data to be transmitted and the data to be received and performing full-duplex communication or half-duplex communication according to the function of the HDMI® sink 72 as the communication counterpart, high-speed bidirectional communication can be performed by selecting an optimal communication method while maintaining compatibility with the conventional HDMI®.

Figure 16:
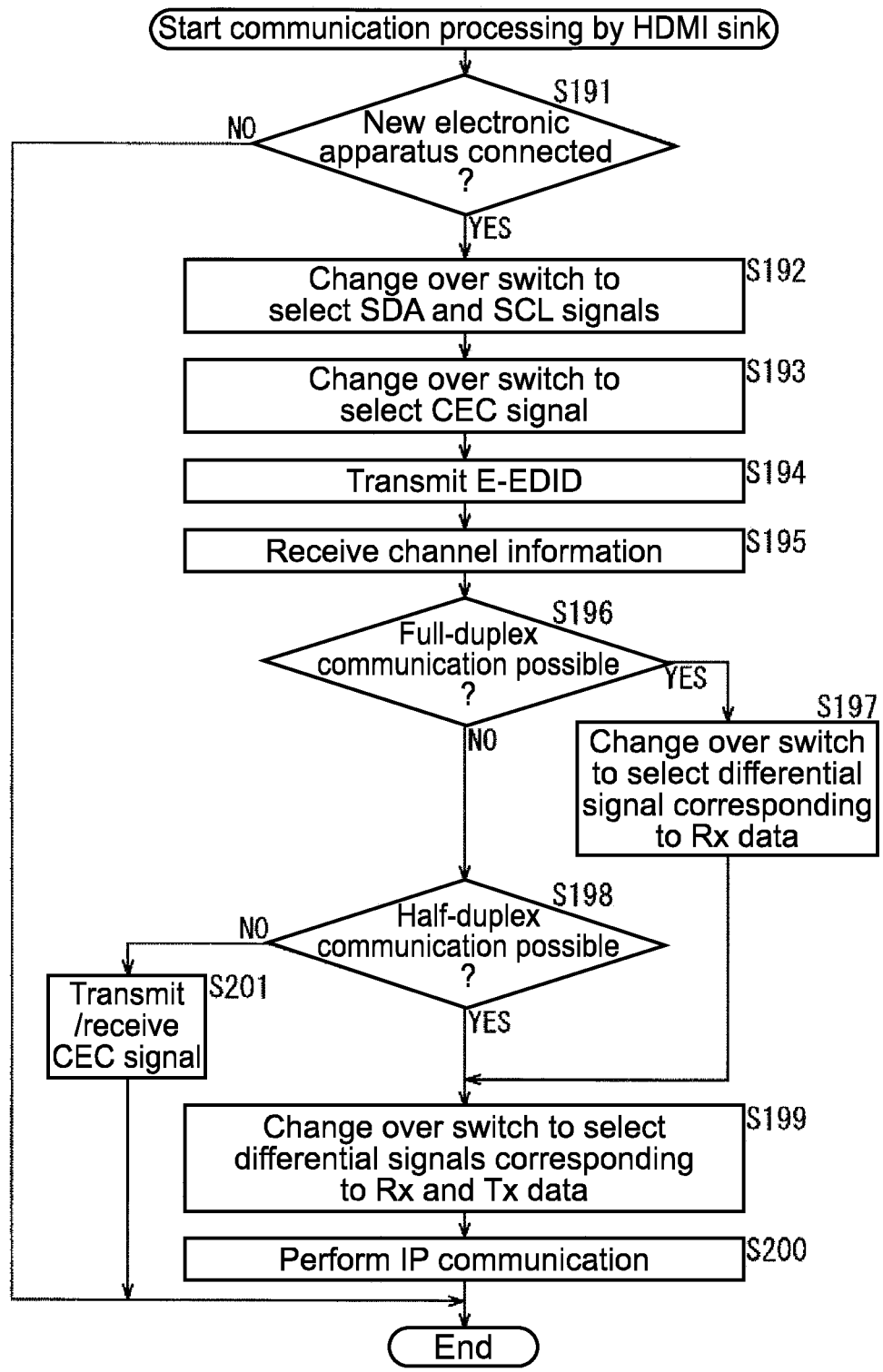
FIG. 16 A flowchart for explaining communication processing by the HDMI® sink.

Next, referring to the flowchart of FIG. 16, communication processing carried out by the HDMI® sink 72 shown in FIG. 14 will be described. It should be noted that since processes of Steps S191 to S194 are the same as the processes of Steps S111 to S114 of FIG. 13, descriptions thereof will be omitted.

In Step S195, the HDMI® sink 72 receives channel information transmitted from the HDMI® source 71 via the switch 135 and the CEC line 84. It should be noted that when the HDMI® source 71 connected to the HDMI® sink 72 does not have the function of performing full-duplex communication nor the function of performing half-duplex communication, channel information is not transmitted from the HDMI® source 71 to the HDMI® sink 72. Thus, the HDMI® sink 72 does not receive channel information.

In Step S196, the HDMI® sink 72 judges whether to perform full-duplex communication based on the received channel information. When having received channel information that notifies that IP communication using the CEC line 84 and signal line 141 and the SDA line 191 and SCL line 192 is to be performed, for example, the HDMI® sink 72 judges that full-duplex communication is to be performed.

When judged in Step S196 that full-duplex communication is to be performed, in Step S197, the switching control unit 972 controls the switch 185 and the switch 186 and switches the switch 185 and the switch 186 so that a differential signal corresponding to Rx data from the conversion unit 184 is selected at a time of transmitting data.

Further, when judged in Step S196 that full-duplex communication is not to be performed, in Step S198, the HDMI® sink 72 judges whether to perform half-duplex communication based on the received channel information. When having received channel information that notifies that IP communication using the CEC line 84 and the signal line 141 is to be performed, the HDMI® sink 72 judges that half-duplex communication is to be performed.

When judged in Step S198 that half-duplex communication is to be performed or when the switch 185 and the switch 186 are switched in Step S197, in Step S199, the switching control unit 124 controls the switch 135 and switches the switch 135 so that a differential signal corresponding to Rx data from the conversion unit 134 is selected at a time of transmitting data and a differential signal corresponding to Tx data from the transmitter 81 is selected at a time of receiving data.

It should be noted that when the HDMI® source 71 and the HDMI® sink 72 perform full-duplex communication, at the time data is transmitted in the HDMI® sink 72, a differential signal corresponding to Rx data is not transmitted from the conversion unit 134 to the transmitter 81. Thus, the switch 135 is not supplied with the differential signal corresponding to Rx data.

In Step S200, the respective units of the HDMI® sink 72 perform bidirectional IP communication with the HDMI® source 71, and the communication processing is thus ended.

Specifically, when the HDMI® sink 72 performs full-duplex communication with the HDMI® source 71, at the time of transmitting data, the conversion unit 184 converts the Rx data supplied from the HDMI® sink 72 into a differential signal, transmits one of partial signals constituting the differential signal obtained by the conversion to the transmitter 81 via the switch 185 and the SDA line 191, and transmits the other one of the partial signals to the transmitter 81 via the switch 186 and the SCL line 192.

Further, when the HDMI® sink 72 performs half-duplex communication with the HDMI® source 71, at the time of transmitting data, the conversion unit 134 converts the Rx data supplied from the HDMI® sink 72 into a differential signal, transmits one of partial signals constituting the differential signal obtained by the conversion to the transmitter 81 via the switch 135 and the CEC line 84, and transmits the other one of the partial signals to the transmitter 81 via the signal line 141.

Furthermore, when the HDMI® sink 72 performs full-duplex communication with the HDMI® source 71 and when performing half-duplex communication therewith, at the time of receiving data, the decode unit 136 receives a differential signal corresponding to Tx data, that has been transmitted from the transmitter 81, decodes the received differential signal into Tx data as the original data, and outputs it to the HDMI® sink 72.

Moreover, when judged in Step S198 that half-duplex communication is not to be performed, that is, when channel information is not received, in Step S201, the respective units of the HDMI® sink 72 transmit and receive CEC signals to perform bidirectional communication with the HDMI® source 71, and the communication processing is thus ended.

As described above, the HDMI® sink 72 performs full-duplex communication or half-duplex communication according to the received channel information, that is, the function of the HDMI® source 71 as a communication counterpart.

By thus switching the switch 135, the switch 185, and the switch 186 to select the data to be transmitted and the data to be received and performing full-duplex communication or half-duplex communication according to the function of the HDMI® source 71 as the communication counterpart, high-speed bidirectional communication can be performed by selecting an optimal communication method while maintaining compatibility with the conventional HDMI®.

Further, by connecting the HDMI® source 71 and the HDMI® sink 72 by the HDMI® cable 35 including the CEC line and signal line 141 that are mutually connected as a differential twist pair, shielded, and grounded to a ground line and the SDA line 191 and SCL line 192 that are mutually connected as a differential twist pair, shielded, and grounded to a ground line, high-speed bidirectional IP communication that uses a half-duplex communication system or a full-duplex communication system can be performed while maintaining compatibility with the conventional HDMI® cable.

As described above, by selecting data to be transmitted out of one or a plurality of pieces of data to be transmitted and transmitting the selected data to a communication counterpart via a predetermined signal line, and by selecting data to be received out of one or a plurality of pieces of data to be received that is/are transmitted from the communication counterpart and receiving the selected data, high-speed bidirectional IP communication can be performed between the HDMI® source 71 and the HDMI® sink 72 via the HDMI® cable 35 while maintaining compatibility as an HDMI®, that is, while allowing pixel data of an uncompressed picture to be transmitted unidirectionally at high speed from the HDMI® source 71 to the HDMI® sink 72.

As a result, in a case where a source apparatus as an electronic apparatus that incorporates the HDMI® source 71, such as the reproducing apparatus 33 shown in FIG. 2, has a function as a server of a DLNA (Digital Living Network Alliance) or the like and a sink apparatus as an electronic apparatus that incorporates the HDMI® sink 72, such as the digital television receiver 31 shown in FIG. 2, has a communication interface for a LAN such as the Ethernet (registered trademark), it is possible to transmit, through bidirectional IP communication via an electronic apparatus such as the amplifier 32 connected directly or via an HDMI® cable, a content from the source apparatus to the sink apparatus via the HDMI® cable and also transmit a content from the source apparatus, from the sink apparatus to another apparatus (e.g., digital television receiver 34 shown in FIG. 2) connected to the LAN communication interface of the sink apparatus.

Furthermore, by the bidirectional IP communication between the HDMI® source 71 and the HDMI® sink 72, control commands and responses can be exchanged at high speed between the source apparatus incorporating the HDMI® source 71 and the sink apparatus incorporating the HDMI® sink 72, which are connected by the HDMI® cable 35, and quick-response inter-apparatus control thus becomes possible.

The series of processes described above may be realized by dedicated hardware or software. When the series of processes are realized by software, a program constituting that software is installed in, for example, a microcomputer that controls the HDMI® source 71 and the HDMI® sink 72.

Figure 17:
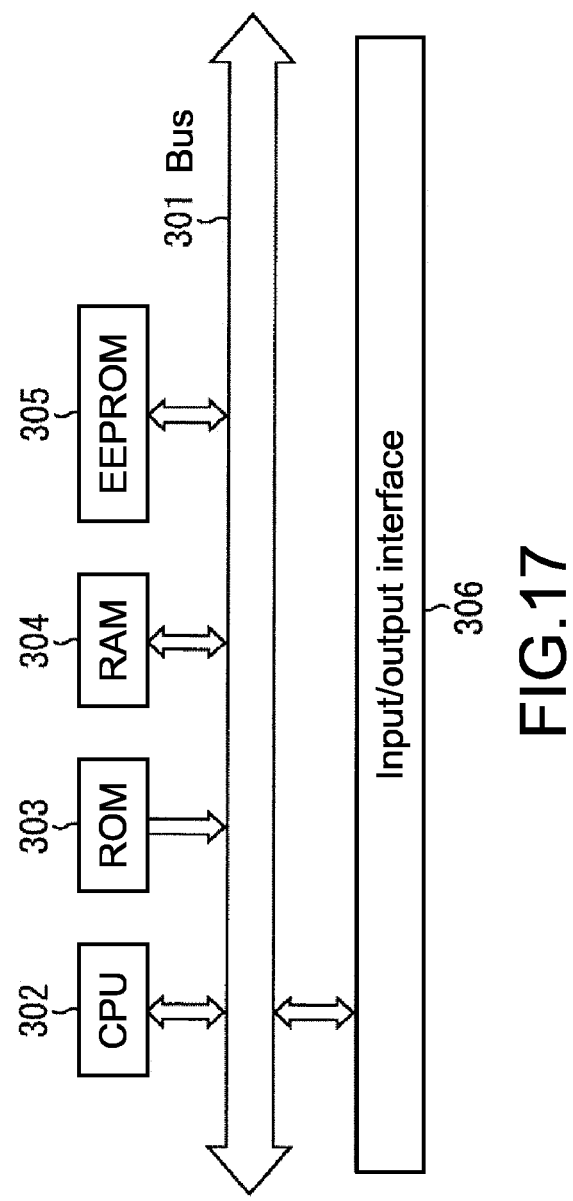
FIG. 17 A block diagram showing a structural example of a computer according to an embodiment to which the present invention is applied.

In this regard, FIG. 17 shows a structural example of an embodiment of a computer in which a program for executing the series of processes described above is installed.

The program can be recorded in advance in an EEPROM (Electrically Erasable Programmable Read-only Memory) 305 or a ROM 303 as a built-in recording medium of a computer.

Alternatively, the program can be stored (recorded) temporarily or permanently in a removable recording medium such as a flexible disc, a CD-ROM (Compact Disc Read Only Memory), an MO (Magneto Optical) disc, a DVD (Digital Versatile Disc), a magnetic disk, and a semiconductor memory. Such a removable recording medium can be provided as so-called package software.

It should be noted that in addition to being installed in a computer from the removable recording medium as described above, the program may be transferred wirelessly to a computer from a download site via a satellite for digital satellite broadcast or transferred to the computer by wire via a network such as a LAN and the Internet so that the computer can receive the thus-transferred program by an input/output interface 306 and install it in the built-in EEPROM 305.

The computer includes a built-in CPU (Central Processing Unit) 302. The input/output interface 306 is connected to the CPU 302 via a bus 301, and the CPU 302 loads the program stored in the ROM (Read Only Memory) 303 or the EEPROM 305 into a RAM (Random Access Memory) 304 and executes it. Accordingly, the CPU 302 carries out the processing according to the flowcharts described above or processing carried out by the structures in the block diagrams described above.

Here, in the specification, process steps that describe a program for causing a computer to execute various types of processing do not necessarily need to be processed in time-series along a sequence described in the flowchart, and processes that are executed in parallel or individually (e.g., parallel process or process by object) are also included.

Moreover, the program may be processed by a single computer or may be processed dispersively by a plurality of computers.

In this embodiment, bidirectional IP communication is performed between the HDMI® source 71 and the HDMI® sink 72 by controlling a timing of selecting data and a reception timing and transmission timing of a differential signal as necessary. However, bidirectional communication may instead be performed by a protocol other than the IP.

It should be noted that the embodiment of the present invention is not limited to the above embodiment, and various modifications may be made without departing from the gist of the present invention.

According to the above embodiment, bidirectional communication can be performed. In particular, it is possible to perform high-speed bidirectional communication while maintaining compatibility in a communication interface capable of unidirectionally transmitting pixel data of an uncompressed picture and audio data associated with that picture at high speed, for example.

Incidentally, although some parts overlap the technique that has already been described above, many audio/video apparatuses are implemented with a LAN communication function for the purposes of bidirectional program viewing, high-level remote control, a reception of an electronic program guide, and the like.

As means for forming a network among the audio/video apparatuses, there are options including laying of a dedicated cable such as CAT5, wireless communication, and lamp line communication.

However, a dedicated cable makes an inter-apparatus connection complex, and a wireless or lamp line connection is disadvantageous in that a complex modulation circuit and transceiver are expensive.

In this regard, in the above embodiment, there is disclosed a technique of adding a LAN communication function without adding a new connector electrode to the HDMI.

Since the HDMI is an interface for performing video and audio data transmissions, a replacement and authentication of connected apparatus information, and communication of apparatus control data by using one cable, an advantage that LAN communication can be performed with an addition of the LAN function, without using a dedicated cable or wireless communication, is large.

Incidentally, in the technique disclosed as the above embodiment, the differential transmission channel used in the LAN communication is used for the replacement and authentication of connected apparatus information and communication of apparatus control data.

In the HDMI, connected apparatus electric characteristics are severely restricted in terms of a parasitic capacitance and an impedance with respect to both the DDC that performs a replacement and authentication of connected apparatus information and the CEC that performs communication of apparatus control data.

Specifically, a DDC terminal parasitic capacitance of an apparatus is required to be 50 pF or less. The connection terminal is required to be grounded to ground GND at 200Ω or less at a time of LOW output and connected by pull-up to a power source at about 2 kΩ in a HIGH state.

On the other hand, transmission/reception terminals are required to be terminated at at least about 100Ω in a high frequency range in order to stabilize communication in LAN communication for transmitting a high-speed signal.

Figure 19:
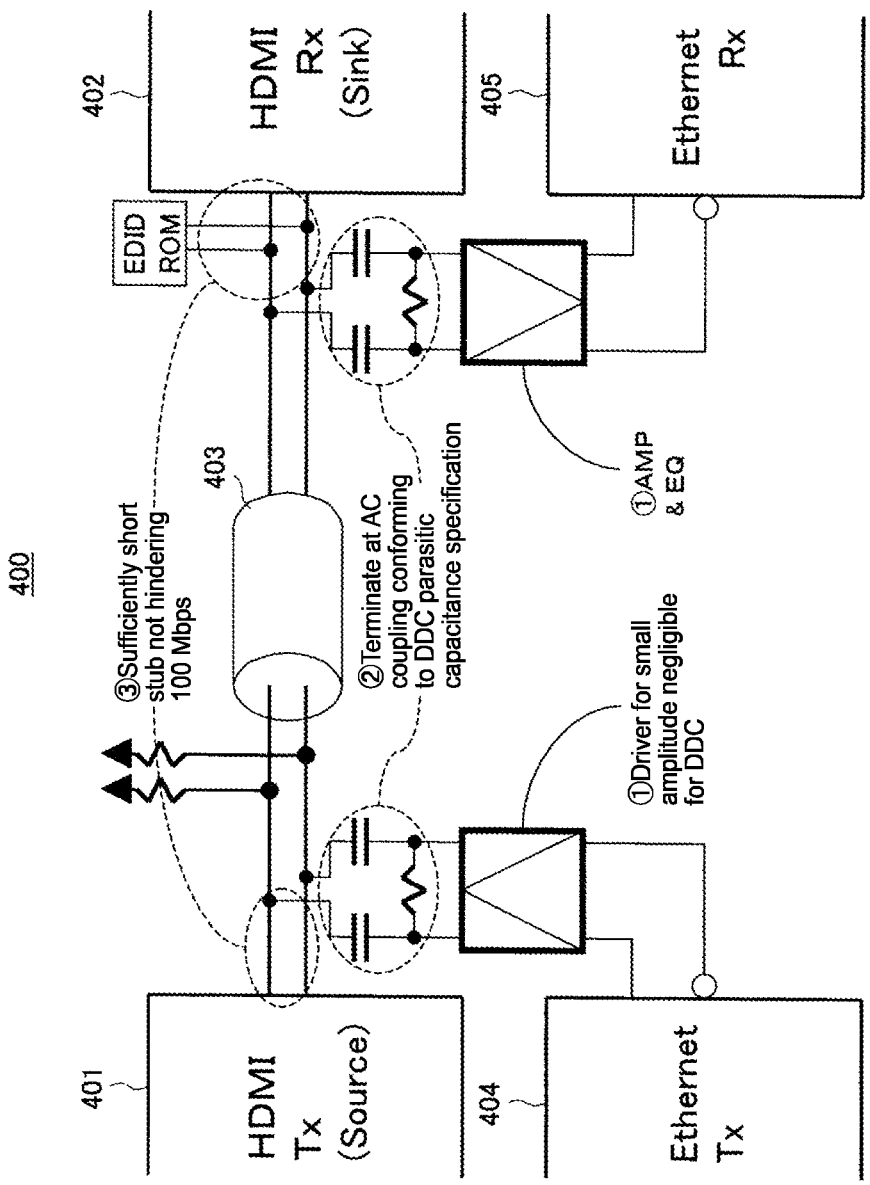
FIG. 19 A diagram showing a structural example of the system when using the Ethernet (registered trademark).

FIG. 19 shows a state where a transmitter 404 and a transmitter 405 for LAN communication, that are constantly connected to DDC lines of an existing HDMI source apparatus 401 and sink apparatus 402, are AC-coupled.

In order to satisfy the DDC parasitic capacitance restrictions, it is required for a LAN transmitter/receiver circuit added to the DDC lines to have AC coupling via a sufficiently small capacitance. Since a LAN signal is largely attenuated and distorted, there is a fear that the transmitter/receiver circuit for compensating this may become complex and expensive.

A transition between HIGH and LOW during DDC communication may hinder LAN communication. In other words, there is a fear that the LAN does not function during a DDC communication period.

In this regard, hereinafter, as a more preferable embodiment, descriptions will be given on a communication system having characteristics that, in an interface that performs video and audio data transmissions, a replacement and authentication of connected apparatus information, communication of apparatus control data, and LAN communication by using basically one cable, the LAN communication is performed by bidirectional communication via a pair of differential transmission channels and a connection state of the interface is notified based on a DC bias potential of at least one of the transmission channels.

The technique described below does not necessarily need to have a selection unit as in the above embodiment.

Figure 18:
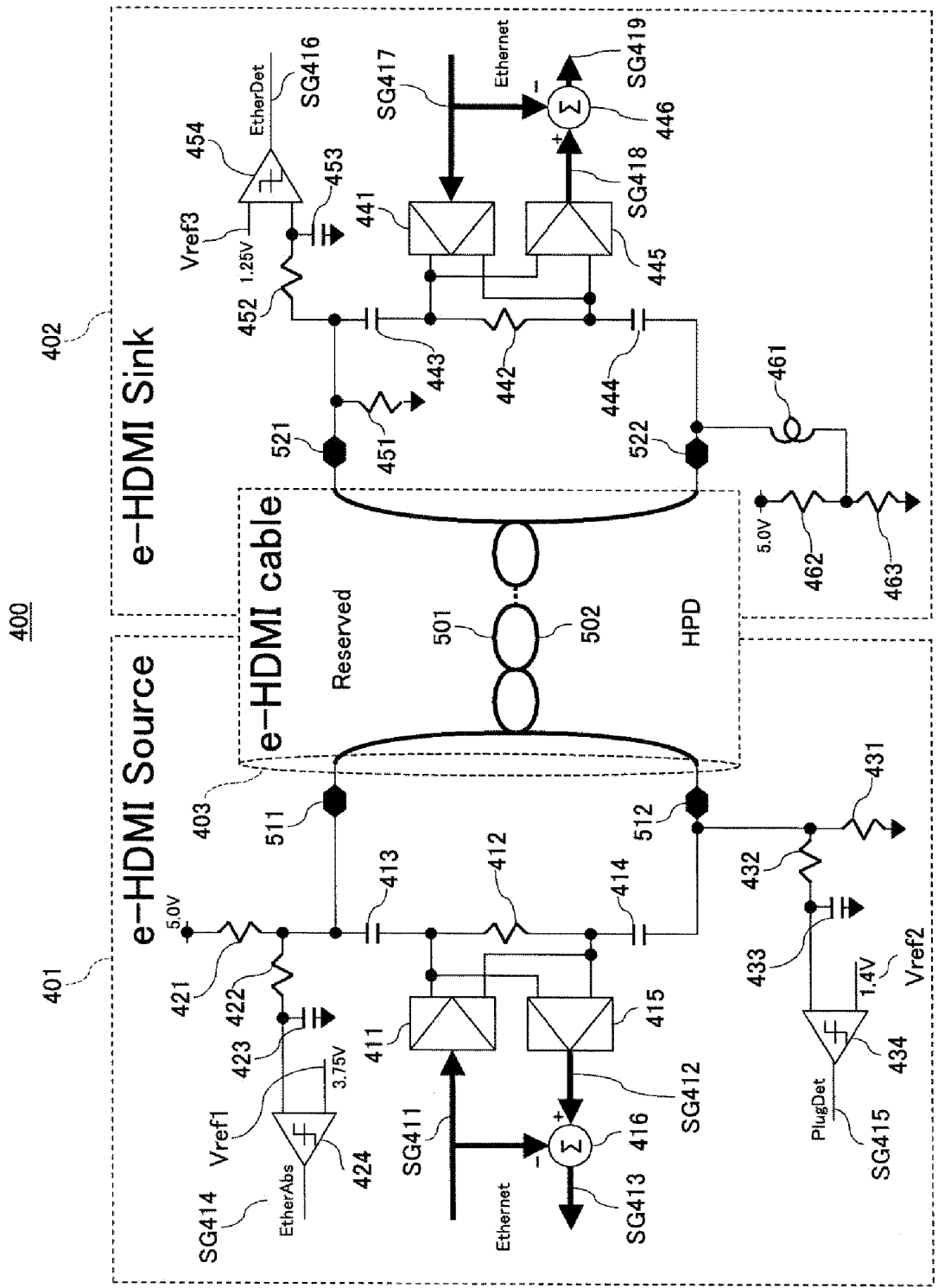
FIG. 18 A circuit diagram showing a first structural example of a communication system in which a connection state of an interface is notified based on a DC bias potential of at least one of transmission channels.

FIG. 18 is a circuit diagram showing a first structural example of the communication system in which a connection state of the interface is notified based on a DC bias potential of at least one of the transmission channels.

FIG. 19 is a diagram showing a structural example of the system in a case where the Ethernet (registered trademark) is used.

As shown in FIG. 18, a communication system 400 is constituted of a LAN function expansion HDMI (hereinafter, abbreviated to EH) source apparatus 401, an EH sink apparatus 402, an EH cable 403 for connecting the EH source apparatus and the EH sink apparatus, an Ethernet (registered trademark) transmitter 404, and an Ethernet (registered trademark) receiver 405.

The EH source apparatus 401 includes a LAN signal transmitter circuit 411, a terminating resistor 412, AC coupling capacitors 413 and 414, a LAN signal receiver circuit 415, a subtracting circuit 416, a pull-up resistor 421, a resistor 422 and a capacitor 423 forming a low-pass filter, a comparator 424, a pull-down resistor 431, a resistor 432 and a capacitor 433 forming a low-pass filter, and a comparator 434.

The EH sink apparatus 402 includes a LAN signal transmitter circuit 441, a terminating resistor 442, AC coupling capacitors 443 and 444, a LAN signal receiver circuit 445, a subtracting circuit 446, a pull-down resistor 451, a resistor 452 and a capacitor 453 forming a low-pass filter, a comparator 454, a choke coil 461, and resistors 462 and 463 serially connected between a power source potential and a reference potential.

Provided in the EH cable 403 are differential transmission channels constituted of a reserved line 501 and an HPD Line 502, and a source-side terminal 511 of the reserved line 501, a source-side terminal 512 of the HPD Line 502, a sink-side terminal 521 of the reserved line 501, and a sink-side terminal 522 of the HPD line are formed. The reserved line 501 and the HPD line 502 are connected as a differential twist pair.

In this case, the source-side terminal 511 of the reserved line 501 and the source-side terminal 512 of the HPD Line 502 function as a second channel unit. Moreover, the sink-side terminal 521 of the reserved line 501 and the sink-side terminal 522 of the HPD Line function as a fourth channel unit.

In the communication system 400 having the structure as described above, the terminals 511 and 512 are connected to the terminating resistor 412, the LAN signal transmitter circuit 411, and the LAN signal receiver circuit 415 via the AC coupling capacitors 413 and 414 in the source apparatus 401.

The subtracting circuit 416 receives a sum signal SG417 of a transmission signal voltage generated by a current output from the LAN signal transmitter circuit 411 with the terminating resistor 412 and transmission channels 501 and 502 as a load, and a reception signal voltage as a signal transmitted from the EH sink apparatus 402.

In the subtracting circuit 416, a signal SG413 obtained by subtracting a transmission signal SG411 from the sum signal SG412 is a net signal transmitted from the sink.

The sink apparatus 402 has a similar circuit network, and by those circuits, the source apparatus 4011 and the sink apparatus 402 perform bidirectional LAN communication.

In addition to the LAN communication described above, the HPD line 502 notifies the source apparatus 401 that the cable 403 has been connected to the sink apparatus 402 by a DC bias level.

The resistors 462 and 463 and the choke coil 461 of the sink apparatus 402 bias the HPD line 502 to about 4 V via the terminal 522 when the cable 403 is connected to the sink apparatus 402.

The source apparatus 401 extracts a DC bias of the HPD line 502 by the low-pass filter constituted of the resistor 432 and the capacitor 433, and the comparator 434 compares it with a reference potential Vref2 (e.g., 1.4 V).

If the cable 403 is not connected to the source apparatus 402, a potential of the terminal 512 is lower than the reference potential Vref2 at the pull-down resistor 431 and is higher if connected.

Therefore, if an output signal SG415 of the comparator 434 is HIGH, it indicates that the cable 403 is connected to the sink apparatus 402.

On the other hand, if the output signal SG415 of the comparator 434 is LOW, it indicates that the cable 403 is not connected to the sink apparatus 402.

In the first structural example, there is additionally provided a function of mutually recognizing, from a DC bias potential of the reserved line 501, which of an EH-compliant apparatus and a non-EH-compliant HDMI apparatus the apparatuses connected at both ends of the cable 403 are.

The EH source apparatus 401 pulls up (+5 V) the reserved line 501 by the resistor 421, and the EH sink apparatus 402 pulls it down by the resistor 451.

These resistors 421 and 451 do not exist in the non-EH-compliant apparatus.

The comparator 424 of the EH source apparatus 401 compares a DC potential of the reserved line 501 that has passed through the low-pass filter constituted of the resistor 422 and capacitor 423 with a reference voltage Vref1.

If the sink apparatus 402 supports EH and has a pull down, the potential of the reserved line 501 becomes 2.5 V, and if not supporting EH and is opened, the potential becomes 5 V. Therefore, if the reference potential Vref1 is set to 3.75 V, it is possible to make a distinction between a compliant sink apparatus and a non-compliant sink apparatus.

The comparator 454 of the sink apparatus 402 compares a DC potential of the reserved line 501 that has passed through the low-pass filter constituted of the resistor 452 and the capacitor 453 with a reference voltage Vref3.

If the source apparatus 402 supports EH and has a pull-up function, the potential becomes 2.5 V, and if not supporting EH, the potential becomes 0 V. Therefore, if the reference potential is set to 1.25 V, it is possible to make a distinction between an EH-compliant apparatus and a non-EH-compliant apparatus.

As described above, according to the first structural example, in the interface that performs video and audio data transmissions, a replacement and authentication of connected apparatus information, communication of apparatus control data, and LAN communication by using one cable 403, the LAN communication is performed by bidirectional communication via a pair of differential transmission channels, and a connection state of the interface is notified by a DC bias potential of at least one of the transmission channels. Therefore, it becomes possible to perform spatial separation in which the SCL line and the SDA line are not physically used in LAN communication.

As a result, due to the division, a LAN communication circuit can be formed irrespective of an electrical specification defined for DDC, with the result that stable and reliable LAN communication can be realized at a low cost.

It should be noted that it is also possible to provide the pull-up resistor 421 shown in FIG. 18 in the EH cable 403 instead of the EH source apparatus 401. In such a case, terminals of the pull-up resistor 421 are respectively connected to the reserved line 501 and a line (signal line) connected to a power source (power source potential) out of the lines provided in the EH cable 403.

Furthermore, it is also possible to provide the pull-down resistor 451 and the resistor 463 shown in FIG. 18 in the EH cable 403 instead of the EH sink apparatus 402. In such a case, terminals of the pull-down resistor 451 are respectively connected to the reserved line 501 and a line connected to the ground (reference potential) (ground line) out of the lines provided in the EH cable 403. Also, terminals of the resistor 463 are respectively connected to the HPD Line 502 and the line connected to the ground (reference potential) (ground line) out of the lines provided in the EH cable 403.

Figure 20:
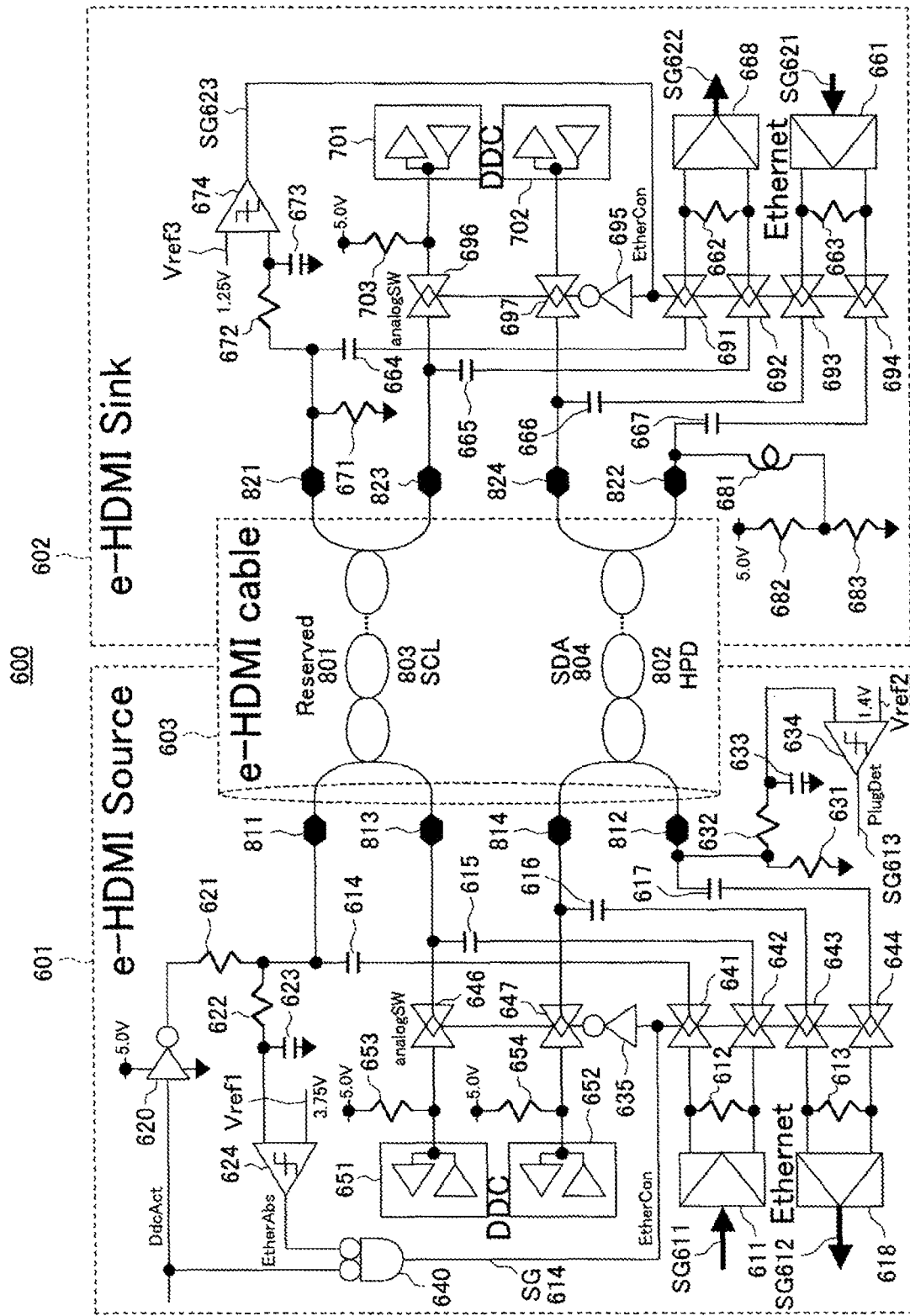
FIG. 20 A circuit diagram showing a second structural example of the communication system in which the connection state of the interface is notified based on a DC bias potential of at least one of the transmission channels.

FIG. 20 is a circuit diagram showing a second structural example of the communication system in which a connection state of the interface is notified by a DC bias potential of at least one of the transmission channels.

Fundamentally similar to the first structural example, a communication system 600 is characterized by having a structure in which, in an interface that performs video and audio data transmissions, a replacement and authentication of connected apparatus information, communication of apparatus control data, and LAN communication by using one cable, the LAN communication is performed by unidirectional communication via two pairs of differential transmission channels, and a connection state of the interface is notified by a DC bias potential of at least one of the transmission channels, and that at least two transmission channels are used time-divisionally with the LAN communication, for communication for the replacement and authentication of connected apparatus information.

As shown in FIG. 20, the communication system 600 is constituted of a LAN function expansion HDMI (hereinafter, abbreviated to EH) source apparatus 601, an EH sink apparatus 602, and an EH cable 603 for connecting the EH source apparatus and the EH sink apparatus.

The EH source apparatus 601 includes a LAN signal transmitter circuit 611, terminating resistors 612 and 613, AC coupling capacitors 614 to 617, a LAN signal receiver circuit 618, an inverter 620, a resistor 621, a resistor 622 and a capacitor 623 forming a low-pass filter, a comparator 624, a pull-down resistor 631, a resistor 632 and a capacitor 633 forming a low-pass filter, a comparator 634, a NOR gate 640, analog switches 641 to 644, an inverter 635, analog switches 646 and 747, DDC transceivers 651 and 652, and pull-up resistors 653 and 654.

The EH sink apparatus 602 includes a LAN signal transmitter circuit 661, terminating resistors 662 and 663, AC coupling capacitors 664 to 667, a LAN signal receiver circuit 668, a pull-down resistor 671, a resistor 672 and a capacitor 673 forming a low-pass filter, a comparator 674, a choke coil 681, resistors 682 and 683 serially connected between a power source potential and a reference potential, analog switches 691 to 694, an inverter 695, analog switches 696 and 697, DDC transceivers 701 and 702, and a pull-up resistor 703.

Provided in the EH cable 603 are differential transmission channels constituted of a reserved line 801 and an SCL line 803 and differential transmission channels constituted of an SDA line 804 and an HPD line 802, and source-side terminals 811 to 814 thereof and sink-side terminals 821 to 824 are formed.

The reserved line 801 and SCL line 803 and the SDA line 804 and HPD line 802 are connected as differential twist pairs. The terminals 811 to 814 connected thereto function as the second channel unit.

In the communication system 600 structured as described above, the terminals 811 and 813 are connected to the transmitter circuit 611 for transmitting a LAN transmission signal SG611 to the sink and the terminating resistor 612 via the AC coupling capacitors 614 and 615 and the analog switches 641 and 642, in the source apparatus 601.

The terminals 814 and 812 are connected to the receiver circuit 618 for receiving a LAN signal from the sink apparatus 602 and the terminating resistor 613 via the AC coupling capacitors 616 and 617 and the analog switches 643 and 644.

In the sink apparatus 602, the terminals 821 to 824 are connected to the transmitter and receiver circuits 668 and 661 and the terminating resistors 662 and 663 via the AC coupling capacitors 664, 665, 666, and 667 and the analog switches 691 to 694.

The analog switches 641 to 644 and 691 to 694 are turned on when LAN communication is performed and opened when DDC communication is performed.

The source apparatus 601 connects the terminals 813 and 814 to the DDC transceivers 651 and 652 and the pull-up resistors 653 and 654 via other analog switches 646 and 647.

The sink apparatus 602 connects the terminals 823 and 824 to the DDC transceivers 701 and 702 and the pull-up resistor 703 via the analog switches 696 and 697.

The analog switches 646, 647, 696, and 697 are turned on when DDC communication is performed and opened when DLAN communication is performed.

A recognition mechanism of an EH-compliant apparatus based on a potential of the reserved line 801 is basically the same as that of the first structural example except that the resistor 62 of the source apparatus 601 is driven by the inverter 620.

When an input to the inverter 620 is HIGH, the resistor 621 becomes a pull-down resistor, thus providing a 0 V state which is the same as a case where a non-EH-compliant apparatus is connected as seen from the sink apparatus 602.

Consequently, a signal SG623 indicating an EH compliance identification result of the sink apparatus 602 becomes LOW, the analog switches 691 to 694 controlled by the signal SG623 are opened, and the analog switches 696 and 697 controlled by a signal obtained by inverting the signal SG623 by the inverter 695 are turned on.

As a result, the sink apparatus 602 enters a state where the SCL line 803 and the SDA line 804 are disconnected from the LAN transceiver and connected to the DDC transceiver.

On the other hand, in the source apparatus 601, an input to the inverter 620 is also input to the NOR gate 640, and an output SG614 thereof is set to LOW.

The analog switches 641 to 6444 controlled by the output signal SG614 of the NOR gate 640 are opened, and the analog switches 646 and 647 controlled by a signal obtained by inverting the signal SG614 by the inverter 645 are turned on.

As a result, the source apparatus 601 also enters a state where the SCL line 803 and the SDA line 804 are disconnected from the LAN transceiver and connected to the DDC transceiver.

Conversely, when an input to the inverter 620 is LOW, both the source apparatus 601 and the sink apparatus 602 enter a state where the SCL line 803 and the SDA line 804 are disconnected from the DDC transceiver and connected to the LAN transceiver.

The circuits 631 to 634 and 681 to 683 for confirming the connection based on a DC bias potential of the HPD line 802 have the same functions as those of the first structural example.

In other words, in addition to the LAN communication described above, the HPD Line 802 notifies the source apparatus 601 that the cable 803 has been connected to the sink apparatus 602 by a DC bias level.

The resistors 682 and 683 and the choke coil 681 of the sink apparatus 602 bias the HPD line 802 to about 4 V via the terminal 822 when the cable 603 is connected to the sink apparatus 602.

The source apparatus 601 extracts a DC bias of the HPD line 802 by the low-pass filter constituted of the resistor 632 and the capacitor 633, and the comparator 634 compares it with the reference potential Vref2 (e.g., 1.4 V).

If the cable 603 is not connected to the source apparatus 602, a potential of the terminal 812 is lower than the reference potential Vref2 at the pull-down resistor 631 and is higher if connected.

Therefore, if an output signal SG613 of the comparator 634 is HIGH, it indicates that the cable 803 is connected to the sink apparatus 602.

On the other hand, if the output signal SG613 of the comparator 634 is LOW, it indicates that the cable 603 is not connected to the sink apparatus 602.

As described above, according to the second structural example, in the interface that performs video and audio data transmissions, a replacement and authentication of connected apparatus information, communication of apparatus control data, and LAN communication by using one cable, the LAN communication is performed by unidirectional communication via two pairs of differential transmission channels, and a connection state of the interface is notified by a DC bias potential of at least one of the transmission channels, and further, at least two transmission channels are used time-divisionally with LAN communication, for communication for the replacement and authentication of connected apparatus information. Therefore, it is possible to perform a time division to obtain a time slot in which the SCL line and the SDA line are connected to a LAN communication circuit and a time slot in which they are connected to a DDC circuit by a switch and form a LAN communication circuit irrespective of the electrical specification defined for DDC by this division, with the result that stable and reliable LAN communication can be realized at a low cost.

It should be noted that it is also possible to provide the resistor 621 shown in FIG. 20 in the EH cable 603 instead of the EH source apparatus 601. In such a case, terminals of the resistor 621 are respectively connected to the reserved line 801 and a line (signal line) connected to a power source (power source potential) out of the lines provided in the EH cable 603.

Furthermore, it is also possible to provide the pull-down resistor 671 and the resistor 683 shown in FIG. 20 in the EH cable 603 instead of the EH sink apparatus 602. In such a case, terminals of the pull-down resistor 671 are respectively connected to the reserved line 801 and a line connected to the ground (reference potential) (ground line) out of the lines provided in the EH cable 603. Also, terminals of the resistor 683 are respectively connected to the HPD Line 802 and the line connected to the ground (reference potential) (ground line) out of the lines provided in the EH cable 603.

As described heretofore, in the embodiment associated with FIGS. 2 to 17, out of 19 HDMI pins, SDA and SCL are used as a first differential pair, and CEC and Reserved are used as a second pair to thus realize full duplex communication in which unidirectional communication is performed by each pair.

However, for SDA and SCL, H is pull-up of 1.5 KΩ and L is pull-down of a low impedance. Also for CEC, H is pull-up of 27 KΩ and L is pull-down of a low impedance.

Retaining these functions in order to have compatibility with the existing HDMI may lead to a fear that it becomes difficult to share a function of the LAN for performing high-speed data communication which is required to have ends of transmission channels matched and terminated.

In this regard, in the first structural example, full duplex communication is realized by one-pair bidirectional communication using Reserved and HPD as a differential pair while avoiding the use of SDA, SCL, and CEC lines.

Since HPD is a flag signal based on a DC level, injection of a LAN signal by AC coupling and transmission of plug information based on a DC level are compatible. Newly added to Reserved is a function of mutually recognizing a terminal having a LAN function by a DC level using a method similar to HPD.

In the second structural example, HPD and SDA, and SCL and Reserved make two pairs of differential pairs to realize two-pair full duplex communication in which unidirectional communication is performed by each pair.

Timings of burst-like DDC communication that uses SDA and SCL in the HDMI are controlled with the transmitter being a master at all times.

In this example, analog switches are operated so that, when a transmitter performs DDC communication, SDA and SCL lines are connected to the DDC transceiver, and when DDC communication is not performed, the lines are connected to the LAN transceiver.

These switch operation signals are also transmitted to a receiver at a DC level of the Reserved line, and a similar SW switch is performed on the receiver side.

By adopting the structure described above, as a first effect, SCL, SDA, and CEC communication is not influenced by noises in LAN communication and stable DDC and CEC communication can constantly be secured.

This is achieved by physically separating the LAN from those lines in the first structural example and cutting off a LAN signal from the lines by the switches during DDC communication in the second structural example.

As a second effect, it becomes possible to perform stable communication having a large margin because LAN communication is performed by lines having ideal terminations.

This is because, in the first structural example, since a LAN signal is superimposed on lines like Reserved and HPD that transmit a signal only at a DC level, a terminating impedance can be maintained at an ideal value in a sufficiently broad frequency band necessary for LAN communication, and in the second structural example, terminating circuits for the LAN unpermitted for DDC communication are connected by the switches only during LAN communication.

FIGS. 21A to 21E are diagrams showing bidirectional communication waveforms in the communication system of the structural examples.

Figure 21:
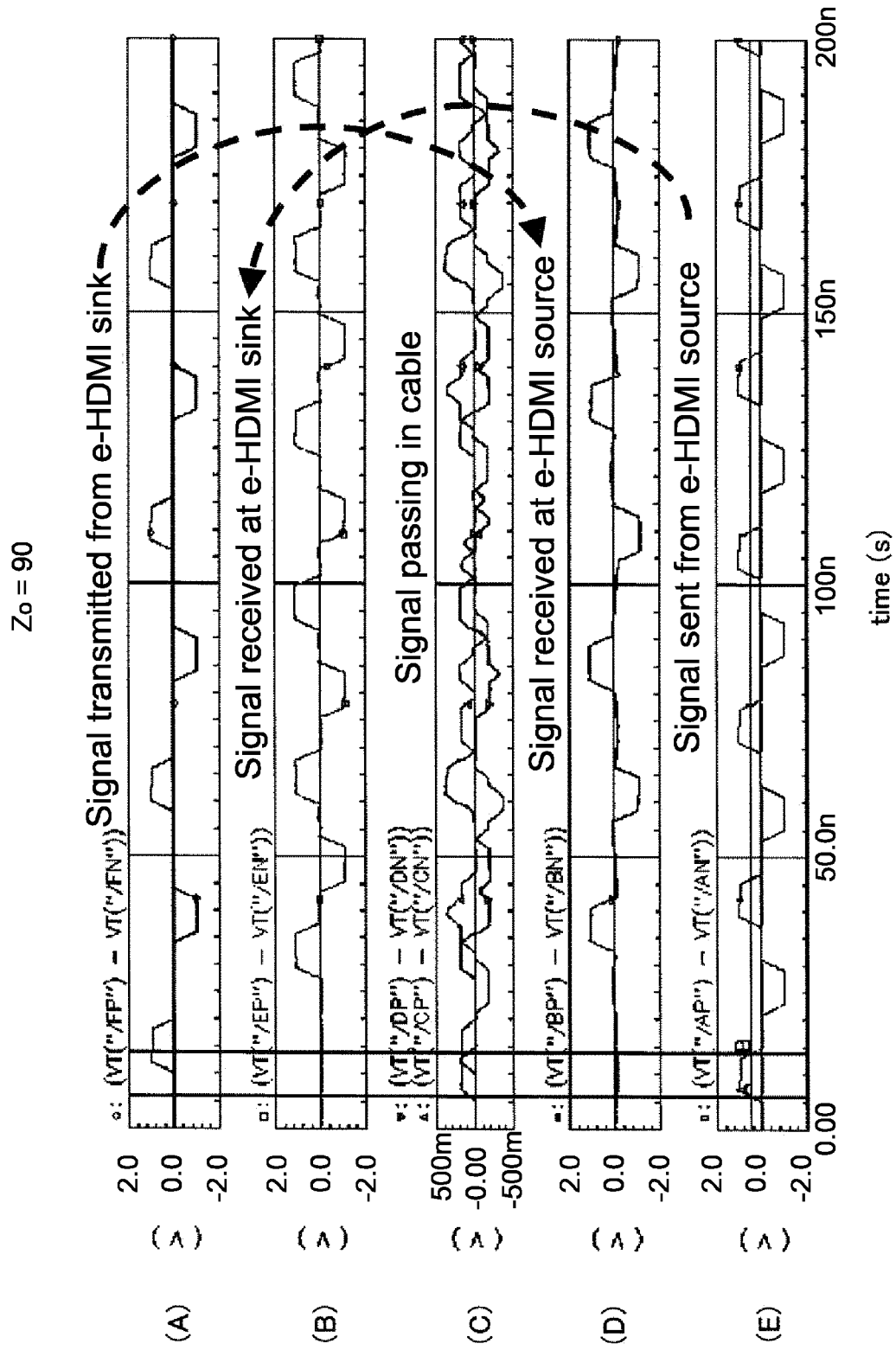
FIG. 21 Diagrams showing a bidirectional communication waveform in the communication system of the structural example.

FIG. 21A shows a signal waveform transmitted from an EH sink apparatus, FIG. 21B shows a signal waveform received by the EH sink apparatus, FIG. 21C shows a signal waveform passing through a cable, FIG. 21D shows a signal received by an EH source apparatus, and FIG. 21E shows a signal waveform transmitted from the EH source apparatus.

Figure 22:
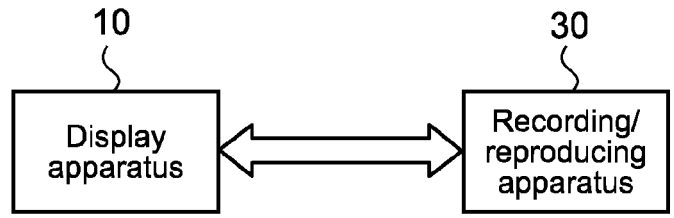
FIG. 22 A block diagram showing a structural example of a system according to a first embodiment of the present invention.

FIG. 22 is a diagram showing a structure of a video program viewing system according to an embodiment of the present invention.

This video program viewing system includes a display apparatus 10 and a recording/reproducing apparatus 30 capable of transmitting video data to the display apparatus 10, for example. The display apparatus 10 is typically a television receiver and is connected to the recording/reproducing apparatus 30 by a transmission line 1 of an HDMI® standard.

Figure 23:
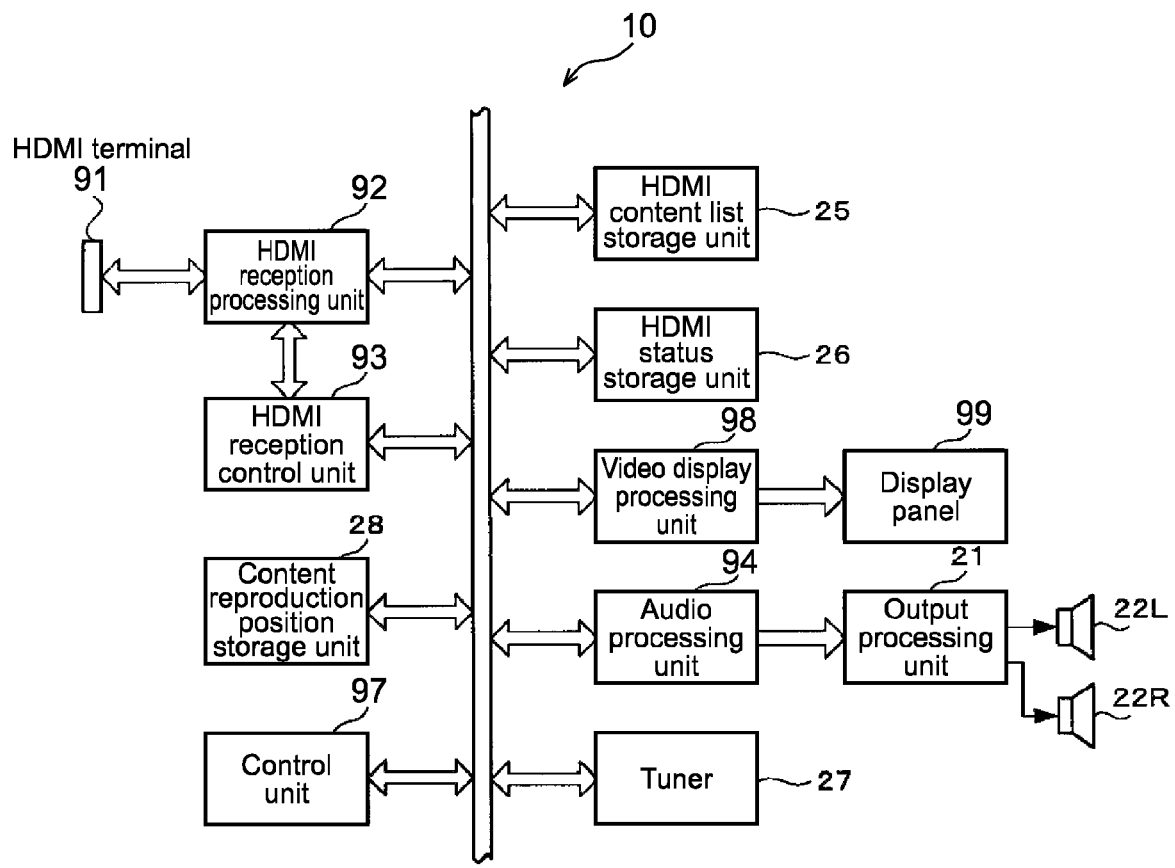
FIG. 23 A block diagram showing a structural example of a display apparatus according to the first embodiment of the present invention.

FIG. 23 is a diagram showing a structural example of the display apparatus 10. The display apparatus 10 structured as a television receiver includes an HDMI terminal 91 for connecting with an HDMI cable 1 (FIG. 22). The HDMI terminal 91 is a terminal to which video data or the like is input and carries out at least input processing of video data input from an HDMI reception processing unit 92. An apparatus input with the video data by the HDMI may be sometimes called sink apparatus. The input processing in the HDMI reception processing unit 92 is executed under control of an HDMI reception control unit 93. Partial data of control data or the like can be transmitted from the HDMI reception processing unit 92 to the cable 1 connected to the HDMI terminal 91 under control of the HDMI reception control unit 93.

A transmission that uses the HDMI terminal 91 is controlled by a control unit 97 that controls an overall operation of the display apparatus 10. A video display processing unit 98 processes video data received by the HDMI terminal 91 or video data received by a tuner 27 for display, and displays it on a display panel 99. Various video display means such as a liquid crystal display panel are applicable as the display panel.

In this embodiment, the tuner 27 may be of a type that is capable of receiving contents of a plurality of channels. In other words, the tuner 27 may be constituted of a plurality of tuners.

A content refers to data including at least video data. Hereinafter, a content including at least video data may be referred to as video content. Though the content is typically a broadcast program content, it is not limited thereto and includes audio data, text data, data associated with those pieces of data, and the like in addition to video data.

The display apparatus 10 also includes an audio processing unit 94. The audio processing unit 94 subjects audio data received by the HDMI terminal 91 or audio data received by the tuner 27 to audio processing to obtain an analog-converted audio signal. The audio signal obtained by the conversion is subjected to output processing such as an amplification in an output processing unit 21 and output from speakers 22L and 22R connected to the output processing unit 21.

A list of video contents receivable via the HDMI terminal 91 of the display apparatus 10 is stored in an HDMI content list storage unit 25 under control of the control unit 97. At a stage of exchanging control data with an apparatus connected to the HDMI terminal 91, the control unit 97 acquires the content list from that apparatus as a counterpart and stores data received by the reception processing unit 92 in the HDMI content list storage unit 25. Furthermore, a status of a data transmission via the HDMI terminal 91 is stored in an HDMI status storage unit 26. The status stored in the HDMI status storage unit 26 is typically data necessary for specifying, when a video content is being received, the content that is being received and data of a received (reproduced) section of the video content.

The display apparatus 10 is not limited to a television receiver and may instead be a display apparatus that does not include the tuner 27, for example.

Instead of the recording/reproducing apparatus 30, an apparatus that does not include a tuner 44 may be used as long as it is an apparatus that is capable of storing contents.

A content reproduction position storage unit 28 stores a reproduction position of a video content received and reproduced (viewed) via the HDMI terminal 91 of the display apparatus 10. The control unit 97 discriminates the reproduction position stored in the storage unit 28.

Figure 24:
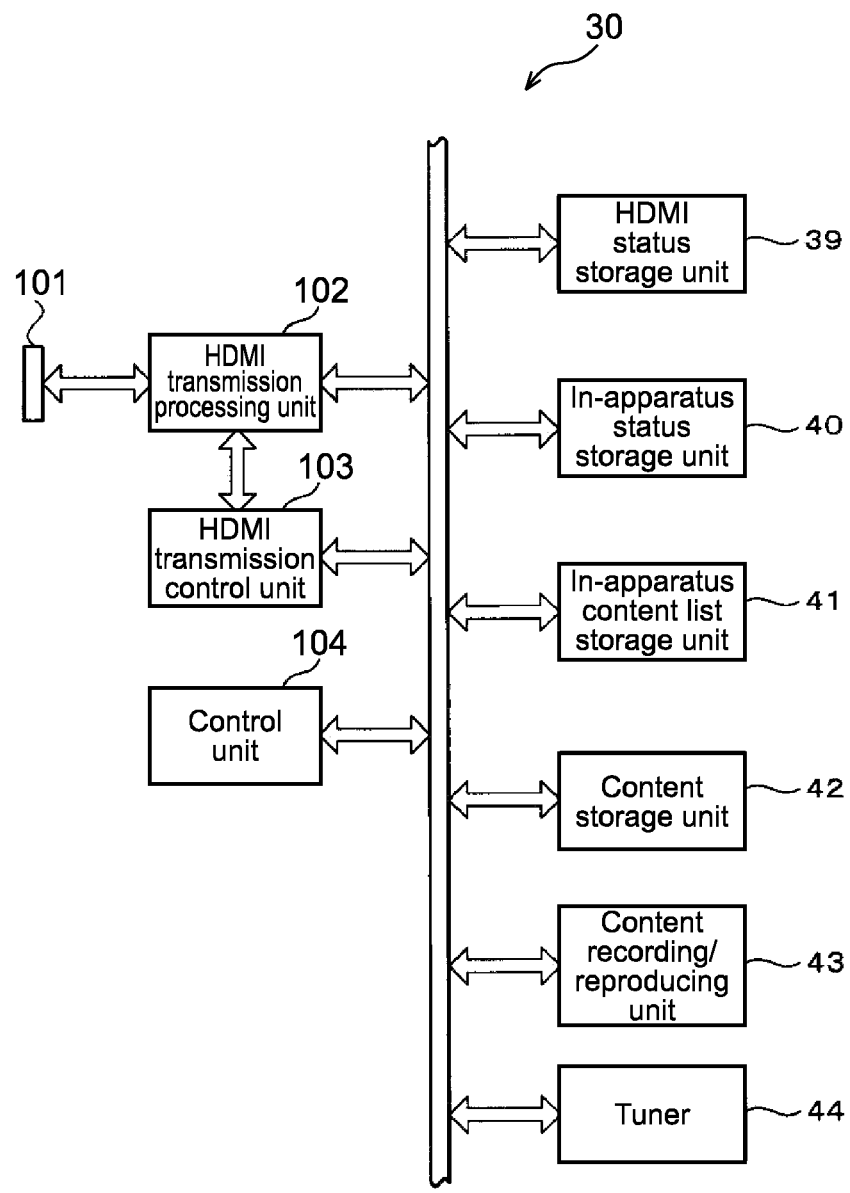
FIG. 24 A block diagram showing a structural example of a recording/reproducing apparatus according to the first embodiment of the present invention.

FIG. 24 is a diagram showing a structural example of the recording/reproducing apparatus 30. The recording/reproducing apparatus 30 structured as a video recorder that receives and records a video content (video program) and reproduces the recorded video content includes an HDMI terminal 101 for connecting with the HDMI cable 1 (FIG. 22). The HDMI terminal 101 is a terminal that outputs video data and the like, and an HDMI transmission processing unit 102 carries out output processing of video data and/or audio data. An apparatus that outputs video data by the HDMI may sometimes be referred to as source apparatus. Input processing by the HDMI transmission processing unit 102 is executed under control of an HDMI transmission control unit 103. Partial data of control data or the like is transmitted to a counterpart apparatus (input apparatus) connected by the cable under control of the HDMI transmission control unit 103. Data such as control data transmitted from the counterpart apparatus is discriminated by the HDMI transmission control unit 103.

A transmission that uses the HDMI terminal 101 is controlled by a control unit 104 that controls an overall operation of the recording/reproducing apparatus 30. The recording/reproducing apparatus 30 includes a content storage unit 42 that stores video contents (video programs of broadcast programs, movies, etc.). The content storage unit 42 is typically constituted of a large-capacity hard disk, but devices such as a solid-state memory and an optical recording medium may be used instead. Processing of storing (recording) video contents in the content storage unit 42 and reproducing the stored contents is executed by a content recording/reproducing unit 43. The video content subjected to the reproduction processing by the content recording/reproducing unit 43 is output from the HDMI terminal 101.

A list of contents stored in the content storage unit 42 is stored in a content list storage unit 41. Recording media such as a hard disk, an optical disc, a magneto optical disc, and a solid-state memory only need to be used as the content list storage unit 41.

The content list stored in the content storage unit 42 is a list that stores, when a video content is a broadcast program, a program title, a broadcast date and time, a length (recording time), casts, a program content, and the like using an EPG (Electric Program Guide) related to the broadcast program. When a video content is a video content taken by a video camera apparatus, the content list is a list that stores a shot date and time, a title, a length, and the like.

Moreover, in the case of this example, an index video is prepared in the list of video contents, and the index video is transmitted to the display apparatus 10 side. The index video is typically a picture that includes a picture obtained by reducing, contracting, or thinning (hereinafter, referred to as size-reduced, etc.) video data of a video content. An example of the size-reduced pictures includes a so-called thumbnail picture. An example of transmission processing of an index video will be described later.

Figure 25:
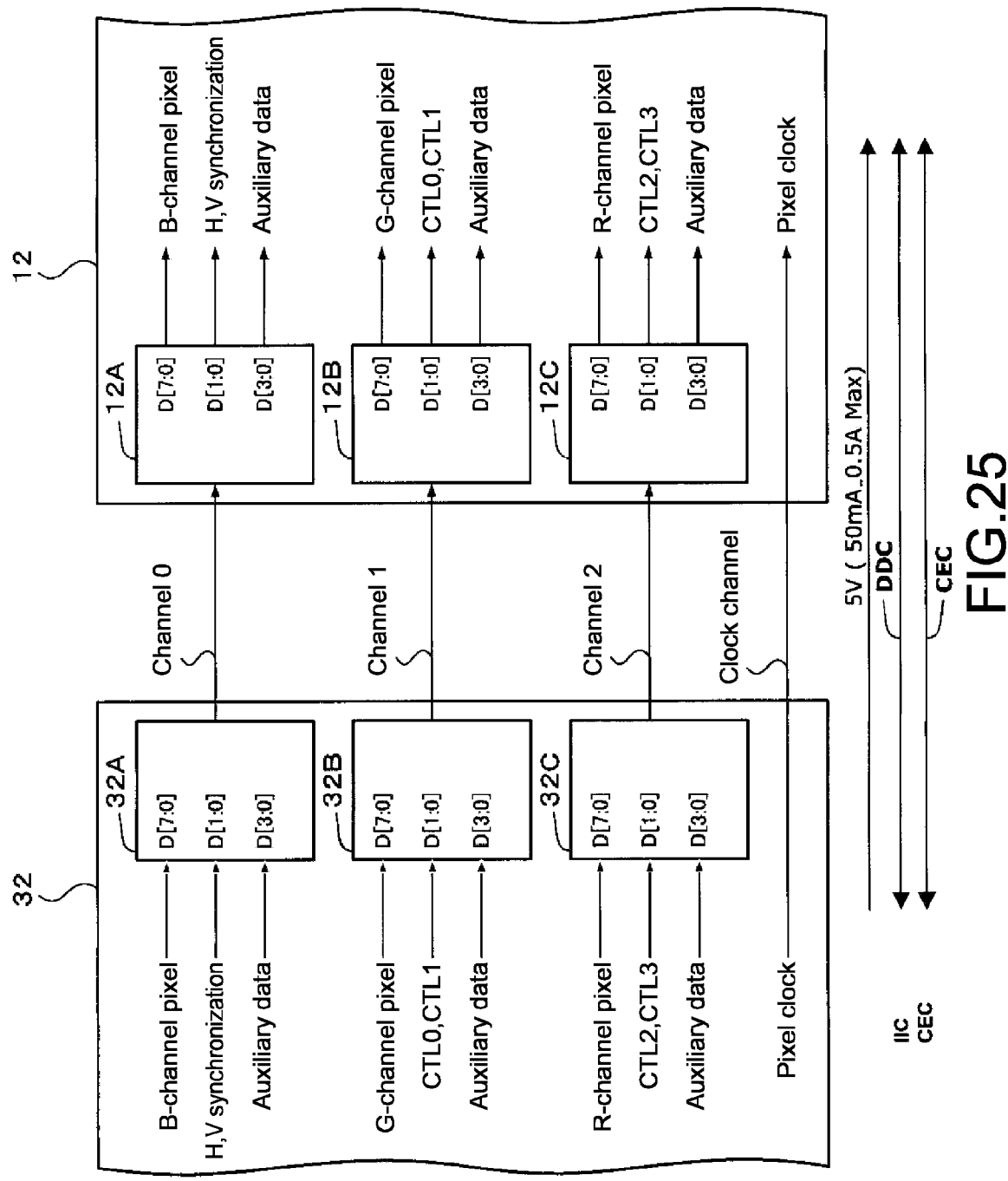
FIG. 25 An explanatory diagram showing a structural example of a transmission channel in a cable according to the first embodiment of the present invention.

Next, an example of a data structure of each channel transmitted between the HDMI terminal 101 of the recording/reproducing apparatus 30 and the HDMI terminal 91 of the display apparatus 10 via the HDMI cable 1 will be described. As shown in FIG. 25, in the HDMI standard, three channels of Channel 0, Channel 1, and Channel 2 are provided as channels for transmitting video data, and a clock channel for transmitting pixel clocks is also provided. Further, a power source transmission line, a DDC (Display Data Channel) line, and a CEC (Consumer Electronics Control) line are also provided. A content list request, a reproduction position instruction, and returns with respect to those instructions that are to be described later are made using the CEC channel as a control data transmission channel, for example.

On the transmission side (recording/reproducing apparatus 30), data combination units 32A, 32B, and 32C are provided inside the transmission processing unit 102 for the respective channels that transmit video data, and also on the reception side (display apparatus 10), data separation units 12A, 12B, and 12C are provided inside the reception processing unit 92 for the respective channels that transmit video data.

A structure of each channel will be described. Through Channel 0, pixel data of B data (blue-color data), vertical synchronization data, horizontal synchronization data, and auxiliary data are transmitted. Through Channel 1, pixel data of G data (green-color data), two types of control data (CTL0 and CTL1), and auxiliary data are transmitted. Through Channel 2, pixel data of R data (red-color data), two types of control data (CTL2 and CTL3), and auxiliary data are transmitted.

Figure 26:
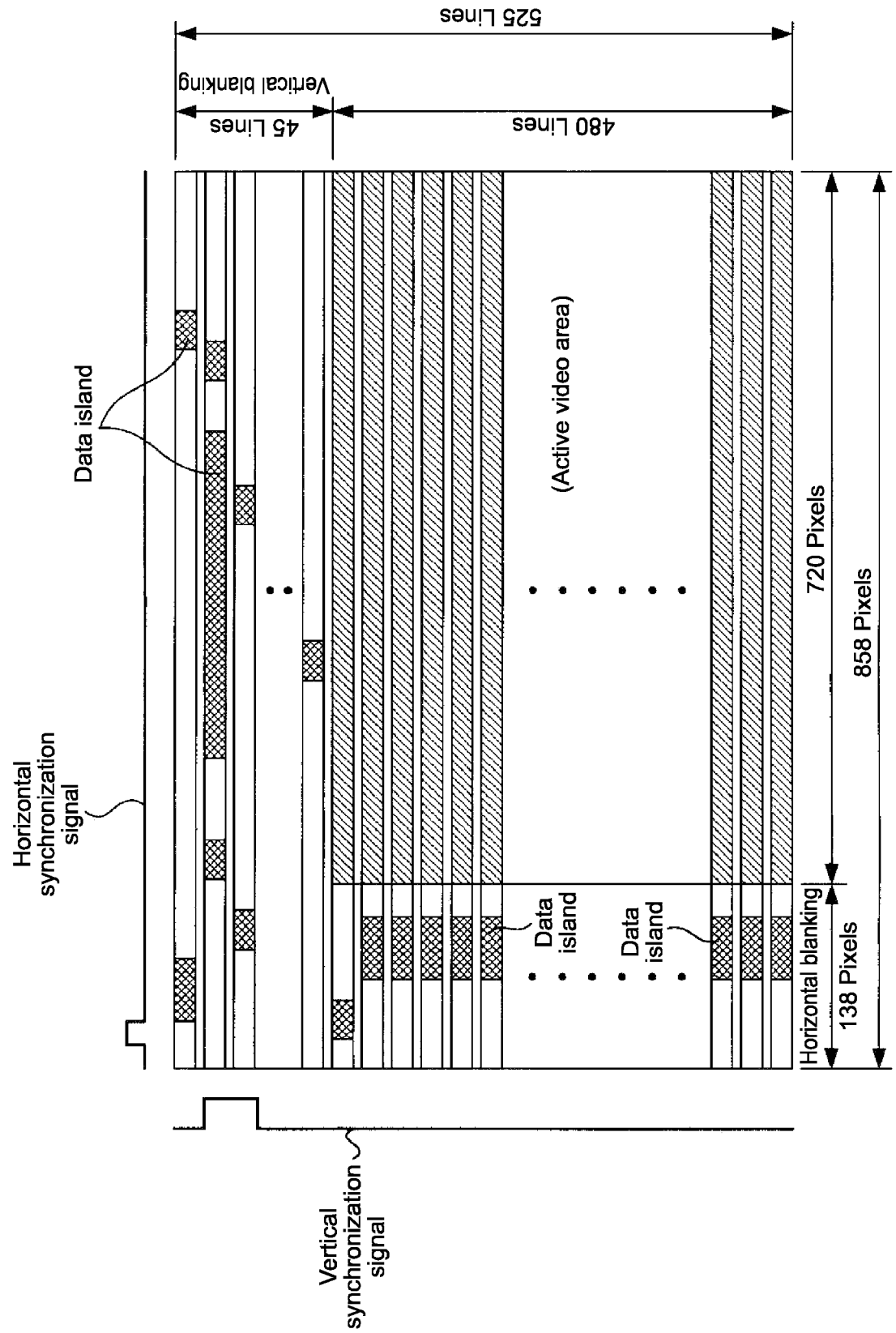
FIG. 26 An explanatory diagram showing a structural example of data of one frame at a time of a transmission by the cable according to the first embodiment of the present invention.

FIG. 26 is a diagram showing a line structure and a pixel structure of one frame that is transmitted by the transmission structure of this embodiment. Video data to be transmitted (main video data) is uncompressed data to which a vertical blanking area and a horizontal blanking area are added. In the example of FIG. 26, pixel data of 480 lines×720 pixels is shown as an example of a video area to be displayed (area indicated as active video area), and the number of lines and the number of pixels including the blanking areas are 525 lines and 858 pixels, respectively. Double-hatched areas in the blanking areas are each a period called data island in which auxiliary data can be added.

Next, a structure and processing for transmitting video data from the recording/reproducing apparatus 30 to the display apparatus 10 using the HDMI cable 1 will be described. Here, an example in which a plurality of pieces of video data are transmitted from the recording/reproducing apparatus 30 to the display apparatus 10 via one HDMI cable 1 will be described. In descriptions below, transmission processing of a plurality of pieces of video data will mainly be described. Furthermore, descriptions on FIGS. 27 to 30 are practically to help understand a fourth embodiment (to be described later) as a typical embodiment of the present invention.

Figure 27:
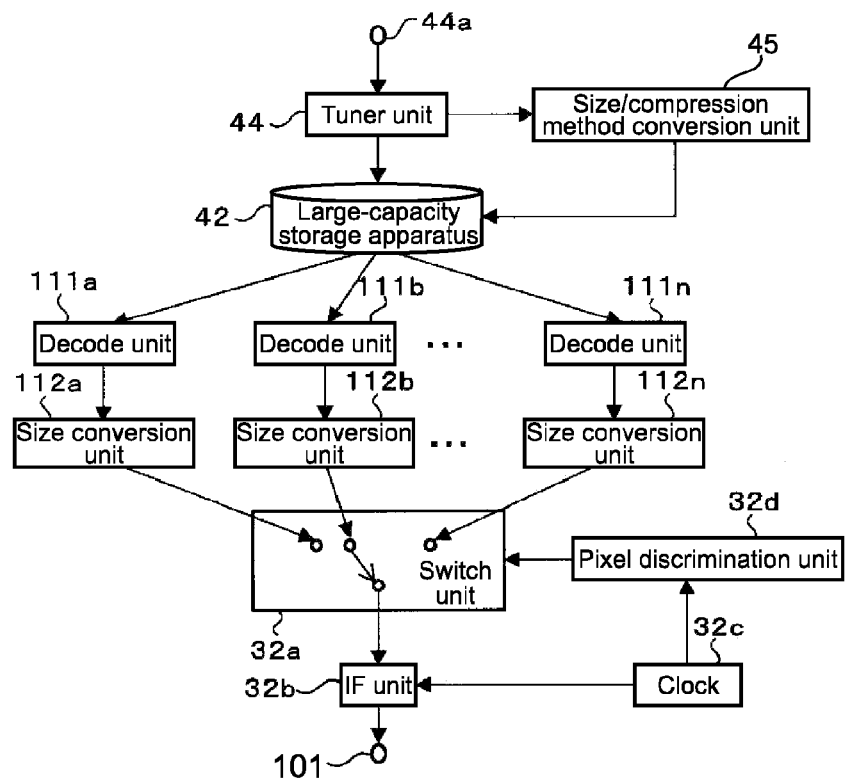
FIG. 27 A block diagram showing a structural example on a video-transmission side according to the first embodiment of the present invention.

A block structure for realizing the transmission processing of video data by the recording/reproducing apparatus 30 will be described while referring to FIG. 27. The structure shown in FIG. 27 is executed under control of the control unit 104 shown in FIG. 24.

For example, the recording/reproducing apparatus 30 receives a broadcast signal by a tuner unit 44 in advance via an antenna input terminal 44a and stores it in a large-capacity storage apparatus 42 as a typical example of the content storage unit 42.

A size/compression method conversion unit 45 reduces a size of video data received by the tuner unit 44 or converts a compression (encode) method of the video data into a predetermined compression method. For example, when storing by a compression method (codec) different from that of a broadcast signal, such as MPEG (Moving Picture Experts Group), the size/compression method conversion unit 45 converts that compression method. When the compression method is not converted by the size/compression method conversion unit 45, video data compressed by the compression method of a broadcast signal only needs to be stored as it is in the large-capacity storage apparatus 42. Other than MPEG, any codec such as WMV (Windows (registered trademark) Media Video) and DivX may be used.

Compressed video data stored in the large-capacity storage apparatus 42 is converted into uncompressed video data by decode units 111a, 111b, . . . 111n individually for each video data.

Size conversion units 112a, 112b, . . . 112n each convert the data that has been converted into uncompressed video data into a necessary size for a transmission and supply it to a switch unit 32a inside the HDMI transmission processing unit 102 (FIG. 24). Typically, the size conversion units 112a to 112n reduce a data size or the like.

The switch unit 32a selects one of a plurality of pieces of video data. Moreover, the switch unit 32a selects a pixel discriminated by a pixel discrimination unit 32d and transmits it to an interface (IF) unit 32b.

A clock generation unit 32c supplies clocks to the interface (IF) unit 32b and the pixel discrimination unit 32d. Here, the clock generation unit 32c generates at least pixel clocks.

The IF unit 32b is a function that the HDMI transmission processing unit 102 has and transmits video data transmitted from the switch unit 32a to the HDMI terminal 101 in accordance with the supplied clocks.

The pixel discrimination unit 32d discriminates which pixel should be selected by the switch unit 32b out of all pieces of pixel data of one frame in one piece of video data selected by the switch unit 32a. Accordingly, the switch unit 32a transmits pixel data one at a time for each channel in the order of the plurality of pieces of video data instead of successively transmitting pixel data of one frame in one piece of video data.

Figure 33:
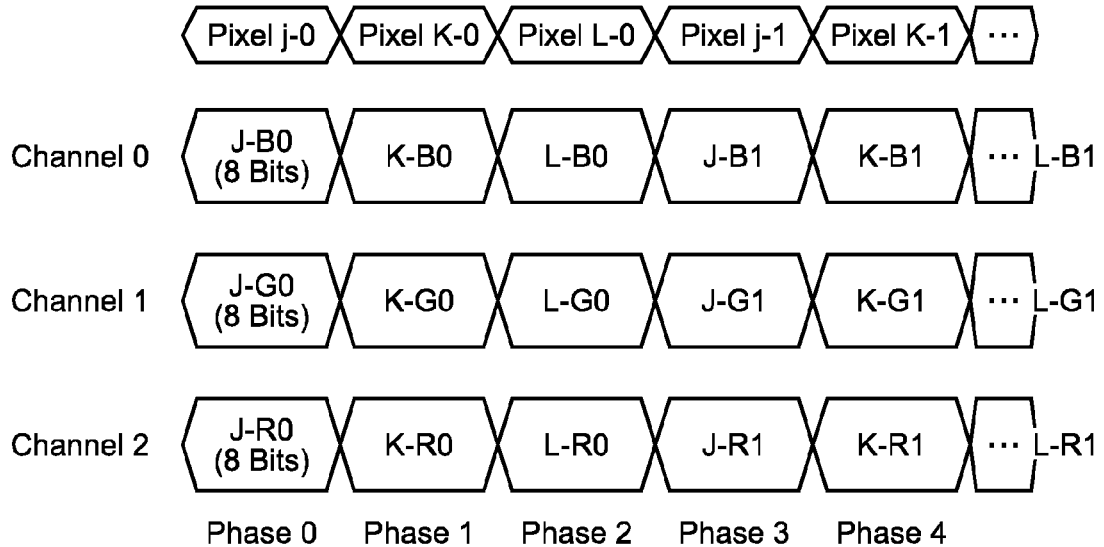
FIG. 33 An explanatory diagram showing a transmission example (Example 1) according to the first embodiment of the present invention.

For example, as shown in FIG. 33, when three pieces of video data of Frame J, Frame K, and Frame L are transmitted, the pixel discrimination unit 32d causes Pixel 0 to be successively transmitted in the order of Frames J, K, and L and similarly processes Pixel 1 after that. Subsequently, the pixel discrimination unit 32d similarly processes Pixel 2 and repeats those operations thereafter. Therefore, the clock generation unit 32c supplies the generated pixel clocks to the IF unit 32b and the pixel discrimination unit 32d. As a result, a transmission timing of data from the IF unit 32b and a switching timing are synchronized.

The reception side (display apparatus 10 side) contracts and aligns Frame J, Frame K, and Frame L that have been received at the same time on one screen for display, for example. For example, in a case of thumbnail pictures of moving images, when a content list is displayed on the display apparatus 10, the control unit 97 aligns the moving images to display them and prompts a user to select a content to reproduce from the displayed moving images.

Figure 28:
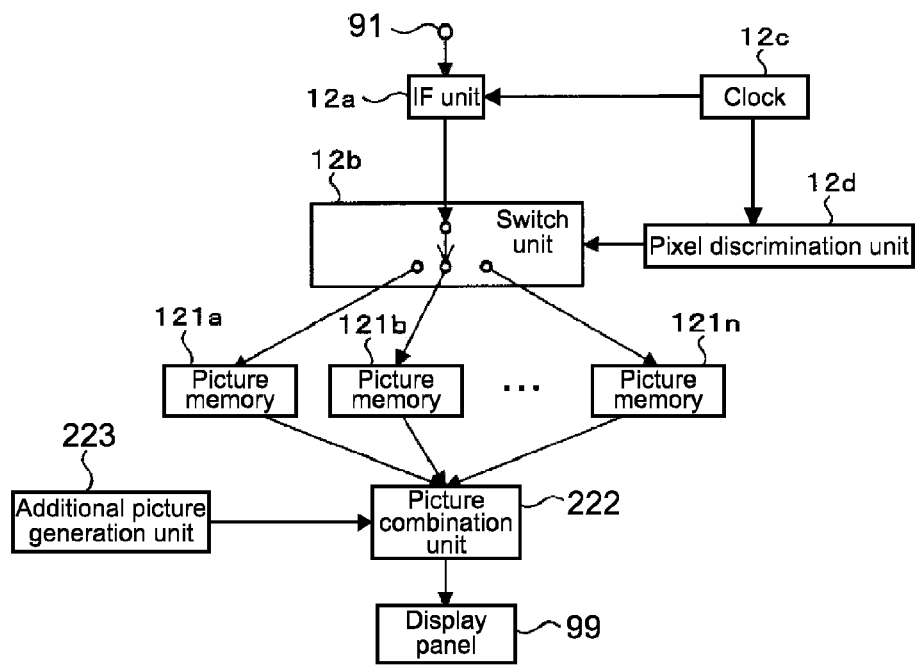
FIG. 28 A block diagram showing a structural example on a video-reception side according to the first embodiment of the present invention.

FIG. 28 is a diagram showing a block structure for realizing processing for the display apparatus 10 to receive video data transmitted from the recording/reproducing apparatus 30 to the HDMI cable 1 as in FIG. 27. The structure shown in FIG. 28 is executed under control of the control unit 97 shown in FIG. 23.

The display apparatus 10 receives video data by an interface unit 12a in sync with pixel clocks received by a clock unit 12c and supplies it to a switch unit 12b. A pixel discrimination unit 12d discriminates to which video data the received pixel data belongs and to which coordinate position (x, y) in the frame it corresponds. The switch unit 12b categorizes the plurality of pieces of video data in a pixel unit and supplies them to picture memories 121a, 121b, . . . 121n that individually store the video data, based on the discrimination of the pixel discrimination unit 12d. A picture combination unit 222 combines the video data stored in the picture memories 121a, 121b, . . . 121n and a video obtained from an additional picture generation unit 223 that generates an additional picture such as a text as necessary. Accordingly, a combined picture data of one screen is generated. The combined picture is displayed on the display panel 99. In other words, the display apparatus 10 is capable of displaying a plurality of size-reduced videos on one screen.

Figure 29:
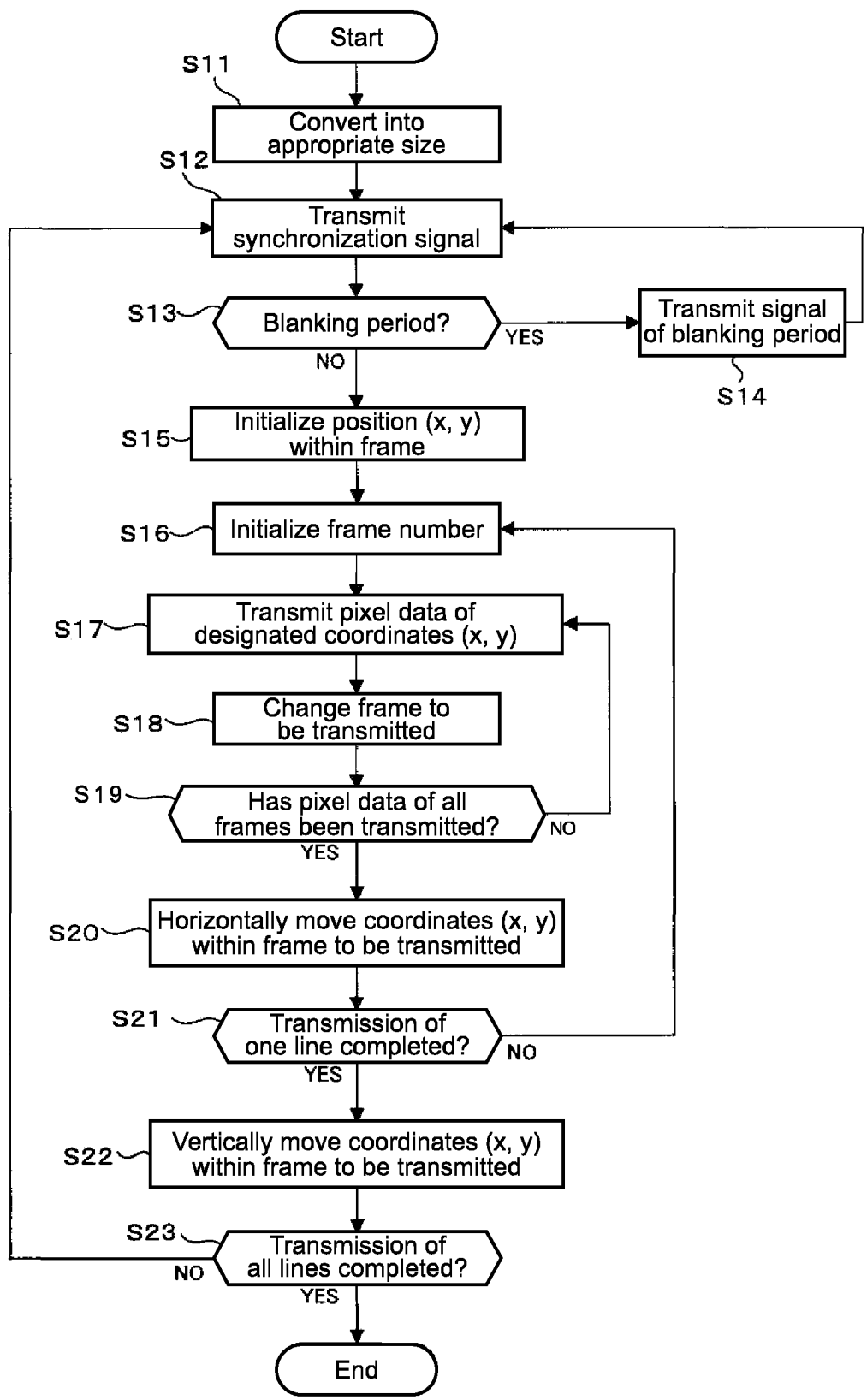
FIG. 29 A flowchart showing a processing example on the video-transmission side according to the first embodiment of the present invention.

Next, an operation carried out by the structure shown in FIG. 27 will be described with reference to the flowchart of FIG. 29.

The control unit 104 converts a plurality of pieces of video data to be transmitted into an appropriate size (Step S11). The control unit 104 transmits a synchronization signal for synchronizing with the display apparatus 10 as the reception side regarding a transmission and reception (Step S12). The control unit 104 confirms whether it is currently a blanking area (Step S13), transmits, when it is a blanking area, control data or the like that is transmitted in the blanking area (Step S14), and repeats the processes from Step S12.

When it is not a blanking area in Step S13, the control unit 104 transmits video data. Then, the control unit 104 initializes coordinates (x, y) of a pixel in a frame and a frame number (Steps S15 and S16) and transmits pixel data of the coordinates (x0, y0) in the frame designated by the pixel discrimination unit 32d (Step S17). The frame number is typically a sequential number assigned to each frame. Next, the control unit 104 changes the frame of the video data to be transmitted (or frame number thereof) by the switch unit 32b (Step S18). Pixel data having coordinates (x0, y0) that are the same as the coordinates of the pixel transmitted in Step S17 (x0, y0) in the changed frame is transmitted.

The control unit 104 confirms whether pixel data of one frame of every piece of video data, that has the same coordinates (x0, y0), has been transmitted (Step S19). When there is pixel data of the coordinates (x0, y0) in a frame not yet transmitted, the control unit 104 returns to Step S17 and transmits pixel data of a frame of the video data, that has the same coordinates (x0, y0).

When pixel data of one frame of every piece of video data, that has the coordinates (x0, y0), is transmitted, the control unit 104 moves the coordinates one at a time in the horizontal direction (Step S20). In other words, the coordinates (x0, y0) are followed by coordinates (x1, y0), followed by coordinates (x2, y0), and so on, with the result that the coordinates of the pixel data to be transmitted are moved in the horizontal direction.

The control unit 104 confirms whether the coordinates (x, y) of the pixel data to be transmitted have reached an end of the line in the horizontal direction (Step S21), and when not having reached the end, returns to Step S16 to select a frame to be transmitted and repeats the same processes.

Moreover, when pixel data of one line is transmitted upon horizontally moving to the end of the line, the control unit 104 moves the coordinates in the vertical direction (Step S22). The control unit 104 confirms whether a transmission of pixel data has been completed for all lines (Step S23) and when not completed, repeats the processes from Step S12.

Figure 30:
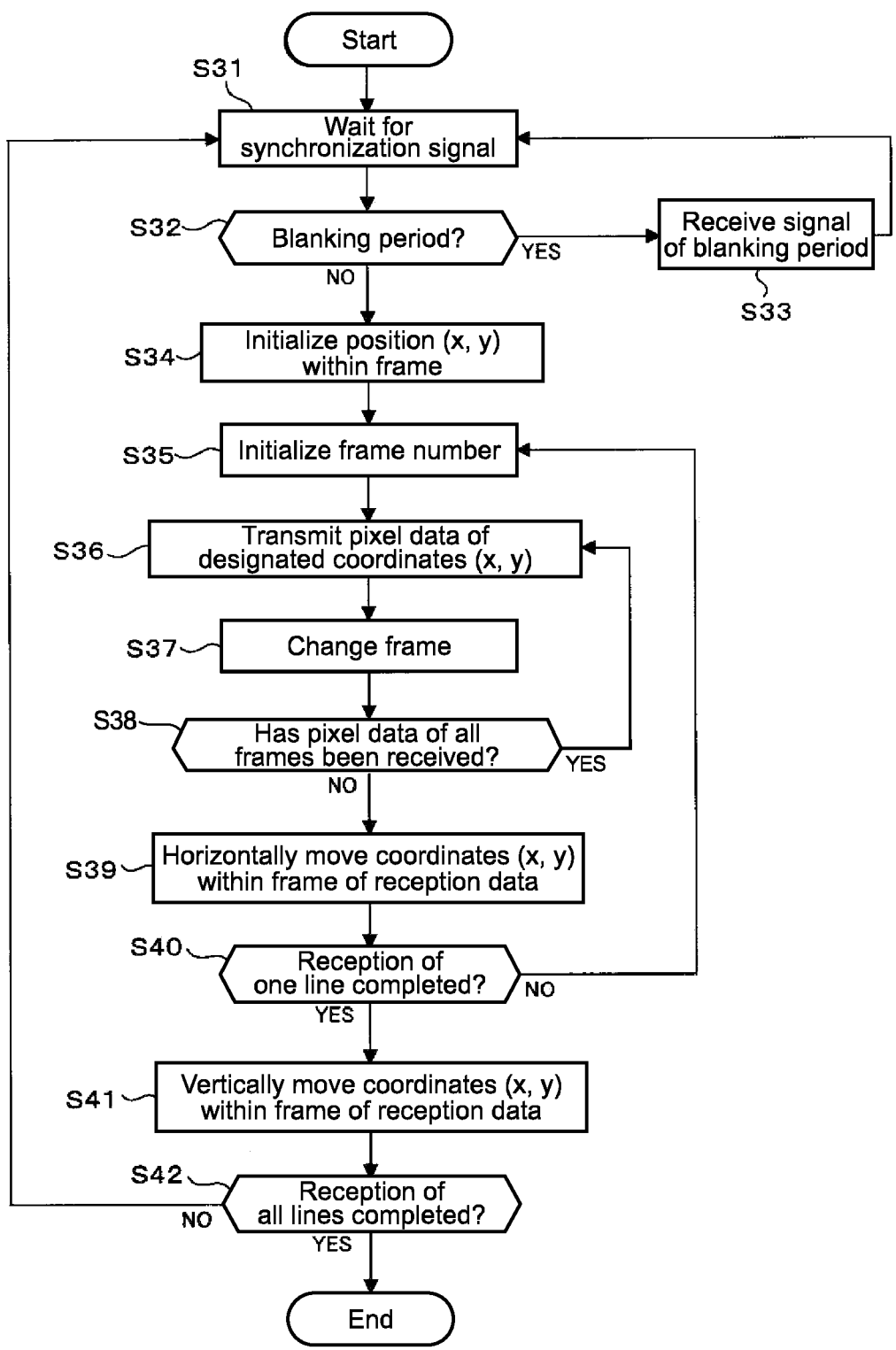
FIG. 30 A flowchart showing a processing example on the video-reception side according to the first embodiment of the present invention.

Next, an operation carried out by the structure shown in FIG. 28 will be described with reference to the flowchart of FIG. 30. The control unit 97 performs a synchronization after waiting for a synchronization signal (pixel clock) (Step S31) and confirms whether it is currently a blanking area (Step S32). When it is currently a blanking area, the control unit 97 receives a signal of the blanking area via the HDMI terminal 91 and the IF unit 12*a* (Step S33).

When it is not a blanking area, the control unit 97 initializes coordinates (x, y) of a pixel in a frame and a frame number (Steps S34 and S35). Then, the control unit 97 receives pixel data that has coordinates (x0, y0) designated by the pixel discrimination unit 12*d* in the frame corresponding to the frame number of the video data selected by the switch unit 12*b* (Step S36). The control unit 97 stores the received pixel data in one picture memory (e.g., 121*a*) out of the picture memories 121*a*, 121*b*, ... 121*n*.

The control unit 97 changes the frame of the video data (or frame number thereof) by the switch unit 12*b* (Step S37). Pixel data having coordinates (x0, y0) that are the same as the coordinates of the pixel that has been received previously (x0, y0) in the changed frame is received. The received pixel data is stored in the next picture memory 121*b*.

The control unit 97 confirms whether pixel data of one frame of every piece of video data, that has the same coordinates (x0, y0), has been received (Step S38). When there is pixel data of the coordinates (x0, y0) in a frame not yet received, the control unit 97 returns to Step S36 and transmits pixel data of the same coordinates (x0, y0) in a frame of the video data.

When pixel data of one frame of every piece of video data, that has the coordinates (x0, y0), is received, the control unit 97 moves the coordinates one at a time in the horizontal direction (Step S39). In other words, the coordinates (x0, y0) are followed by coordinates (x1, y0), followed by coordinates (x2, y0), and so on, with the result that the coordinates of the pixel data to be received are moved in the horizontal direction.

The control unit 97 confirms whether the coordinates (x, y) of the pixel data to be received have reached an end of the line in the horizontal direction (Step S40), and when not having reached the end, returns to Step S36 to select a frame to be received and repeats the same processes.

Moreover, when pixel data of one line is transmitted upon horizontally moving to the end of the line, the control unit 97 moves the coordinates in the vertical direction (Step S41). The control unit 97 confirms whether a reception of pixel data has been completed for all lines (Step S42) and when not completed, repeats the processes from Step S31.

It should be noted that in the case of transmitting a plurality of pieces of video data in a pixel unit as in this embodiment, a video transmission apparatus (recording/reproducing apparatus 30) notifies a video reception apparatus (display apparatus 10) that data to be transmitted has a data structure as described above using a control data transmission channel (e.g., DDC channel shown in FIG. 25) in the HDMI cable 1. Specifically, the fact that the data to be transmitted is data constituted of a packet header of InfoFrame of AVI (Auxiliary Video Information) (see FIG. 31) and a packet following the packet header (see FIG. 32), that is one of the packets transmitted as control data, is notified, for example. As shown in FIG. 32, detailed data on a location of each video data is transmitted, and the data is discriminated and accurately separated on the reception side.

Figure 45:
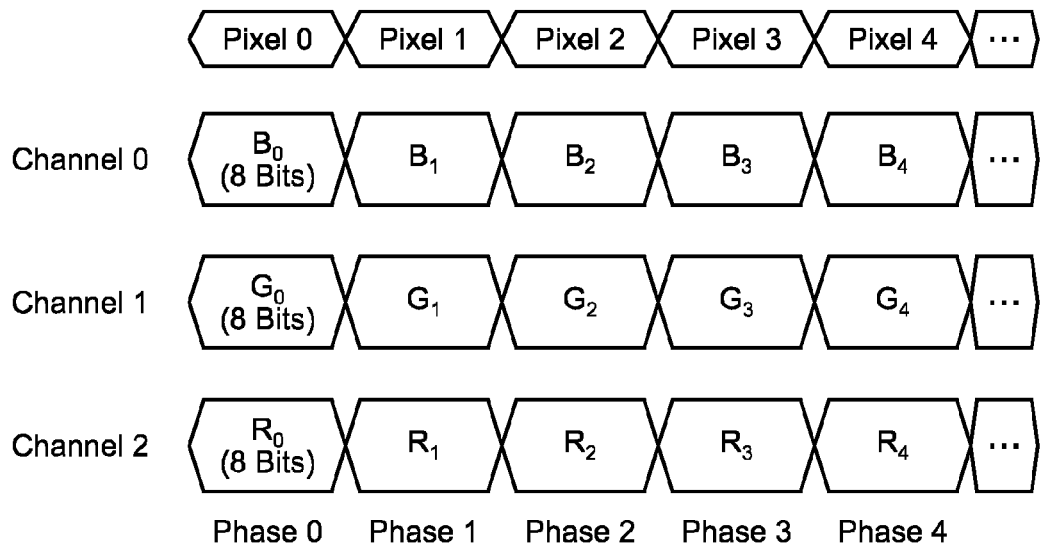
FIG. 45 An explanatory diagram showing a video data transmission example based on an HDMI standard.

Here, FIG. 45 is a diagram showing a conventional, general example of a case where primary-color data (R data, G data, and B data) is transmitted by an interface of an HDMI standard. B data, G data, and R data of video data are individually transmitted using three channels of Channel 0, Channel 1, and Channel 2. The example of FIG. 45 shows periods during which data of 5 pixels of Pixel 0, Pixel 1, Pixel 2, Pixel 3, and Pixel 4 are transmitted, and 1-pixel data of each channel is constituted of 8 bits.

Specifically, regarding the B data (blue-color data), Channel 0 is used to transmit 8-bit B0 data during the period Pixel 0, followed by 8-bit B1 data, B2 data, B3 data, and B4 data that are sequentially transmitted in sync with the pixel clocks (not shown). Regarding the G data (green-color data), Channel 1 is used to transmit 8-bit G0 data during the period Pixel 0, followed by 8-bit G1 data, G1 data, G2 data, G3 data, and G4 data that are sequentially transmitted in sync with the pixel clocks. Regarding the R data (red-color data), Channel 2 is used to transmit 8-bit R0 data during the period Pixel 0, followed by 8-bit R1 data, R2 data, R3 data, and R4 data that are sequentially transmitted in sync with the pixel clocks. Phase 0, Phase 1, ... shown in FIG. 45 each indicate one cycle of the pixel clocks.

Figure 46:
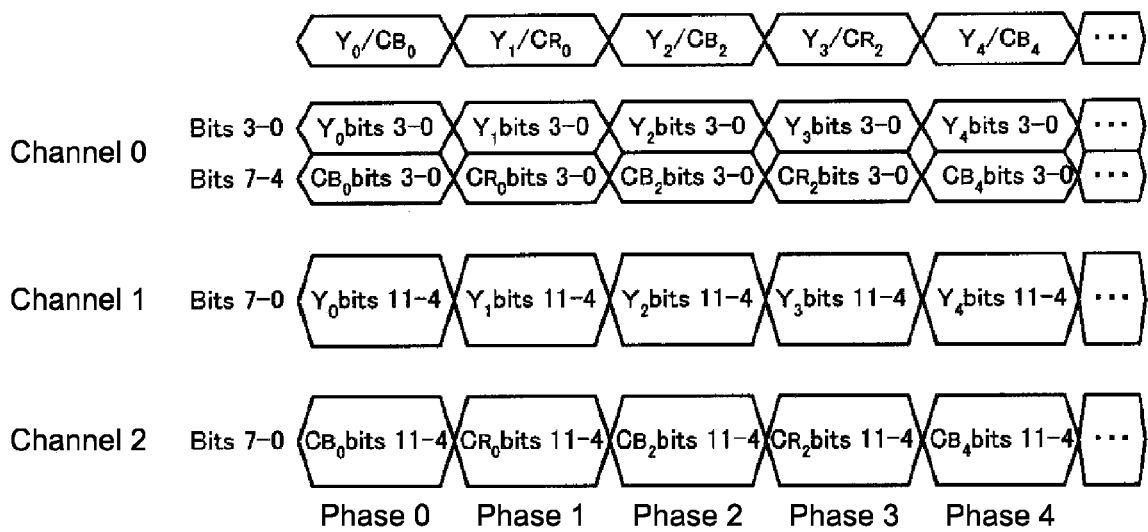
FIG. 46 An explanatory diagram showing a video data transmission example based on the HDMI standard.

FIG. 46 is a diagram showing a conventional, general example of a case where a component video signal is transmitted by the interface of the HDMI standard. FIG. 46 shows an example of a case of YCbCr data in which a sampling system is 4:2:2. In this case, out of the 8-bit data transmitted per pixel clock in Channel 0, 4 bits are allocated to Y data (luminance data) and 4 bits are allocated to C data (chroma data). Moreover, 8 bits of Channel 1 are allocated to Y data, and 8 bits of Channel 2 are allocated to C data. With such a structure, a transmission of 12-bit Y data and 12-bit C data (6-bit Cb data and 6-bit Cr data) per pixel clock becomes possible.

Figure 47:
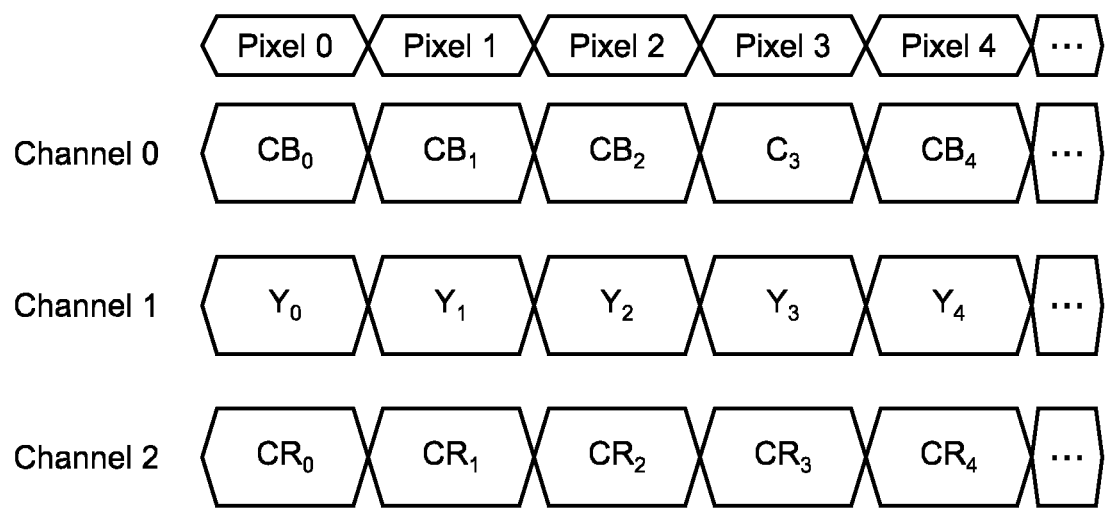
FIG. 47 An explanatory diagram showing a video data transmission example based on the HDMI standard.

FIG. 47 is a diagram showing a conventional example of a case where a component video signal of YCbCr data in which a sampling system is 4:4:4 is transmitted by an interface of an HDMI standard. In this case, Channel 0 is allocated to Cb data of 8 bits per pixel clock. Moreover, Channel 1 is allocated to Y data of 8 bits per pixel clock, and Channel 2 is allocated to Cr data of 8 bits per pixel clock. With such a structure, a transmission of 8-bit Y data and 16-bit C data per pixel clock becomes possible.

Figure 34:
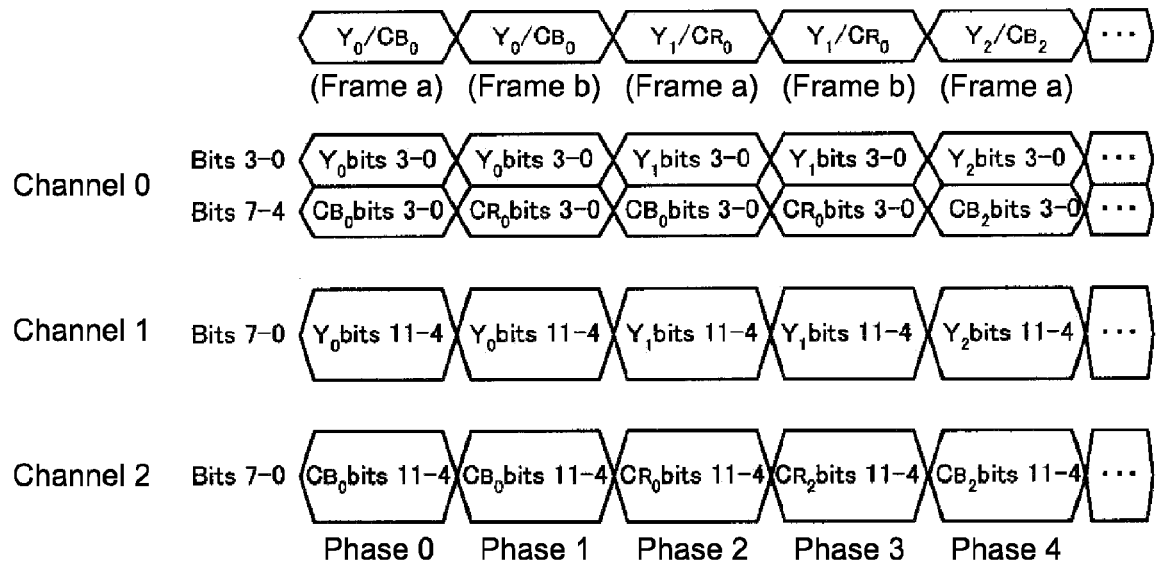
FIG. 34 An explanatory diagram showing a transmission example (Example 2) according to the first embodiment of the present invention.
Figure 35:
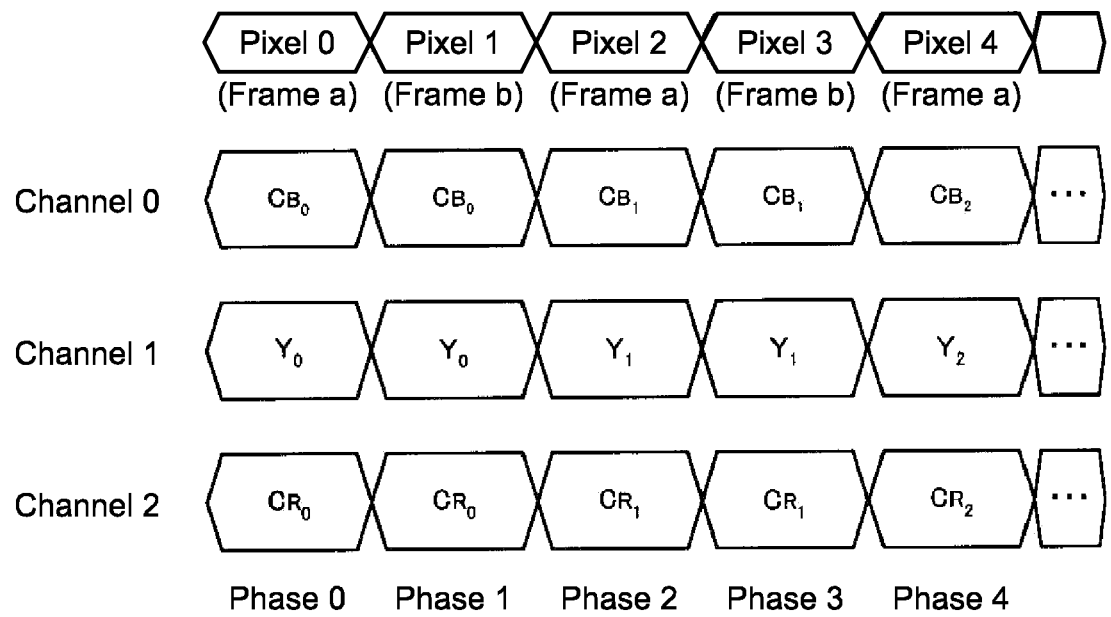
FIG. 35 An explanatory diagram showing a transmission example (Example 3) according to the first embodiment of the present invention.

FIGS. 33 to 35 are diagrams showing a transmission example of the HDMI cable 1 of this embodiment. FIG. 33 is an example of a case where three pieces of video data of Frame J, Frame K, and Frame L are transmitted as described above. FIG. 33 shows an example of transmitting primary-color data (R data, G data, and B data), and B data, G data, and R data are transmitted individually using three channels of Channel 0, Channel 1, and Channel 2. 1-pixel data of each channel is constituted of 8 bits, and the 8-bit data (total of 24-bit data in three channels) is transmitted in 1-pixel-clock cycles.

In this case, the period of Pixel 0 continues for a period of 3 pixel clocks. 24-bit data of Frame J is transmitted in the first one cycle of the 3-pixel-clock period, 24-bit data of Frame K is transmitted in the next one cycle, and 24-bit data of Frame L is transmitted in the last one cycle. After that, the pixel clock periods are similarly set 3-clock-cycle each for a transmission.

It should be noted that when the number of pixels in a case where only the pixel data of one frame is transmitted as shown in FIG. 45 is the same as the number of pixels of a frame that is constituted of three pieces of video data as shown in FIG. 33, the pixel clocks of the recording/reproducing apparatus 30 only need to be set to a frequency of about three times. When the pixel clocks are the same, the transmittable number of pixels of one frame becomes ⅓.

FIGS. 34 and 35 are diagrams each showing an example of a case where a component video signal is transmitted by the HDMI cable 1 of this embodiment.

FIGS. 34 and 35 are each an example of a case where two pieces of video data of Frame a and Frame b are transmitted. As shown in FIGS. 34 and 35 that respectively correspond to transmission processing shown in FIGS. 46 and 47, two pieces of video data of Frame a and Frame b are transmitted for each pixel in the order of Frame a and Frame b, with the result that the two pieces of video data are transmitted at the same time. Also in this case, when the numbers of pixels of the video data are the same, the pixel clocks only need to be set to a higher frequency.

It should be noted that in the case of this example, pixel data of each pixel is transmitted for all frames. Therefore, it is also possible to uniformize the number of pixels, that is, a screen size of all the frames. However, screen sizes may differ for a plurality of pieces of video data that are transmitted at the same time. In this case, the number of pixels only needs to be determined according to a largest screen, and even when data of a large-size screen remains, it is of no problem. Since a data transmission of a small-size screen is completed before a transmission of a large-size screen, it is only necessary to inhibit a data transmission during a transmission period of a small-size pixel.

As described heretofore, according to this embodiment, a plurality of videos can be transmitted by one cable at the same time. Therefore, a plurality of cables do not need to be provided, with the result that an apparatus connection structure becomes simple.

Moreover, in this embodiment, display of an index picture such as thumbnail display that uses a moving image becomes possible, and a user can easily select a plurality of contents of a source apparatus via a sink apparatus.

Further, when the sink apparatus does not support the processing according to this embodiment, only one piece of video data selected by a user or selected by a sink apparatus only needs to be displayed out of a plurality of pieces of transmitted video data. This processing is the same as pixel doubling processing of performing a double transmission for each pixel data. Specifically, in the case of a sink apparatus of the HDMI standard, the processing of this embodiment can be easily handled, and videos are not disturbed. Furthermore, since the processing structure of this embodiment has a degree of freedom in a setting of the number of overlaps of pixels, a plurality of contents can be transmitted unwastefully.

Next, a second embodiment of the present invention will be described with reference to FIGS. 36 to 40. A basic transmission system structure of this embodiment is the same as that of the first embodiment described with reference to FIGS. 22 to 26, and a basic structure for connecting the recording/reproducing apparatus 30 and the display apparatus by the HDMI cable 1 is the same. Specifics of the processing of transmitting a plurality of pieces of video data at the same time in this embodiment is different from that of the first embodiment. In descriptions below, different points will mainly be described, and descriptions on blocks that are the same as those shown in FIGS. 27 and 28 will be simplified or omitted. In addition, descriptions on FIGS. 36 to 40 are practically to help understand a fourth embodiment (to be described later) as a typical embodiment of the present invention.

Figure 36:
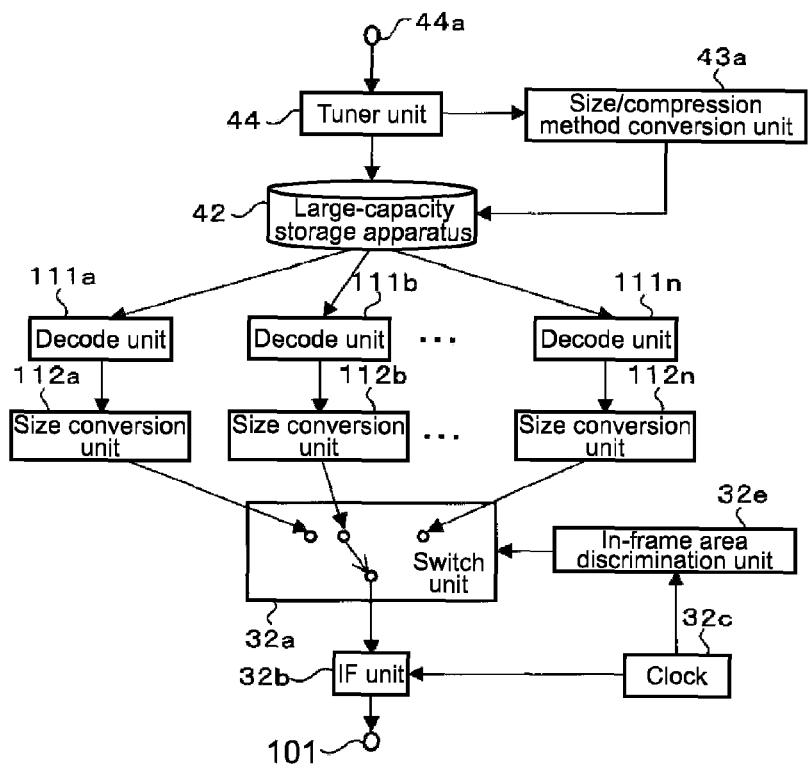
FIG. 36 A block diagram showing a structural example on a video-transmission side according to a second embodiment of the present invention.

FIG. 36 is a diagram showing a block structure for realizing video data transmission processing in the recording/reproducing apparatus 30. The structure shown in FIG. 36 is executed under control of the control unit 104 shown in FIG. 24.

Figure 40:
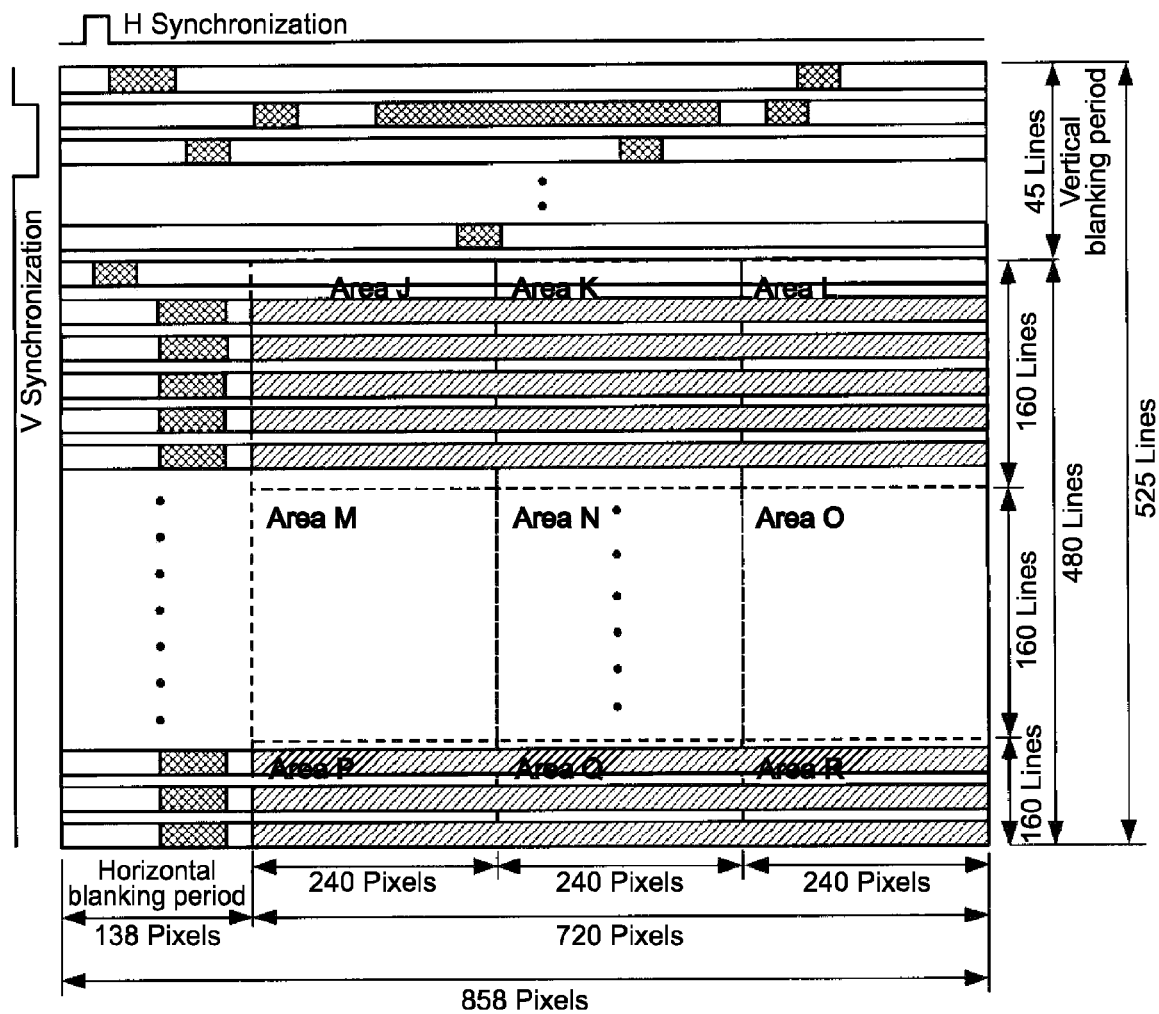
FIG. 40 An explanatory diagram showing a structural example of a 1-frame transmission according to the second embodiment of the present invention.

Referring to FIG. 40, a data structure of one frame will be described. FIG. 40 is a diagram showing a transmission structure of this embodiment, that is, a diagram showing a transmission structure of one frame in an HDMI standard.

This embodiment describes an example in which 9 types of video data of Frames J, K, L, M, O, P, Q, and R are transmitted by one HDMI cable 1. 9 transmission areas of Areas J to R are set such that an active video area in which pixel data of video data of one frame is originally arranged is divided into 9. Areas J to R are areas respectively corresponding to Frames J to R and areas where pictures obtained by contracting Frames J to R are transmitted. In the example of FIG. 40, the entire active video area is constituted of 480 lines×720 pixels, and one divisional area is constituted of 160 lines×240 pixels.

Referring back to FIG. 36, for dividing the transmission areas as described above, the clock generation unit 32c also supplies pixel clocks that are supplied to the interface unit 32b that transmits video data to an in-frame area discrimination unit 32e. The in-frame area discrimination unit 32e discriminates which of the areas in one frame the current transmission timing is in, that is, which video data of Frames J to R should be transmitted. The control unit 104 controls a switch of the switch unit 32a based on the discrimination, and the switch unit 32a selects the video data to be transmitted.

Figure 37:
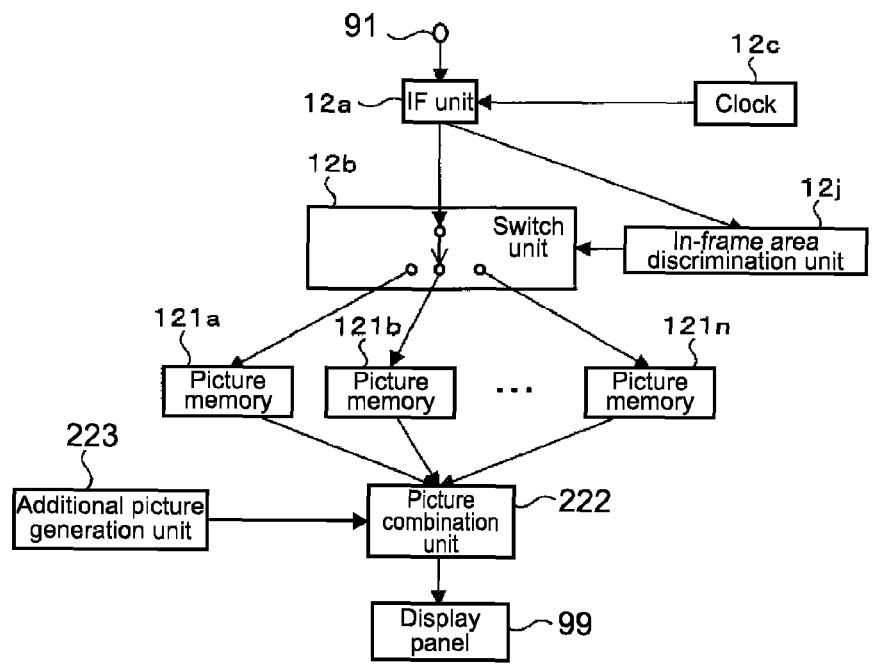
FIG. 37 A block diagram showing a structural example on a video-reception side according to the second embodiment of the present invention.

FIG. 37 is a diagram showing a block structure for realizing processing for the display apparatus 10 to receive video data transmitted to the HDMI cable 1 as described above. The structure shown in FIG. 37 is executed under control of the control unit 97 shown in FIG. 23.

The display apparatus 10 receives data by the interface unit 12a in sync with the pixel clocks received by the clock unit 12c and supplies it to the switch unit 12b. An in-frame area discrimination unit 12j discriminates to which of the divisional areas of Frames J to R the received data belongs. The switch unit 12b supplies the data to the picture memories 121a, 121b, . . . 121n that individually store a plurality of pieces of video data based on the discrimination of the in-frame area discrimination unit 12j. The picture combination unit 222 combines the video data stored in the picture memories 121a, 121b, . . . 121n and a video obtained from the additional picture generation unit 223 that generates an additional picture such as a text as necessary. Accordingly, the combined picture is displayed on the display panel 99. In other words, the display apparatus 10 is capable of displaying a plurality of size-reduced videos on one screen.

Figure 38:
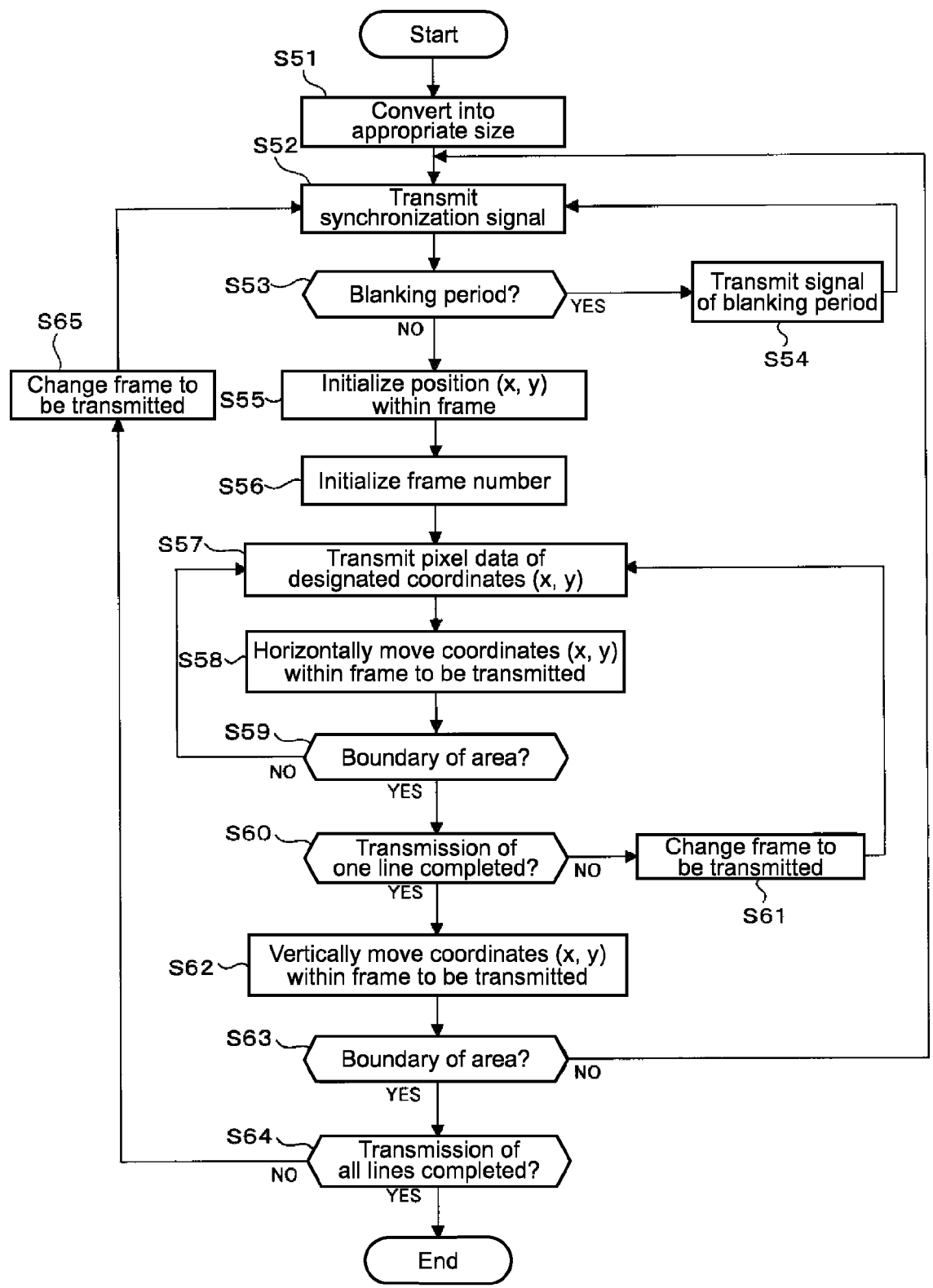
FIG. 38 A flowchart showing a processing example on the video-transmission side according to the second embodiment of the present invention.

Next, an operation carried out by the structure shown in FIG. 36 will be described with reference to the flowchart of FIG. 38. Here, processes different from those of the flowchart shown in FIG. 29 will mainly be described, and descriptions on the same processes will be simplified or omitted.

After Step S56, the control unit 104 transmits pixel data of coordinates within an area (e.g., Area J) corresponding to a frame designated by the in-frame area discrimination unit 32e (e.g., Frame J) (Step S57). The control unit 104 horizontally moves the coordinates of the pixel data to be transmitted in the frame (Step S58). The control unit 104 confirms, by the in-frame area discrimination unit 32e, whether the coordinates have moved to a boundary of the area (e.g., Area J) corresponding to the video data that is currently being transmitted (e.g., Frame J) (Step S59).

If the coordinates of the pixel data to be transmitted have not reached the boundary, the control unit 104 repeats the processes from Step S57. If the coordinates have reached the boundary, the control unit 104 confirms whether a transmission of pixel data of one line has been completed (Step S60). When not completed in Step S60, the control unit 104 changes the frame to be transmitted to another frame (Step S61) and repeats the processes from Step S57.

When the transmission of one line has been completed, the control unit 104 moves the coordinates in the vertical direction (Step S62) and confirms whether they are at the boundary of the area (Step S63). If the coordinates are not at the boundary, the processes are repeated from Step S52. If the coordinates are at the boundary of the area, the control unit 104 confirms whether pixel data of all lines has been transmitted (Step S64). When not completed in Step S64, the control unit 104 changes the frame to be transmitted to another frame (Step S65) (e.g., changes Frame L to Frame M) and repeats the processes from Step S52.

Figure 39:
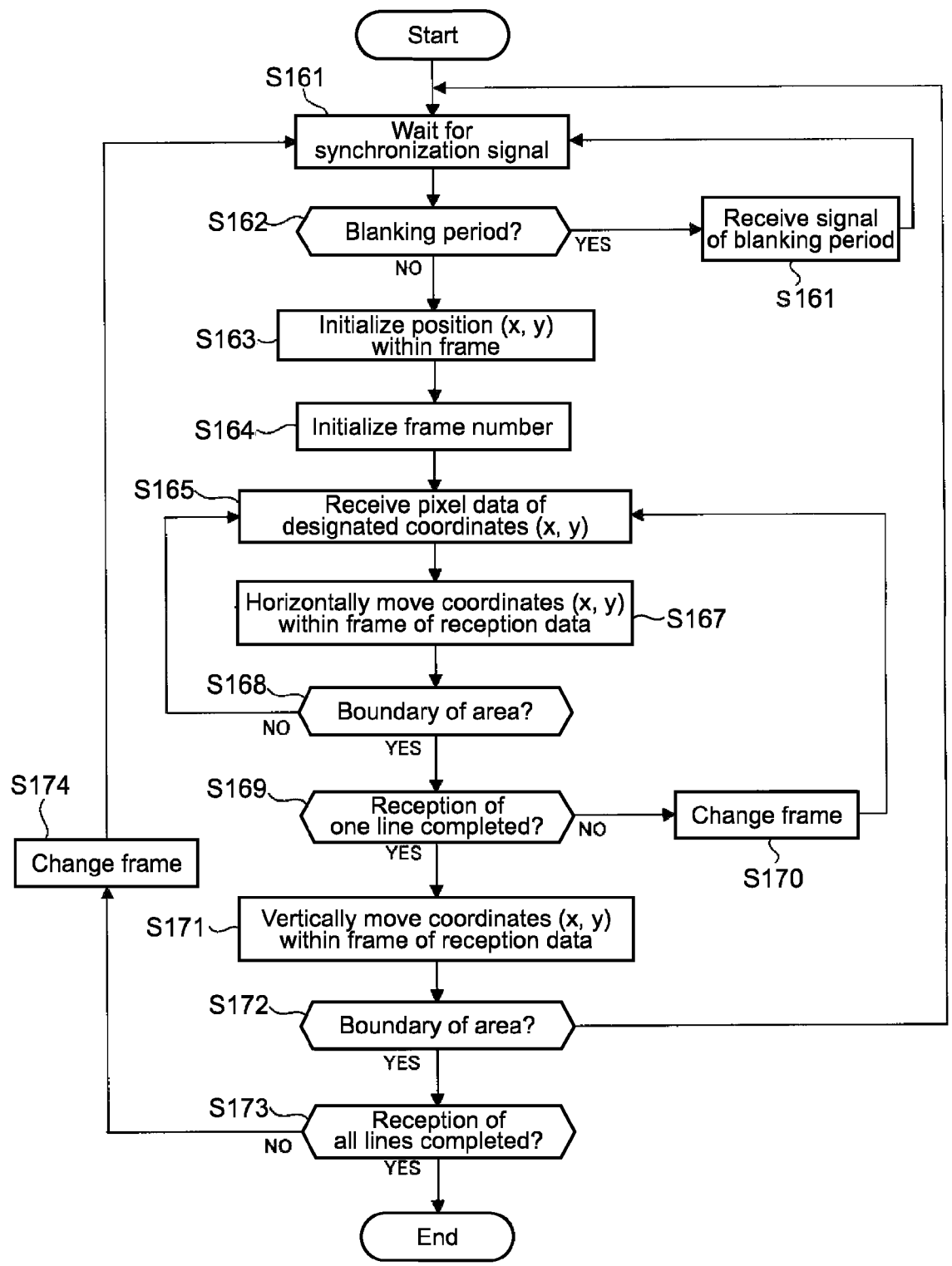
FIG. 39 A flowchart showing a processing example on the video-reception side according to the second embodiment of the present invention.

Next, an operation carried out by the structure shown in FIG. 37 will be described with reference to the flowchart of FIG. 39. Here, processes different from those of the flowchart shown in FIG. 30 will mainly be described, and descriptions on the same processes will be simplified or omitted.

After Step S165, the control unit 97 receives pixel data of coordinates within an area (e.g., Area J) corresponding to a frame designated by the in-frame area discrimination unit 12j (e.g., Frame J) (Step S166). The control unit 97 stores the received pixel data in one of the picture memories 121a, 121b, ... 121n (e.g., 121a).

The control unit 97 horizontally moves the coordinates in the area corresponding to the frame to be received (Step S167). The control unit 97 confirms, by the in-frame area discrimination unit 12j, whether the coordinates have moved to a boundary of the area (Step S168). If the coordinates have not reached the boundary of the area, the control unit 97 repeats the processes from Step S166. On the contrary, if the coordinates have reached the boundary of the area, the control unit 97 confirms whether a reception of pixel data of one line has been completed (Step S169).

When not completed in Step S169, the control unit 97 changes the frame to be received (Step S170) and repeats the processes from Step S166. When the reception of pixel data of one line is completed, the control unit 97 moves the coordinates in the vertical direction (Step S171) and confirms whether they are at the boundary of the area (Step S172).

If the coordinates are not at the boundary of the area in Step S172, the control unit 97 repeats the processes from Step S161. If the coordinates are at the boundary of the area in Step S172, the control unit 97 confirms whether pixel data of all lines has been received (Step S173). When not completed in Step S173, the control unit 97 changes the frame to be transmitted to another frame (Step S174) (e.g., changes Frame L to Frame M) and repeats the processes from Step S161.

It should be noted that the way of sectioning the entire frame shown in FIG. 40 is a mere example. It is also possible to perform a division such that sizes of the areas become equal as shown in FIG. 40 or sizes of the areas differ. In this case, the recording/reproducing apparatus 30 is capable of transmitting videos of different sizes.

Further, an area not allocated with video data may be present in one frame after various areas are allocated to that frame. In this case, although a transmission efficiency is lowered, a degree of freedom in setting screen sizes is improved.

Furthermore, frames obtained by size-reducing a plurality of consecutive frames in one piece of video data may be allocated to a plurality of areas in one frame as in FIG. 40. In this case, the user is capable of performing trick play such as fast-forward and rewind within a data range of the plurality of consecutive frames.

As described heretofore, by dividing the data area of one frame into a plurality of areas and transmitting a plurality of pieces of video data in area units, a plurality of videos can be transmitted with one cable as in the case of the first embodiment.

Also in the case of this embodiment, the display apparatus 10 as the sink apparatus can display moving-image thumbnails and the like so that a plurality of contents that the source apparatus has can be selected with ease.

Further, even when the sink apparatus does not support the reception processing of this embodiment, the frame structure of the HDMI standard is maintained as shown in FIG. 40. Therefore, the display apparatus 10 as the sink apparatus can display a screen in which a plurality of videos are aligned, and the displayed videos are not disturbed. FIG. 40 merely shows an example, and by subdividing the screen areas, a large amount of videos can be transmitted.

Next, a third embodiment of the present invention will be described with reference to FIGS. 41 to 44. A basic transmission system structure of this embodiment is the same as that of the first embodiment described with reference to FIGS. 22 to 26, and a basic structure for connecting the recording/reproducing apparatus 30 and the display apparatus 10 by the HDMI cable 1 is the same. In addition, descriptions on FIGS. 41 to 44 are practically to help understand the fourth embodiment (to be described later) as a typical embodiment of the present invention.

Specifics of the processing of transmitting a plurality of pieces of video data at the same time in this embodiment is different from that of the first and second embodiments. In this embodiment, main video data (uncompressed video data) is transmitted in a video section (active video area in FIG. 26) defined by the HDMI standard. Other pieces of video data are transmitted in data island sections within the blanking areas as video data compressed (encoded) by a predetermined codec. In descriptions below, different points will mainly be described.

Figure 41:
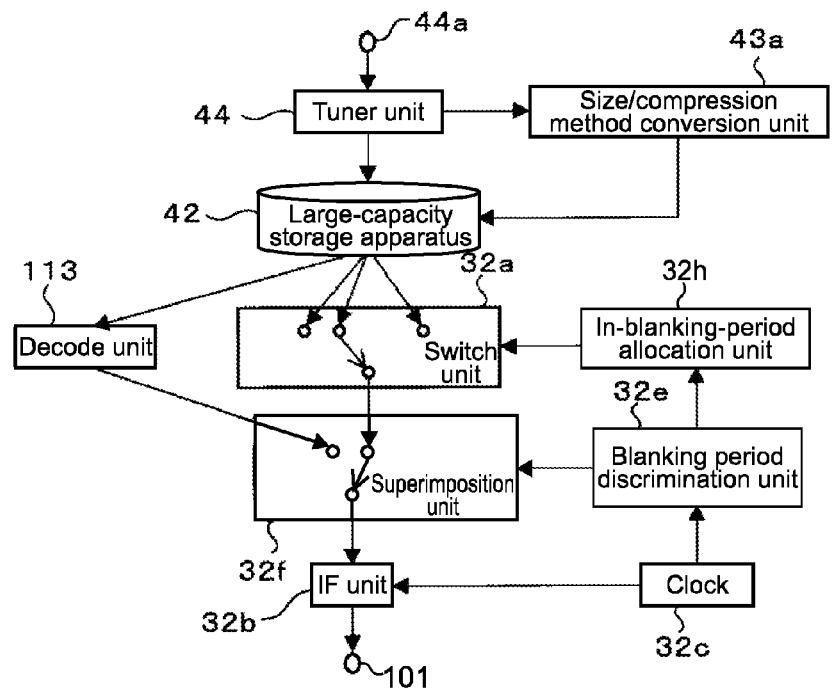
FIG. 41 A block diagram showing a structural example on a video-transmission side according to a third embodiment of the present invention.

FIG. 41 is a diagram showing a block structure for realizing video data transmission processing in the recording/reproducing apparatus 30. The structure shown in FIG. 41 is executed under control of the control unit 104 shown in FIG. 24.

Out of a plurality of pieces of compressed video data stored in the large-capacity storage apparatus 42, video data transmitted as uncompressed video data is decoded by a decode unit 113 and output from the interface unit 32b via a superimposition unit 32f.

A blanking area discrimination unit 32h discriminates the blanking area in the uncompressed video data based on the clocks supplied from the clock generation unit 32c and supplies it to the superimposition unit 32f. Accordingly, the blanking area discrimination unit 32h superimposes a signal of the video data from the switch unit 32a on the blanking area.

It should be noted that in this embodiment, the size conversion units 112a to 112n shown in FIGS. 27 and 36 are not provided. The size conversion units 112a to 112n have been provided in FIGS. 27 and 36 since the decode units 111a to 111n have been provided at a stage before them. However, even without the size conversion units 112a to 112n in the structure shown in FIG. 41, compressed video data is size-reduced in advance by the size/compression method conversion unit 45 and stored in the large-capacity storage apparatus 42. Therefore, there is no problem regarding display of index videos.

An in-blanking-area allocation unit 32g allocates compressed video data to the blanking areas confirmed by the blanking area discrimination unit 32h based on the frame numbers supplied from the control unit 104. In this case, a plurality of pieces of compressed video data are typically allocated. However, one frame of one piece of compressed video data may be allocated to the blanking area in one frame. Further, the in-blanking-area allocation unit 32g allocates the frame number of the compressed video data, data related to the video data, and the like to the blanking area.

The switch unit 32a selects compressed video data out of a plurality of pieces of compressed video data stored in the large-capacity storage apparatus 42 based on an instruction from the in-blanking-area allocation unit 32g and outputs it to the superimposition unit 32f.

Figure 42:
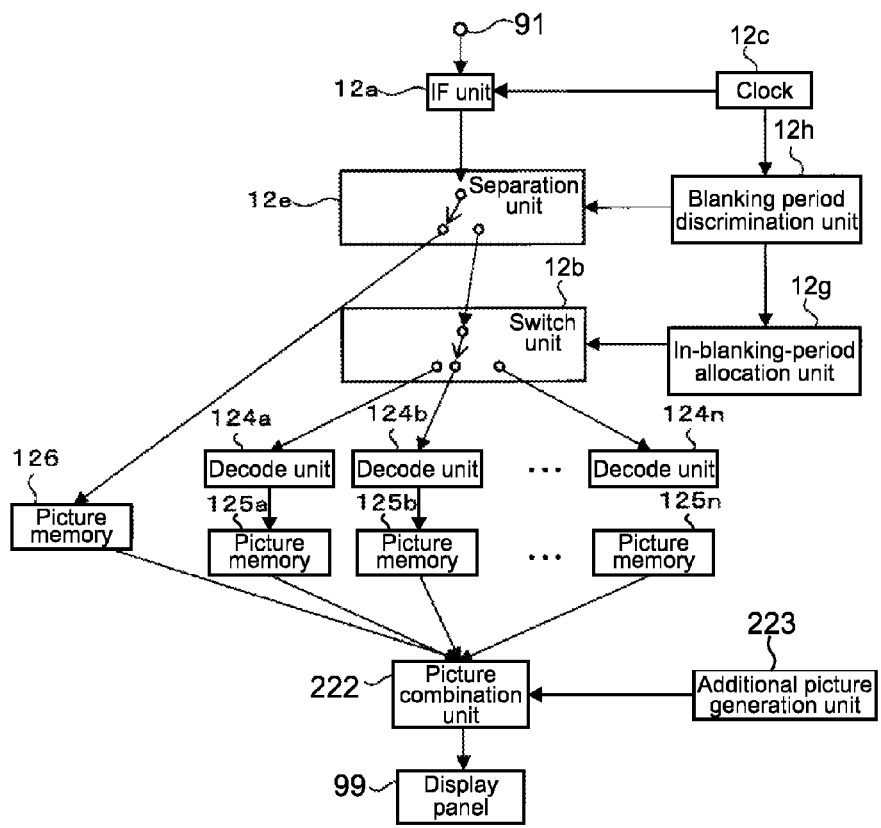
FIG. 42 A block diagram showing a structural example on a video-reception side according to the third embodiment of the present invention.

FIG. 42 is a diagram showing a block structure for realizing processing for the display apparatus 10 to receive video data transmitted to the HDMI cable 1 as described above. The structure shown in FIG. 42 is executed under control of the control unit 97 shown in FIG. 23.

The display apparatus 10 receives data by the interface unit 12a in sync with the pixel clocks received by the clock unit 12c and supplies it to a separation unit 12e. A synchronization signal of the received data is supplied to a blanking area discrimination unit 12h. Accordingly, the blanking area discrimination unit 12h discriminates whether it is currently a blanking area period.

Based on the discrimination of the blanking area discrimination unit 12h, the separation unit 12e supplies uncompressed video data to a picture memory 126 out of superimposed video signals supplied from the IF unit 12a. The separation unit 12e also supplies, based on the discrimination of the blanking area discrimination unit 12h, compressed video data to the switch unit 12b out of the superimposed video signals supplied from the IF unit 12a.

An in-blanking-area allocation unit 12g discriminates, for example, a frame number allocated in the blanking area confirmed by the blanking area discrimination unit 12h. Based on the discrimination of the frame number, the switch unit 12b categorizes a plurality of pieces of compressed video data supplied from the separation unit 12e. The categorized video data is input to decode units (decoders) 124a, 124b, ... 124n and decoded to uncompressed video data. The decoded uncompressed video data is input to picture memories 125a, 125b, ... 125n.

The picture combination unit (combination means) 222 combines the video data stored in the picture memories 125a, 125b, ... 125n and videos obtained from the additional picture generation unit 223 that generates an additional picture such as a text as necessary. The combined picture is displayed on the display panel 99. In other words, the display apparatus can display a plurality of size-reduced videos on one screen.

Next, an operation carried out by the structure shown in FIG. 41 will be described with reference to the flowchart of FIG. 43. Here, processes that are different from those of the flowchart shown in FIG. 29 will mainly be described, and descriptions on the same processes will be simplified or omitted.

The control unit 104 transmits a synchronization signal for synchronizing with the display apparatus 10 as the reception side regarding a transmission and reception (Step S91). The control unit 104 initializes a frame number to be transmitted to a blanking area (Step S92) and confirms whether it is currently a blanking area (Step S93). If it is currently a blanking area, the control unit 104 executes processes of Steps S101 to S106, and if it is not, executes processes of Steps S94 to S100.

Processing carried out in a case where it currently is not a blanking area will be described first. The control unit 104 confirms whether there is uncompressed video data to be transmitted in a period of a video signal that is not a blanking area (whether allocation is made) (Step S94). When there is no uncompressed video data, the control unit 104 repeats the processes from Step S93, and when there is, initializes coordinates in the frame to be transmitted (Step S95).

The control unit 104 transmits pixel data of each coordinates (Step S96). The control unit 104 moves the coordinates in the horizontal direction (Step S97), confirms whether a transmission of pixel data of one line has been completed (Step S98), and when not completed, repeats the processes from Step S96. When the transmission of pixel data of one line is completed, the control unit 104 moves the coordinates in the vertical direction (Step S99). The control unit 104 confirms whether a transmission of pixel data of all lines has been completed (Step S100) and repeats the processes from Step S91 until it is completed.

On the other hand, when it is currently a blanking area in Step S93, the control unit 104 transmits a predetermined volume of data of compressed video data (e.g., video data 0) that corresponds to the frame number (e.g., number 0) designated by the in-blanking-area allocation unit 12g (Step S101).

The predetermined volume of data is pixel data corresponding to a predetermined number of pixels within one frame of the video data 0, data corresponding to a predetermined number of lines within one frame of the video data 0, or the like.

The control unit 104 confirms whether a transmission of one frame of the video data 0 has been completed (Step S102) and when not completed, confirms whether the blanking area is ended (Step S103). When the blanking area is not yet ended, the control unit 104 repeats the processes from Step S101 and continues transmitting the data, and when the blanking area is ended, returns to Step S91.

When the transmission of one frame of the video data is completed, the control unit 104 confirms whether a transmission of all frames of the video data 0 has been completed (Step S104). When the transmission of all frames is completed, the control unit 104 transmits other signals to be transmitted to the blanking area (Step S105) and returns to Step S91. When the transmission of all frames is not completed, the control unit 104 changes the frame number (changes it to number 1) (Step S106) and transmits a predetermined volume of data of Frame 1 (corresponding to frame number 1) of the compressed video data 0 (Step S101).

Figure 44:
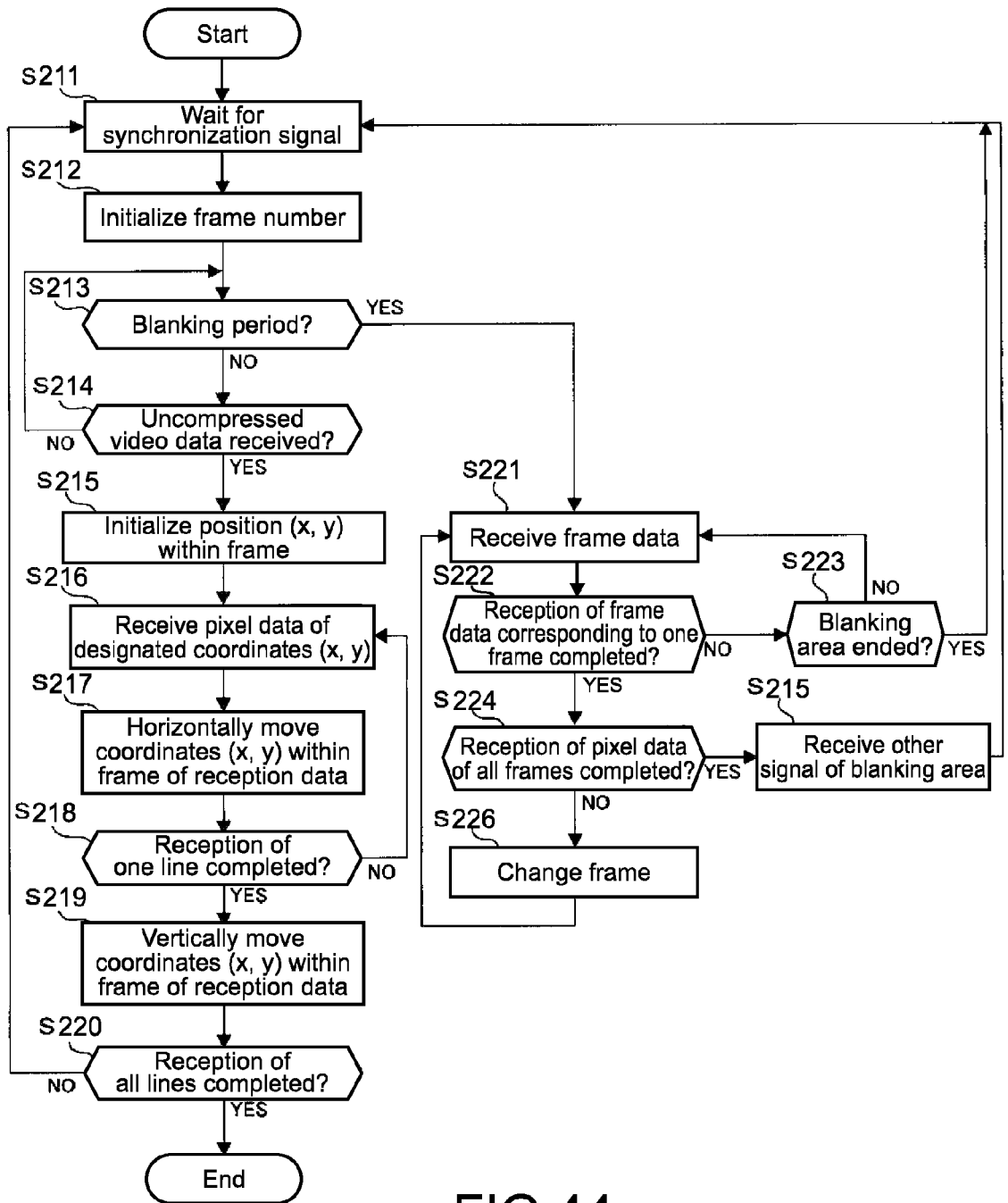
FIG. 44 A flowchart showing a processing example on the video-reception side according to the third embodiment of the present invention.

Next, an operation carried out by the structure shown in FIG. 42 will be described with reference to the flowchart of FIG. 44.

The control unit 97 performs a synchronization after waiting for a synchronization signal (Step S211) and initializes a frame number received from a blanking area (Step S212). The control unit 97 confirms whether it is currently a blanking area by the blanking area discrimination unit (Step S213). When it is a blanking area, the control unit 97 executes processes of Steps S221 to S226 and when not, executes processes of Steps S214 to S220.

When it is not the blanking area in Step S213, the control unit 97 confirms whether uncompressed video data is input from the IF unit 12a (Step S214). When uncompressed video data is not input, the control unit 97 repeats the processes from Step S211. When uncompressed video data is input, the control unit 97 initializes coordinates of a pixel of a frame of the uncompressed video data and a frame number (Step S215). Then, the control unit 97 receives pixel data of the received video data (Step S216), moves the coordinates in the horizontal direction (Step S217), and confirms whether recording of pixel data of one line has been completed (Step S218).

When the reception of one line is not completed, the control unit 97 repeats the processes from Step S216 and when completed, moves the coordinates in the vertical direction (Step S219) and confirms whether a reception of pixel data of all lines has been completed (Step S220). When the reception of all lines is not completed, the processes from Step S211 are repeated.

On the other hand, when it is currently a blanking area in Step S213, the control unit 97 receives a frame number (e.g., number 0) of one frame of compressed video data (e.g., video data 0) received in the blanking area and pixel data of that one frame (Step S221). The control unit 97 confirms whether a reception of data of one frame of the compressed video data 0 has been completed (Step S222). When the reception of data of one frame is not completed, the control unit 97 confirms whether the blanking area is ended (Step S223) and when not ended, returns to Step S221 to additionally receive pixel data. When the blanking area is ended, the control unit 97 repeats the processes from Step S211.

When the reception of pixel data of one frame is completed, the control unit 97 confirms whether a reception of all frames of the video data 0 has been completed (Step S224). When the reception is completed, the control unit 97 receives other signals to be transmitted to the blanking area (Step S225) and repeats the processes from Step S211. When the reception of all frames of the video data 0 is not completed, the control unit 97 changes the frame number to a frame number designated by the in-blanking-area allocation unit 12g (changes it to number 1) (Step S226) and repeats the processes from Step S221.

Figure 43:
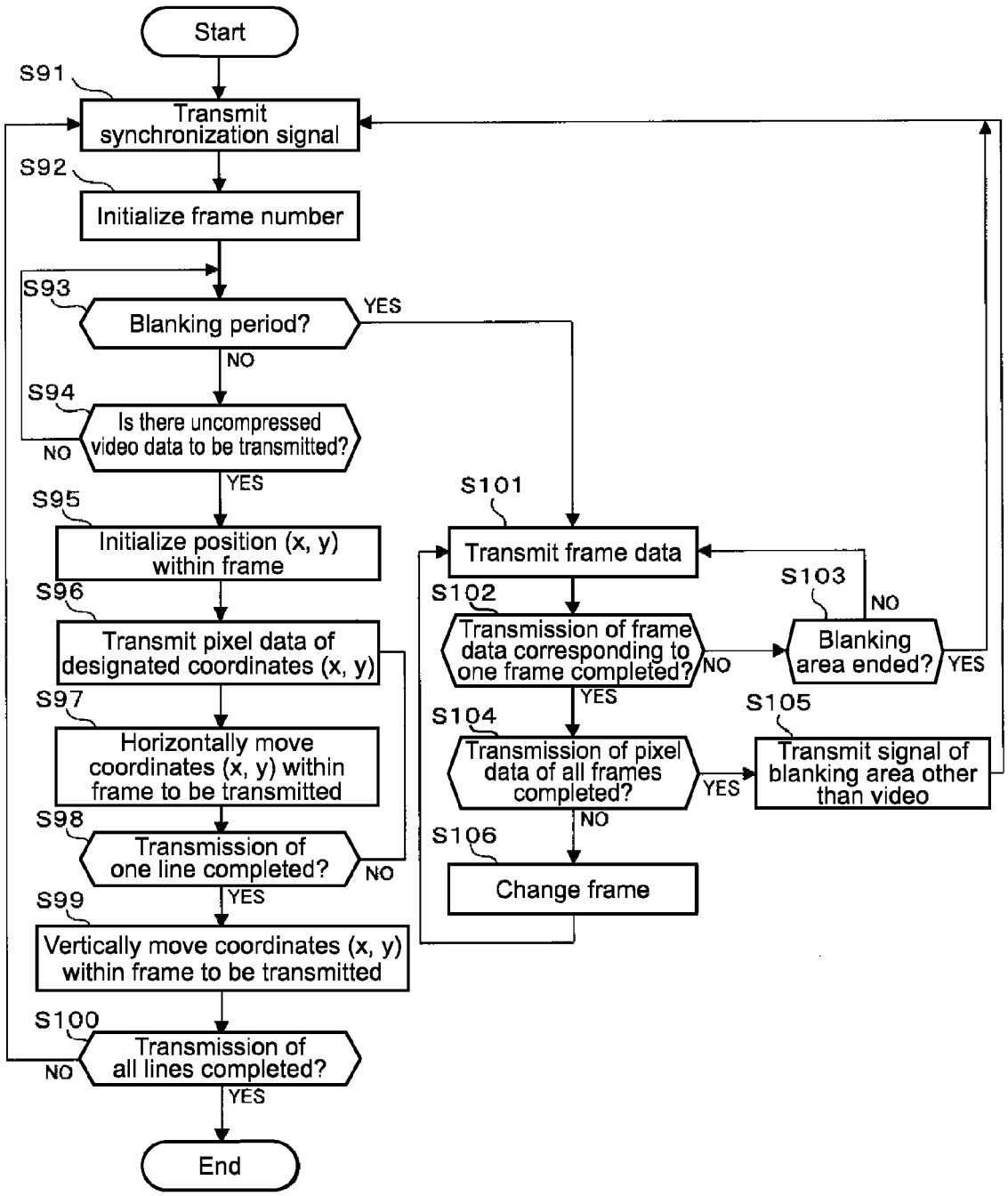
FIG. 43 A flowchart showing a processing example on the video-transmission side according to the third embodiment of the present invention.

In FIG. 43, the compressed video data transmitted in the blanking areas may have different framed rates. In this case, videos of various sizes can be transmitted. The number of pieces of compressed video data transmitted in the blanking areas may either be one or plural.

Compressed video data corresponding to a plurality of frames instead of one frame may be transmitted while uncompressed video data corresponding to one frame is being transmitted. The data amount to be transmitted may be changed for each video data. In this case, the number of display frames of a specific video can be changed, and the user can perform trick play such as fast-forward and rewind within a range of the number of frames.

Since a plurality of pieces of video data are transmitted and received using the blanking areas as described above, a plurality of videos can be transmitted with one cable as in the first and second embodiments, with the result that a plurality of cables do not need to be provided.

In this embodiment, display of thumbnail pictures becomes possible, and the user can easily select a plurality of contents on the source apparatus via the sink apparatus. Moreover, since a detection of video data of data islands in the blanking areas only needs to be inhibited when the sink apparatus is an unsupported apparatus, videos are not disturbed even when connected. Moreover, since uncompressed video data is also transmitted, it is possible to make a switch at an extremely high speed with respect to a largest video defined in the transmission channel.

It should be noted that the embodiments described heretofore have described the example in which uncompressed video data is transmitted unidirectionally in the transmission channel of the HDMI standard. However, the embodiments are also applicable to a case where the transmission side and the reception side are similarly connected by other transmission lines for transmitting uncompressed video data in sync with pixel clocks.

Next, the fourth embodiment as a typical embodiment of the present invention will be described with reference to FIGS. 48 to 52.

In descriptions below, points different from those of the first, second, or third embodiment will mainly be described.

Figure 48:
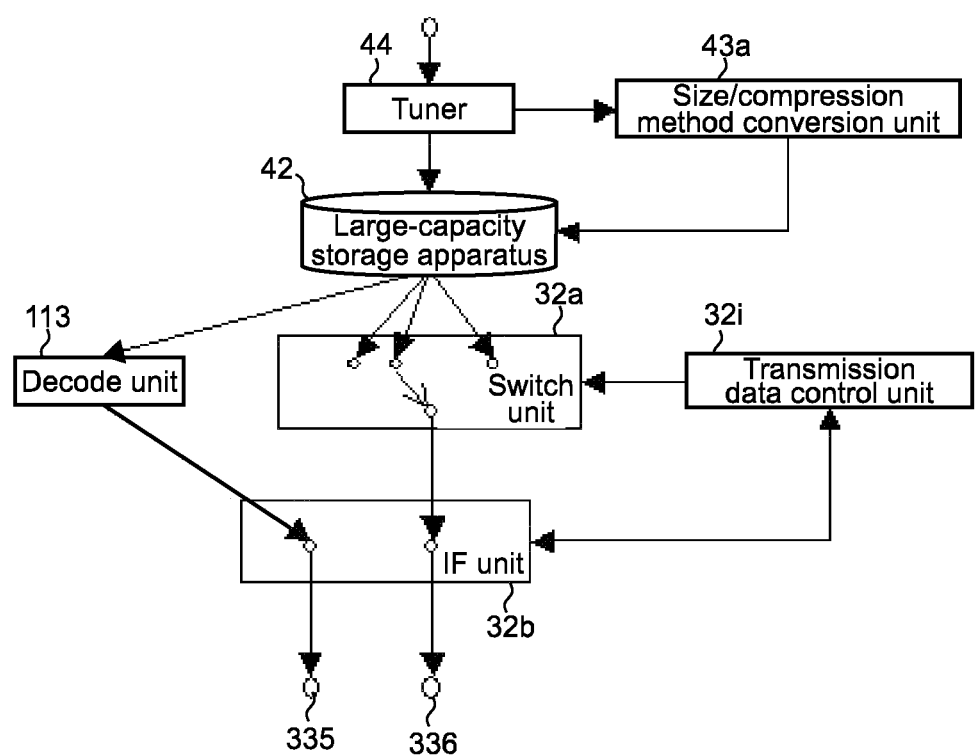
FIG. 48 A block diagram showing a structural example on a video-transmission side according to a fourth embodiment of the present invention.

FIG. 48 is a diagram showing a block structure for realizing video data transmission processing in the recording/reproducing apparatus 30. The structure shown in FIG. 48 is executed under control of the control unit 104 shown in FIG. 3. Descriptions on the structure shown in FIG. 48 will mainly be given on points that are different from those of FIG. 41.

Out of a plurality of pieces of compressed video data stored in the large-capacity storage apparatus 42, video data transmitted as uncompressed video data is decoded by the decode unit 113 and output from the IF unit 32b.

Figure 49:
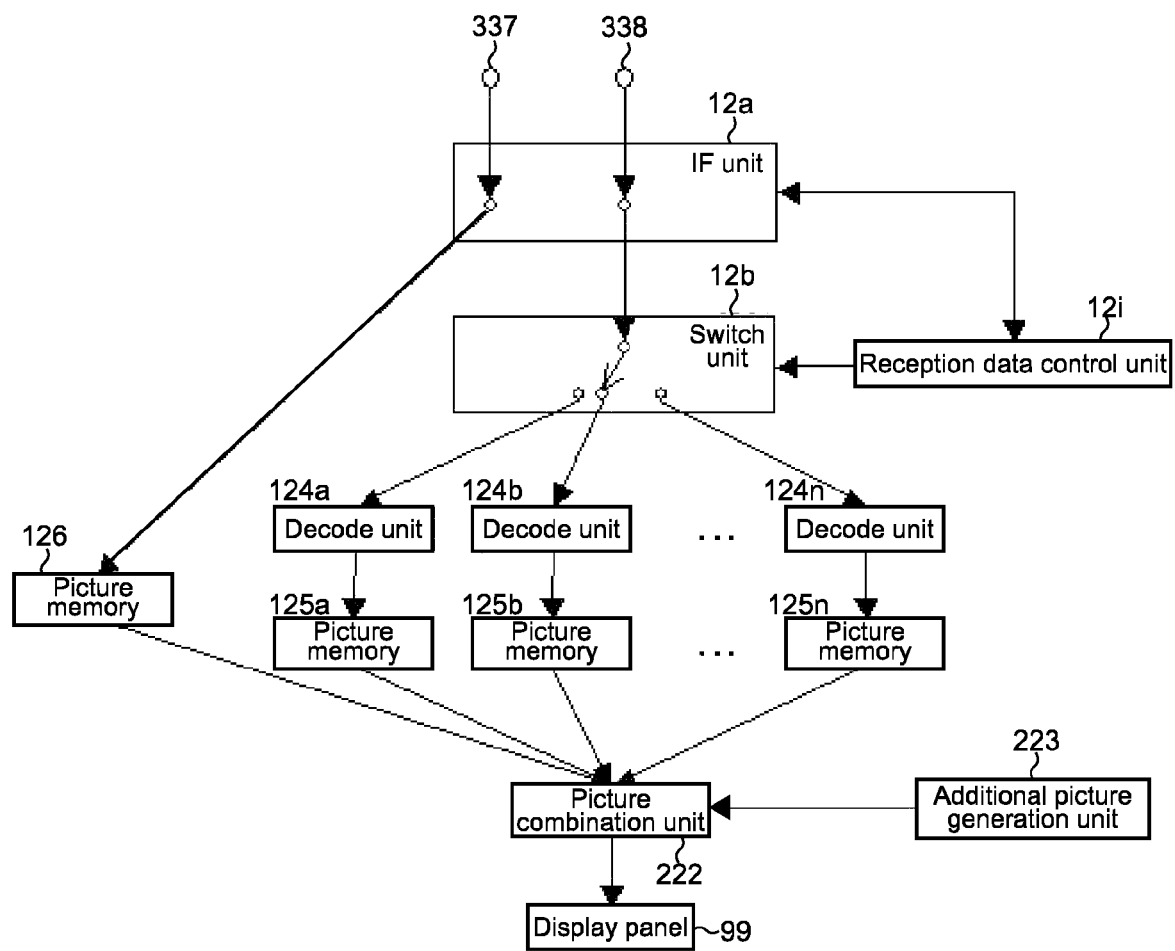
FIG. 49 A block diagram showing a structural example on a video-reception side according to the fourth embodiment of the present invention.

A transmission data control unit 32i communicates with a reception data control unit 12i to be described later, that is shown in FIG. 49. Typically, the transmission data control unit 32i transmits to the reception data control unit 12i data including information on whether to transmit any of a plurality of pieces of compressed video data stored in the large-capacity storage apparatus 42, information on a volume of video data to be transmitted, and the like. The data of those pieces of information is also supplied to the IF unit 32b.

A control signal including the data of those pieces of information output from the transmission data control unit 32i (control signal related to transmission) is typically transmitted to the reception data control unit 12i via terminals 336 and 338. However, the control signal may be transmitted by a different line such as a CEC line.

The transmission data control unit 32i or the transmission data control unit 32i and the control unit 104 functions/function as a control means.

The switch unit 32a selects one of a plurality of pieces of video data supplied from the large-capacity storage apparatus 42 according to video data designated by the transmission data control unit 32i (or identification number thereof) and supplies it to the IF unit 32b.

The IF unit 32b transmits video data decoded by the decode unit 113 from a terminal 335. Moreover, compressed video data supplied from the switch unit 32a is transmitted via the terminal 336. The terminal 335 is included in the first channel unit described above. For example, when the IF unit 32b is an HDMI, the terminal 335 is a terminal for a TMDS channel.

The terminal 336 is included in the second channel unit. For example, when the IF unit 32b is an HDMI, the terminal 336 is at least one of terminals connected to a reserved line, an HPD line, an SCL line, and an SDA line.

FIG. 49 is a diagram showing a block structure for realizing processing for the display apparatus 10 to receive video data transmitted to the HDMI cable 1 as described above. The structure shown in FIG. 49 is executed under control of the control unit 97 shown in FIG. 2.

Uncompressed video data transmitted from the recording/reproducing apparatus 30 via the terminal 335 is input to the IF unit 32b via a terminal 337. Further, compressed video data transmitted from the recording/reproducing apparatus 30 via the terminal 336 is input to the IF unit 32b via the terminal 338.

The reception data control unit 12i communicates with the transmission data control unit 32i as described above. Typically, the reception data control unit 12i receives data including information on whether to transmit any of a plurality of pieces of compressed video data transmitted from the transmission data control unit 32i, information on a volume of video data to be transmitted, and the like. The reception data control unit 12i transmits response data with respect to the reception to the transmission data control unit 32i. Those pieces of information are also supplied to the IF unit 12a.

A control signal including the data of those pieces of information output from the reception data control unit 12i (control signal related to reception) is typically transmitted to the transmission data control unit 32i via terminals 338 and 336. However, the control signal may be transmitted by a different line such as a CEC line.

The reception data control unit 12i or the reception data control unit 12i and the control unit 97 functions/function as a control means.

The switch unit 12b selects one decode unit out of the decode units 124a, 124b, . . . 124n according to video data designated by the reception data control unit 12i (or identification number thereof) and supplies video data supplied from the IF unit 12a to the selected decode unit.

The uncompressed video data input to the IF unit 12a via the terminal 337 is input to the picture memory 126.

Figure 50:
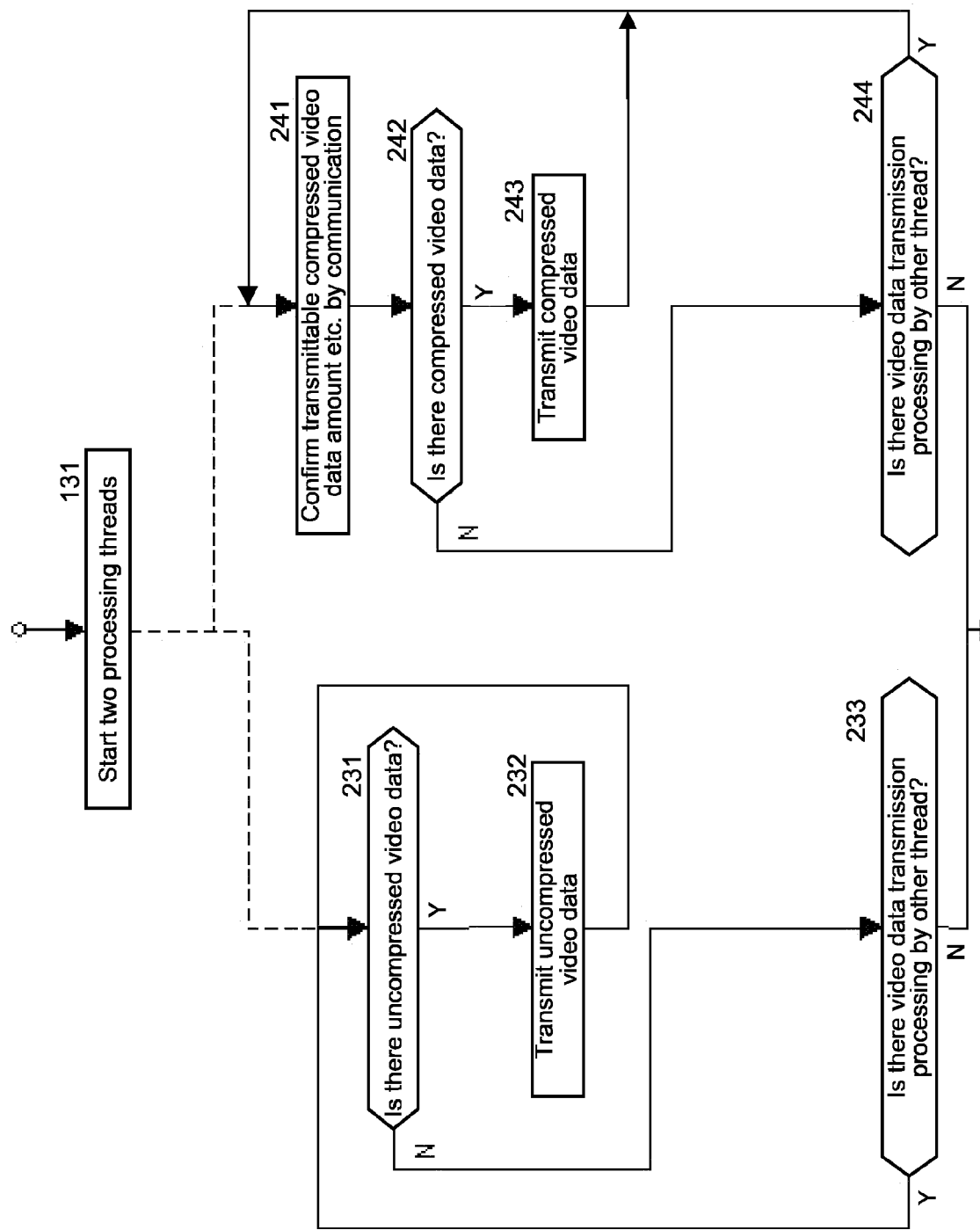
FIG. 50 A flowchart showing a processing example on the video-transmission side according to the fourth embodiment of the present invention.

Next, an operation carried out by the structure shown in FIG. 48 will be described with reference to the flowchart of FIG. 50.

The transmission data control unit 32i starts two processing threads (Step S131). The two processing threads are transmission processing of uncompressed video data in Steps S231 to S233 and transmission processing of compressed video data in Steps S241 to S244.

The transmission data control unit 32i confirms whether there is a transmission command of uncompressed video data from the control unit 104 (or whether there is uncompressed video data in buffer memory (not shown) or the like) (Step S231). When there is a transmission command, the transmission data control unit 32i transmits uncompressed video data from the IF unit 32b and the terminal 335 (Step S232) and when there is no transmission command, repeats the processes from Step S232. The transmission data control unit 32i confirms whether there is transmission processing of compressed video data by the other thread (Step S233) and if there is not, ends the two threads.

In the other thread, the transmission data control unit 32i confirms transmittable compressed video data, a data amount thereof, and the like by communicating with the reception data control unit 12i (Step S241). When there is video data to be transmitted as a result of communicating with the reception data control unit 12i (YES in Step S242), the transmission data control unit 32i transmits that video data (Step S243). When there is no video data to be transmitted (NO in Step S242), the transmission data control unit 32i repeats the processes from Step S241.

The transmission data control unit 32i confirms whether there is transmission processing of uncompressed video data by the other thread (Step S244) and if there is not, ends the two threads.

As described above, since the first and second vide data are transmitted by two different lines (line connecting terminals 335 and 337 and line connecting terminals 336 and 338), a plurality of pieces of video data can be efficiently transmitted at the same time.

Figure 51:
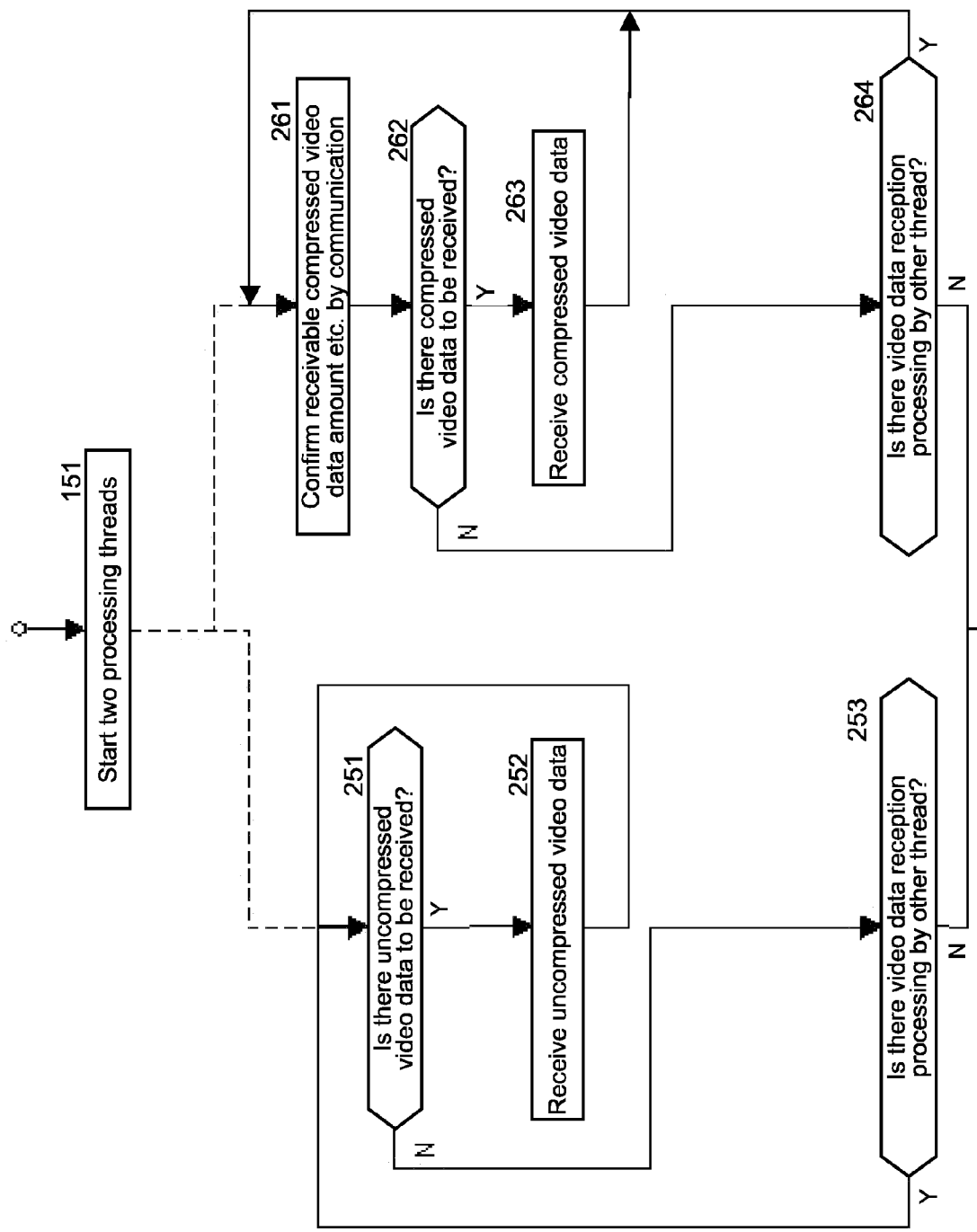
FIG. 51 A flowchart showing a processing example on the video-reception side according to the fourth embodiment of the present invention.

Next, an operation carried out by the structure shown in FIG. 49 will be described with reference to the flowchart of FIG. 51.

The control unit 97 starts two processing threads (Step S151). The two processing threads are transmission processing of uncompressed video data in Steps S251 to S253 and transmission processing of compressed video data in Steps S261 to S264.

The reception data control unit 12i confirms whether there is a reception command of uncompressed video data from the control unit 97 (or whether there is uncompressed video data in buffer memory (not shown) or the like) (Step S251). When there is a transmission command, the reception data control unit 12i receives uncompressed video data from the IF unit 32b and the terminal 335 (Step S252) and when there is no transmission command, repeats the processes from Step S252. The reception data control unit 12i confirms whether there is reception processing of compressed video data by the other thread (Step S253) and if there is not, ends the two threads.

In the other thread, the reception data control unit 12i confirms receivable compressed video data, a data amount thereof, and the like by communicating with the transmission data control unit 32i (Step S261). When there is video data to be received as a result of communicating with the transmission data control unit 32i (YES in Step S262), the reception data control unit 12i receives that video data (Step S263). When there is no video data to be received (NO in Step S262), the reception data control unit 12i repeats the processes from Step S261.

The reception data control unit 12i confirms whether there is transmission processing of uncompressed video data by the other thread (Step S2644) and if there is not, ends the two threads.

As described above, since the first and second video data are transmitted by two different lines (line connecting terminals 335 and 337 and line connecting terminals 336 and 338), a plurality of pieces of video data can be efficiently transmitted at the same time.

Moreover, since the data is transmitted at high speed using the line connecting the terminals 336 and 338, there is not much restrictions on the number of pieces of compressed video data to be transmitted or a data amount thereof. Therefore, the recording/reproducing apparatus 30 as the source apparatus does not need to resize a data amount of a thumbnail picture necessary in the display apparatus 10. In other words, it is also possible for the recording/reproducing apparatus 30 to transmit a large amount of video data to the display apparatus 10 as it is and cause the display apparatus 10 to resize the video data.

The transmission data control unit 32i typically transmits audio data included in a content of uncompressed video data (first audio data) via the line connecting the terminals 335 and 337.

Further, the transmission data control unit 32*i* only needs to transmit audio data included in a content of compressed video data (second audio data) via the line connecting the terminals 336 and 338. Accordingly, a plurality of pieces of audio data included in a plurality of contents are transmitted at the same time. As a result, the sink apparatus that has received the plurality of pieces of audio data can output those plurality of audios to the plurality of speakers, for example. Alternatively, the sink apparatus can superimpose parts of the plurality of pieces of received audio data and output them to one speaker.

For example, assuming that, when one video content is reproduced by the display apparatus 10 as the sink apparatus, the user has made a switch to another video content while looking at a GUI (Graphical User Interface) as the index video displayed on the display apparatus 10, the display apparatus 10 gradually lowers a volume output so that audio data included in the content from before the switch fades out. The display apparatus 10 is capable of causing audio data included in the switched content to fade in so that the volume output gradually becomes larger along with the fadeout.

Alternatively, the transmission data control unit 32*i* may transmit uncompressed audio data included in a content of uncompressed video data via the line connecting the terminals 336 and 338.

In this embodiment, a control signal exchanged among the transmission data control unit 32*i* and the terminals 335 and 337 is communicated bidirectionally by the line connecting the terminals 336 and 338. Therefore, a volume restriction is hardly placed on the control signal. Thus, the transmission data control unit 32*i* can determine a detailed data amount in accordance with a data amount of a UI such as a thumbnail picture on the screen of the display apparatus 10 or a data amount supplied to the decode units 124*a* to 124*n* (e.g., in accordance with performance of display apparatus 10). As a result, there is a merit that a buffer does not need to be additionally provided in the display apparatus 10 or a UI change request from the user can be immediately reflected on the display apparatus 10.

In this embodiment, a plurality of pieces of compressed video data have been transmitted via the line connecting the terminals 336 and 338. However, a plurality of pieces of compressed video data do not always need to be transmitted, and one piece of compressed video data (one content) may be transmitted instead. In other words, in this case, uncompressed video data transmitted via the line connecting the terminals 335 and 337 and one piece of compressed video data are transmitted at the same time.

In this embodiment, the control unit 104 may transmit a control signal related to a transmission of uncompressed video data via the line connecting the terminals 336 and 338.

As described above, the first to fourth embodiments have the following unique merits.

Since a plurality of pieces of video data are transmitted at the same time, it is advantageous also when there are a plurality of display apparatuses 10. In other words, it is effective in a multi-display application.

Alternatively, it also becomes possible for one display apparatus 10 to display a 3D video by transmitting a plurality of pieces of video data at the same time.

Since a high-definition video is transmitted with one cable, it is also possible for the user to view the individual videos in normal sizes when the display apparatus includes an enormous display unit having a resolution exceeding a normal resolution and a plurality of thumbnail pictures are displayed on the display unit.

In addition, as a GUI available for the display apparatus 10, there is a cross-media bar in which a plurality of different thumbnail pictures are arranged in a cross shape. Alternatively, a simple matrix arrangement is also possible. Moreover, at least one of the thumbnail pictures may be a moving image.

Alternatively, it is also possible to set one of a plurality of pieces of video data as a video to be viewed by the user in real time and set other one or more pieces of video data as a recording video. The sink apparatus only needs to be equipped with a storage device capable of recording data, such as a hard disk, a solid-state memory, and an optical disc. Typically, video data for real-time viewing is uncompressed video data, and others are compressed video data. However, the opposite is also possible.

The technique that uses the line connecting the terminals 336 and 338 for transmitting and receiving compressed video data may be applied to the second or third embodiment. In the second embodiment, in addition to area-segmented compressed vide data, an additional one or a plurality of different pieces of compressed video data may be transmitted using the line connecting the terminals 336 and 338. In the third embodiment, in addition to a plurality of pieces of compressed video data allocated to the blanking areas, an additional one or a plurality of different pieces of compressed video data may be transmitted using the line connecting the terminals 336 and 338.

DESCRIPTION OF REFERENCE NUMERALS

35 HDMI® cable
71 HDMI® source
72 HDMI® sink
81 transmitter
82 receiver
83 DDC
84 CEC line
85 EDIDROM
121 switching control unit
124 switching control unit
131 conversion unit
132 decode unit
133 switch
134 conversion unit
135 switch
136 decode unit
141 signal line
171 switching control unit
172 switching control unit
181 switch
182 switch
183 decode unit
184 conversion unit
185 switch
186 switch
191 SDA line
192 SCL line
222 picture combination unit
335-338 terminal
400 communication system
401 LAN function expansion HDMI(EH) source apparatus
411 LAN signal transmitter circuit
412 terminating resistor
413, 414 AC coupling capacitor
415 LAN signal receiver circuit
416 subtracting circuit
421 pull-up resistor
422 resistor
423 capacitor 424 comparator
431 pull-down resistor
432 resistor
433 capacitor
434 comparator
402 EH sink apparatus
441 LAN signal transmitter circuit
442 terminating resistor
443, 444 AC coupling capacitor
445 LAN signal receiver circuit
446 subtracting circuit
451 pull-down resistor
452 resistor
453 capacitor
454 comparator
461 choke coil
462, 463 resistor
403 EH cable
501 reserved line
502 HPD Line
511, 512 source-side terminal
521, 522 sink-side terminal
600 communication system
601 LAN function expansion HDMI(EH) source apparatus
611 LAN signal transmitter circuit
612, 613 terminating resistor
614-617 AC coupling capacitor
618 LAN signal receiver circuit
620 inverter
621 resistor
622 resistor
623 capacitor
624 comparator
631 pull-down resistor
632 resistor
633 capacitor
634 comparator
640 NOR gate
641-644 analog switch
645 inverter
646, 647 analog switch
651, 652 DDC transceiver
653, 654 pull-up resistor
602 EH sink apparatus
661 LAN signal transmitter circuit
662, 663 terminating resistor
664-667 AC coupling capacitor
668 LAN signal receiver circuit
671 pull-down resistor
672 resistor
673 capacitor
674 comparator
681 choke coil
682, 683 resistor
691-694 analog switch
695 inverter
696, 697 analog switch
701, 702 DDC transceiver
703 pull-up resistor
603 EH cable
801 reserved line
802 HPD line
803 SCL line
804 SDA line
811-814 source-side terminal
821-824 sink-side terminal

The invention claimed is:

1. A reception apparatus comprising:
a reception unit that receives first data, which is baseband, from an external device as differential signals via transmitting lines for baseband data, the transmitting lines being included in a high definition multimedia interface (HDMI) cable;
a connection status unit that direct current (DC) biases at least one of a pair of differential lines included in the HDMI cable, such that a connection status between the reception apparatus and the external device can be detected at the external device; and
a communication unit that receives second data, which is different from the first data, from the external device via a reserved line and a hot plug detect (HPD) line included in the HDMI cable, transmits third data, which is different from the first data, to the external device via the reserved line and HPD line, and subtracts the third data from the second data.

2. The reception apparatus according to claim 1, wherein the communication unit comprises a local area network (LAN) signal transmitting circuit that transmits the third data to the external device, and a LAN signal receiving circuit that receives the second data from the external device.

3. A reception method comprising the steps of:
direct current (DC) biasing at least one of a pair of differential lines included in a high definition multimedia interface (HDMI) cable, such that a connection status between a reception apparatus and an external device can be detected at the external device;
receiving first data, which is baseband, from the external device as differential signals via transmitting lines for baseband data, the transmitting lines being included in the HDMI cable;
receiving second data, which is different from the first data, from the external device via a reserved line and a hot plug detect (HPD) line included in the HDMI cable, transmitting third data, which is different from the first data, to the external device via the reserved line and HPD line; and
subtracting the third data from the second data.

* * * * *